United States Patent
LeCrone et al.

(10) Patent No.: US 8,942,073 B1
(45) Date of Patent: *Jan. 27, 2015

(54) MAINTAINING TAPE EMULATION CONSISTENCY

(71) Applicant: EMC Corporation, Hopkinton, MA (US)

(72) Inventors: Douglas E. LeCrone, Hopkinton, MA (US); Paul A. Linstead, Shrewsbury, MA (US); Brett A. Quinn, Lincoln, RI (US)

(73) Assignee: EMC Corporation, Hopkinton, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/058,357

(22) Filed: Oct. 21, 2013

Related U.S. Application Data

(63) Continuation of application No. 13/135,315, filed on Jun. 30, 2011, now Pat. No. 8,593,918.

(51) Int. Cl.
G11B 21/08 (2006.01)
G06F 13/00 (2006.01)

(52) U.S. Cl.
USPC ........................ 369/30.01; 711/111

(58) Field of Classification Search
None
See application file for complete search history.

(56) References Cited

U.S. PATENT DOCUMENTS

| | | | | |
|---|---|---|---|---|
| 5,206,939 A * | 4/1993 | Yanai et al. | ...... | 711/4 |
| 5,537,568 A * | 7/1996 | Yanai et al. | ...... | 711/118 |
| 5,742,792 A * | 4/1998 | Yanai et al. | ...... | 711/162 |
| 5,778,394 A * | 7/1998 | Galtzur et al. | ...... | 711/162 |
| 5,845,147 A * | 12/1998 | Vishlitzky et al. | ...... | 710/5 |
| 5,857,208 A * | 1/1999 | Ofek | ...... | 707/999.202 |
| 6,308,284 B1 * | 10/2001 | LeCrone et al. | ...... | 714/6.31 |
| 6,493,796 B1 * | 12/2002 | Arnon et al. | ...... | 711/114 |
| 6,594,742 B1 * | 7/2003 | Ezra | ...... | 711/159 |
| 6,874,046 B1 * | 3/2005 | LeCrone et al. | ...... | 710/74 |
| 7,113,945 B1 * | 9/2006 | Moreshet et al. | ...... | 1/1 |
| 7,467,168 B2 * | 12/2008 | Kern et al. | ...... | 1/1 |
| 2003/0204772 A1 * | 10/2003 | Petersen et al. | ...... | 714/6 |
| 2004/0078647 A1 * | 4/2004 | Das Sharma et al. | ...... | 714/7 |
| 2007/0234108 A1 * | 10/2007 | Cox et al. | ...... | 714/6 |
| 2010/0049924 A1 * | 2/2010 | Kano | ...... | 711/161 |
| 2010/0115215 A1 * | 5/2010 | Rosychuk | ...... | 711/162 |

* cited by examiner

Primary Examiner — Paul Huber
(74) Attorney, Agent, or Firm — Muirhead and Saturnelli, LLC

(57) ABSTRACT

Maintaining tape emulation consistency includes writing additional tape data to a first local storage device at a local site, writing tape emulation data to a second local storage device at the local site, where the second local storage device is different from the first local storage device, and maintaining consistency of the first and second local storage devices in connection with transferring data to a remote site. Maintaining consistency of the first and second local storage devices may include initiating a cycle switch that causes a concurrent cycle change from a first cycle to a second cycle for the first and second local storage devices. Additional tape data and tape emulation data written before a first time is associated with a first cycle. Additional tape data and tape emulation data written after the first time and before a second time is associated with a second cycle.

20 Claims, 35 Drawing Sheets

MAINTAINING TAPE EMULATION CONSISTENCY

RELATED APPLICATIONS

This application is a continuation of U.S. patent application Ser. No. 13/135,315 (pending), filed on Jun. 30, 2011, entitled MAINTAINING TAPE EMULATION CONSISTENCY which is incorporated by reference herein.

BACKGROUND OF THE INVENTION

1. Technical Field

This application relates to computer storage devices, and more particularly to the field of transferring data between storage devices.

2. Description of Related Art

Host processor systems may store and retrieve data using a storage device containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

A significant number of mainframe applications that access tape drive data are still in use. In many cases, tape drives have been replaced by hardware and/or software that provides tape drive simulation/emulation. For example, the DLm960 device provided by EMC Corporation of Hopkinton, Mass. provides tape drive functionality so that applications in a host system coupled thereto (e.g., an IBM System z host device). Thus, applications running on a host system coupled to a DLm960 (or similar) would send tape commands and data thereto and receive tape data and status as if the applications were communicating with an actual tape drive. The DLm960 may include non-volatile storage (e.g., disk array) to store tape data and tape emulation information.

One issue associated with using tape emulation is that tape operation metadata may be stored separately from the tape data. For example, a host may maintain metadata (tape management data) such as tape retention time, tape ownership, tape security, etc. This metadata information may be stored in a storage device used by the host, such as a Symmetrix disk array storage device provided by EMC Corporation of Hopkinton, Mass. The tape data, on the other hand, may be stored in a separate storage device used for tape emulation. When both the tape information and the additional tape data are asynchronously transferred to a remote backup site to provide for disaster recovery, the metadata at the remote backup site is not necessarily synchronized with the tape data at the backup site since the asynchronous transfer of data from the different storage devices may be at different rates and/or cycle times. Thus, the additional tape data at the remote site may be inconsistent with the tape data at the remote site, making it difficult, if not impossible, to failover to the remote site in the case of a disaster at the primary site.

Accordingly, it is desirable to provide a tape emulation system that maintains consistency at a remote site between additional tape data and tape data when the data and metadata are transferred asynchronously to the remote site and are stored separately from each other.

SUMMARY OF THE INVENTION

According to the system described herein, maintaining tape emulation consistency includes writing additional tape data to a first local storage device at a local site, writing tape emulation data to a second local storage device at the local site, where the second local storage device is different from the first local storage device, and maintaining consistency of the first and second local storage devices in connection with transferring data to a remote site. Maintaining consistency of the first and second local storage devices may include initiating a cycle switch that causes a concurrent cycle change from a first cycle to a second cycle for the first and second local storage devices, where additional tape data and tape emulation data written before a first time is associated with a first cycle and where additional tape data and tape emulation data written after the first time and before a second time is associated with a second cycle different from the first cycle, and, after completion of the cycle switch, the first and second local storage devices initiating transfer of the additional tape data and tape emulation data associated with the first cycle to corresponding remote storage devices at the remote site. Writes to the local storage devices begun after initiating the cycle switch may not complete until after the cycle switch has completed. Maintaining tape emulation consistency may also include, following the first and second local storage devices completing transfer of the first plurality of writes to corresponding remote storage devices, each of the first and second local storage devices sending a message to the corresponding remote storage device. Maintaining tape emulation consistency may also include, providing cycle switching information to the second storage device via a link that is separate from links used to provide the additional tape data and tape emulation data. A host may initiate the cycle switch. Initiating the cycle switch may include waiting a predetermined amount of time, determining if the first and second local storage devices are ready to switch, and for each of the first and second local storage devices, sending a first command thereto to cause a cycle switch. Sending a command to initiate a cycle switch may also cause writes begun after the first command to not complete until a second command is received. Maintaining tape emulation consistency may also include, after sending the first command to the first and second local storage devices, sending the second command to the first and second storage devices to allow writes to complete. Maintaining consistency of the first and second local storage devices may also include providing a consistency group that includes the first and second local storage devices.

According further to the system described herein, computer software, provided in a non-transitory computer-readable medium, that maintains tape emulation consistency. The software includes executable code that writes additional tape data to a first local storage device at a local site, executable code that writes tape emulation data to a second local storage device at the local site, wherein the second local storage device is different from the first local storage device, and executable code that maintains consistency of the first and second local storage devices in connection with transferring data to a remote site. Executable code that maintains consistency may include executable code that initiates a cycle switch that causes a concurrent cycle change from a first cycle to a second cycle for the first and second local storage devices, where additional tape data and tape emulation data written before a first time is associated with a first cycle and wherein additional tape data and tape emulation data written after the first time and before a second time is associated with a second cycle different from the first cycle, and, executable code that causes the first and second local storage devices to initiate, after completion of the cycle switch, transfer of the additional tape data and tape emulation data associated with the first cycle to corresponding remote storage devices at the remote site. Writes to the local storage devices begun after initiating the cycle switch may not complete until after the cycle switch has completed. Following the first and second local storage devices completing transfer of the first plurality of writes to corresponding remote storage devices, each of the first and second local storage devices may send a message to the corresponding remote storage device. The computer software may also include executable code that provides cycle switching information to the second storage device via a link that is separate from links used to provide the additional tape data and tape emulation data. A host may initiate the cycle switch. Executable code that initiates the cycle switch may include executable code that waits a predetermined amount of time, executable code that determines if the first and second local storage devices are ready to switch, and executable code that sends to each of the first and second local storage devices a first command thereto to cause a cycle switch. Sending a command to initiate a cycle switch may also cause writes begun after the first command to not complete until a second command is received. The computer software may also include executable code that sends, after sending the first command to the first and second local storage devices, the second command to the first and second storage devices to allow writes to complete. The first and second local storage devices may be provided in a consistency group.

According further to the system described herein, maintaining continuous availability of tape data includes providing a first storage space that contains the tape data, where metadata for the tape data points to the first storage space, creating a data mirroring relationship between the first storage space and a second, separate, storage space, where tape data written to the first storage space is copied to the second storage space, and adjusting the metadata for the tape data to reference the second storage space in response to the first storage space becoming inaccessible. Maintaining continuous availability of tape data may also include suspending access to the tape data prior to adjusting the metadata. Maintaining continuous availability of tape data may also include resuming access to the tape data after adjusting the metadata. The tape data may include tape emulation data and additional tape data. The first storage space may become inaccessible as a result of a hardware error. The first storage space may be local with respect to the second storage space. The first storage space may be remote with respect to the second storage space. Adjusting the metadata may include swapping metadata that references the first storage space with metadata that references the second storage space.

According further to the system described herein, computer software, provided in a non-transitory computer readable medium, maintains continuous availability of tape data. The software includes executable code that provides a first storage space that contains the tape data, where metadata for the tape data includes information that references the first storage space and where there is a data mirroring relationship between the first storage space and a second, separate, storage space so that tape data written to the first storage space is copied to the second storage space and executable code that adjusts the metadata to reference the second storage space in response to the first storage space becoming inaccessible. The software may also include executable code that suspends access to the logical device prior to adjusting the metadata. The software may also include executable code that resumes access to the logical device after adjusting the metadata. The tape data may include tape emulation data and additional tape data. The first storage space may become off-line as a result of a hardware error. The first storage space may be local with respect to the second storage space. The first storage space may be remote with respect to the second storage space. Executable code that adjusts the metadata may include executable code that swaps metadata that references the first storage space with metadata that references the second storage space.

DETAILED DESCRIPTION OF VARIOUS EMBODIMENTS

Figure 1:
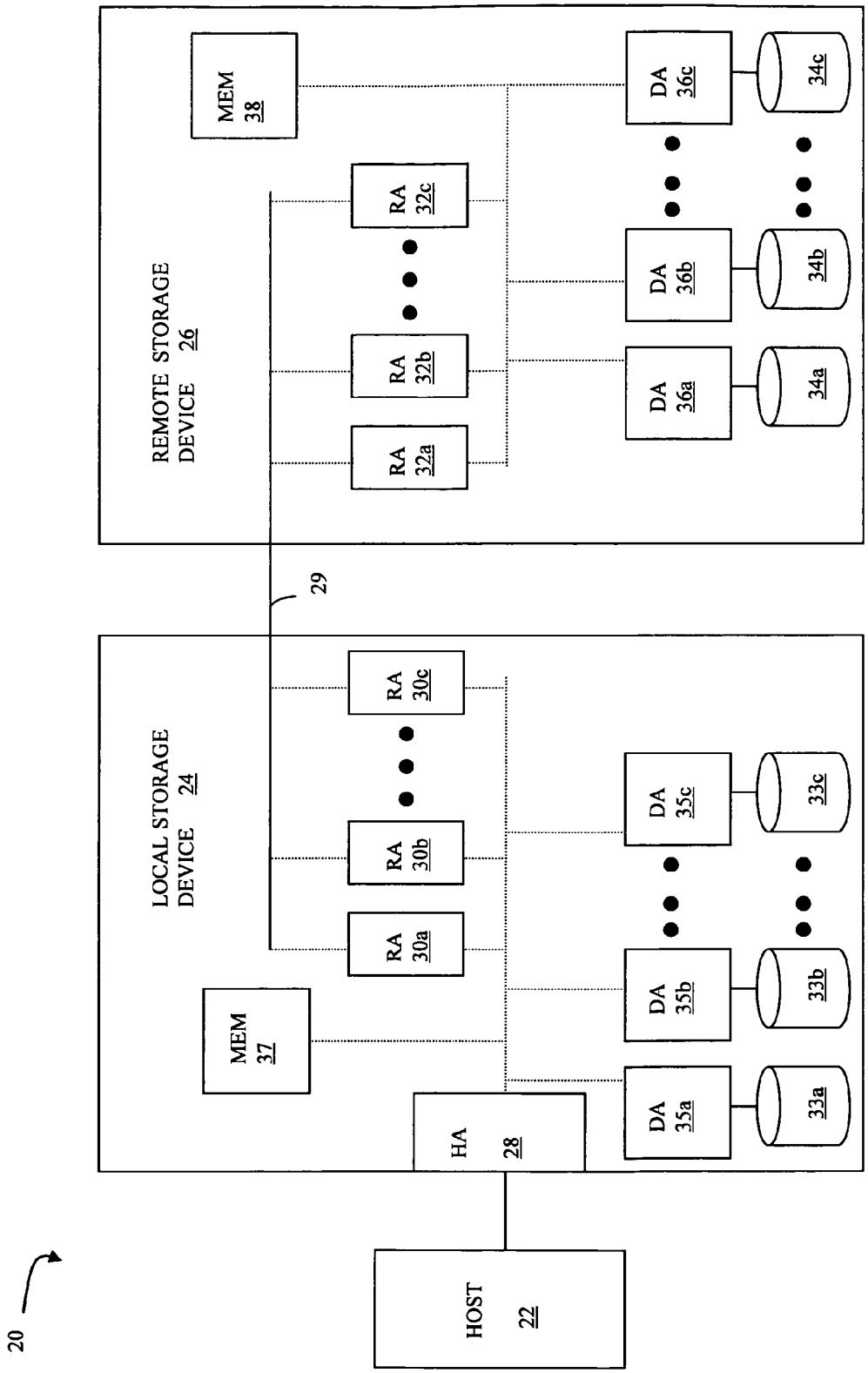
FIG. 1 is a schematic diagram showing a host, a local storage device, and a remote data storage device used in connection with an embodiment of the system described herein.

Referring to FIG. 1, a diagram 20 shows a relationship between a host 22, a local storage device 24, and a remote storage device 26. The host 22 reads and writes data from and to the local storage device 24 via a host adapter (HA) 28, which facilitates the interface between the host 22 and the local storage device 24. Although the diagram 20 only shows one host 22 and one HA 28, it will be appreciated by one of ordinary skill in the art that multiple HA's may be used and that one or more HA's may have one or more hosts coupled thereto.

Data from the local storage device 24 is copied to the remote storage device 26 via an RDF link 29 to cause the data on the remote storage device 26 to be identical to the data on the local storage device 24. Although only one link is shown (the link 29), it is possible to have additional links between the storage devices 24, 26 and to have links between one or both of the storage devices 24, 26 and other storage devices (not shown). In addition, the link 29 may be provided using a direct connection (wired, over-the-air, or some combination thereof), a network (such as the Internet), or any other appropriate means for conveying data. Note that there may be a time delay between the transfer of data from the local storage device 24 to the remote storage device 26, so that the remote storage device 26 may, at certain points in time, contain data that is not identical to the data on the local storage device 24. Communication using RDF is described, for example, in U.S. Pat. No. 5,742,792 titled "REMOTE DATA MIRRORING" to Yanai, et al., which is incorporated by reference herein.

The local storage device 24 includes a first plurality of RDF adapter units (RA's) 30a, 30b, 30c and the remote storage device 26 includes a second plurality of RA's 32a-32c. The RA's 30a-30c, 32a-32c are coupled to the RDF link 29 and are similar to the host adapter 28, but are used to transfer data between the storage devices 24, 26. The software used in connection with the RA's 30a-30c, 32a-32c is discussed in more detail hereinafter.

The storage devices 24, 26 may include one or more disks, each containing a different portion of data stored on each of the storage devices 24, 26. FIG. 1 shows the storage device 24 including a plurality of disks 33a, 33b, 33c and the storage device 26 including a plurality of disks 34a, 34b, 34c. The RDF functionality described herein may be applied so that the data for at least a portion of the disks 33a-33c of the local storage device 24 is copied, using RDF, to at least a portion of the disks 34a-34c of the remote storage device 26. It is possible that other data of the storage devices 24, 26 is not copied between the storage devices 24, 26, and thus is not identical.

Each of the disks 33a-33c is coupled to a corresponding disk adapter unit (DA) 35a, 35b, 35c that provides data to a corresponding one of the disks 33a-33c and receives data from a corresponding one of the disks 33a-33c. Similarly, a plurality of DA's 36a, 36b, 36c of the remote storage device 26 are used to provide data to corresponding ones of the disks 34a-34c and receive data from corresponding ones of the disks 34a-34c. An internal data path exists between the DA's 35a-35c, the HA 28 and the RA's 30a-30c of the local storage device 24. Similarly, an internal data path exists between the DA's 36a-36c and the RA's 32a-32c of the remote storage device 26. Note that, in other embodiments, it is possible for more than one disk to be serviced by a DA and that it is possible for more than one DA to service a disk.

The local storage device 24 also includes a global memory 37 that may be used to facilitate data transferred between the DA's 35a-35c, the HA 28 and the RA's 30a-30c. The memory 37 may contain tasks that are to be performed by one or more of the DA's 35a-35c, the HA 28 and the RA's 30a-30c, and a cache for data fetched from one or more of the disks 33a-33c. Similarly, the remote storage device 26 includes a global memory 38 that may contain tasks that are to be performed by one or more of the DA's 36a-36c and the RA's 32a-32c, and a cache for data fetched from one or more of the disks 34a-34c. Use of the memories 37, 38 is described in more detail hereinafter.

The storage space in the local storage device 24 that corresponds to the disks 33a-33c may be subdivided into a plurality of volumes or logical devices. The logical devices may or may not correspond to the physical storage space of the disks 33a-33c. Thus, for example, the disk 33a may contain a plurality of logical devices or, alternatively, a single logical device could span both of the disks 33a, 33b. Similarly, the storage space for the remote storage device 26 that comprises the disks 34a-34c may be subdivided into a plurality of volumes or logical devices, where each of the logical devices may or may not correspond to one or more of the disks 34a-34c.

Providing an RDF mapping between portions of the local storage device 24 and the remote storage device 26 involves setting up a logical device on the remote storage device 26 that is a remote mirror for a logical device on the local storage device 24. The host 22 reads and writes data from and to the logical device on the local storage device 24 and the RDF mapping causes modified data to be transferred from the local storage device 24 to the remote storage device 26 using the RA's, 30a-30c, 32a-32c and the RDF link 29. In steady state operation, the logical device on the remote storage device 26 contains data that is identical to the data of the logical device on the local storage device 24. The logical device on the local storage device 24 that is accessed by the host 22 is referred to as the "R1 volume" (or just "R1") while the logical device on the remote storage device 26 that contains a copy of the data on the R1 volume is called the "R2 volume" (or just "R2"). Thus, the host reads and writes data from and to the R1 volume and RDF handles automatic copying and updating of the data from the R1 volume to the R2 volume. The system described herein may be implemented using software, hardware, and/or a combination of software and hardware where software may be stored in an appropriate storage medium and executed by one or more processors.

Figure 2:
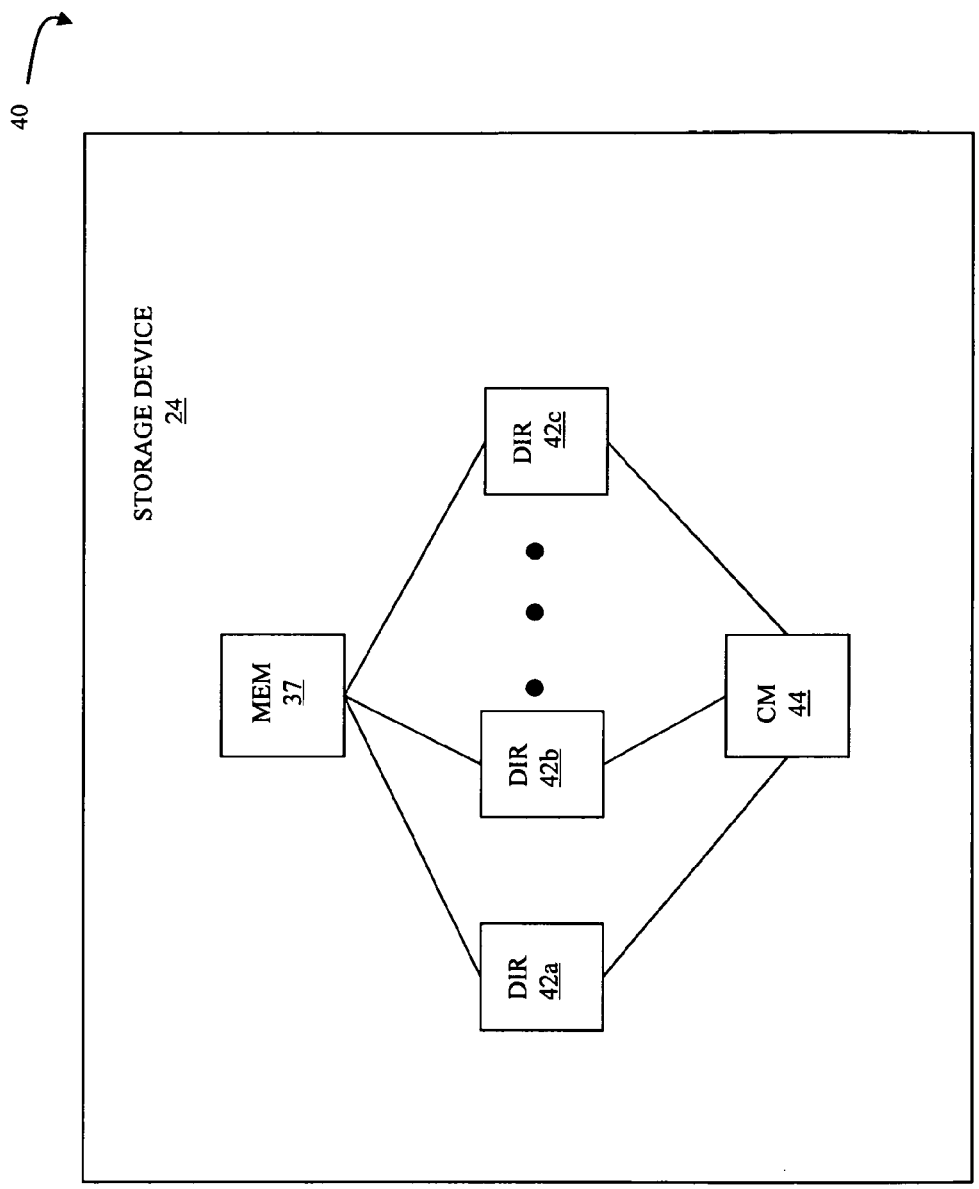
FIG. 2 is a schematic diagram showing a storage device, memory, a plurality of directors, and a communication module that may be used in connection with an embodiment of the system described herein.

Referring to FIG. 2, a diagram 40 illustrates an embodiment of the storage device 24 where each of a plurality of directors 42a-42c are coupled to the memory 37. Each of the directors 42a-42c represents the HA 28 (and/or other HA's), the RA's 30a-30c, or DA's 35a-35c. In an embodiment disclosed herein, there may be up to sixty four directors coupled to the memory 37. Of course, for other embodiments, there may be a higher or lower maximum number of directors that may be used.

The diagram 40 also shows an optional communication module (CM) 44 that provides an alternative communication path between the directors 42a-42c. Each of the directors 42a-42c may be coupled to the CM 44 so that any one of the directors 42a-42c may send a message and/or data to any other one of the directors 42a-42c without needing to go through the memory 37. The CM 44 may be implemented using conventional MUX/router technology where a sending one of the directors 42a-42c provides an appropriate address to cause a message and/or data to be received by an intended receiving one of the directors 42a-42c. Some or all of the functionality of the CM 44 may be implemented using one or more of the directors 42a-42c so that, for example, the directors 42a-42c may be interconnected directly with the interconnection functionality being provided on each of the directors 42a-42c. In addition, a sending one of the directors 42a-42c may be able to broadcast a message to all of the other directors 42a-42c at the same time.

In some embodiments, one or more of the directors 42a-42c may have multiple processor systems thereon and thus may be able to perform functions for multiple directors. In some embodiments, at least one of the directors 42a-42c having multiple processor systems thereon may simultaneously perform the functions of at least two different types of directors (e.g., an HA and a DA). Furthermore, in some embodiments, at least one of the directors 42a-42c having multiple processor systems thereon may simultaneously perform the functions of at least one type of director and perform other processing with the other processing system. In addition, all or at least part of the global memory 37 may be provided on one or more of the directors 42a-42c and shared with other ones of the directors 42a-42c.

Note that, although specific storage device configurations are disclosed in connection with FIG. 1 and FIG. 2, it should be understood that the system described herein may be implemented on any appropriate platform. Thus, the system described herein may be implemented using a platform like that described in connection with FIG. 1 and/or FIG. 2 or may be implemented using a platform that is somewhat or even completely different from any particular platform described herein.

Figure 3:
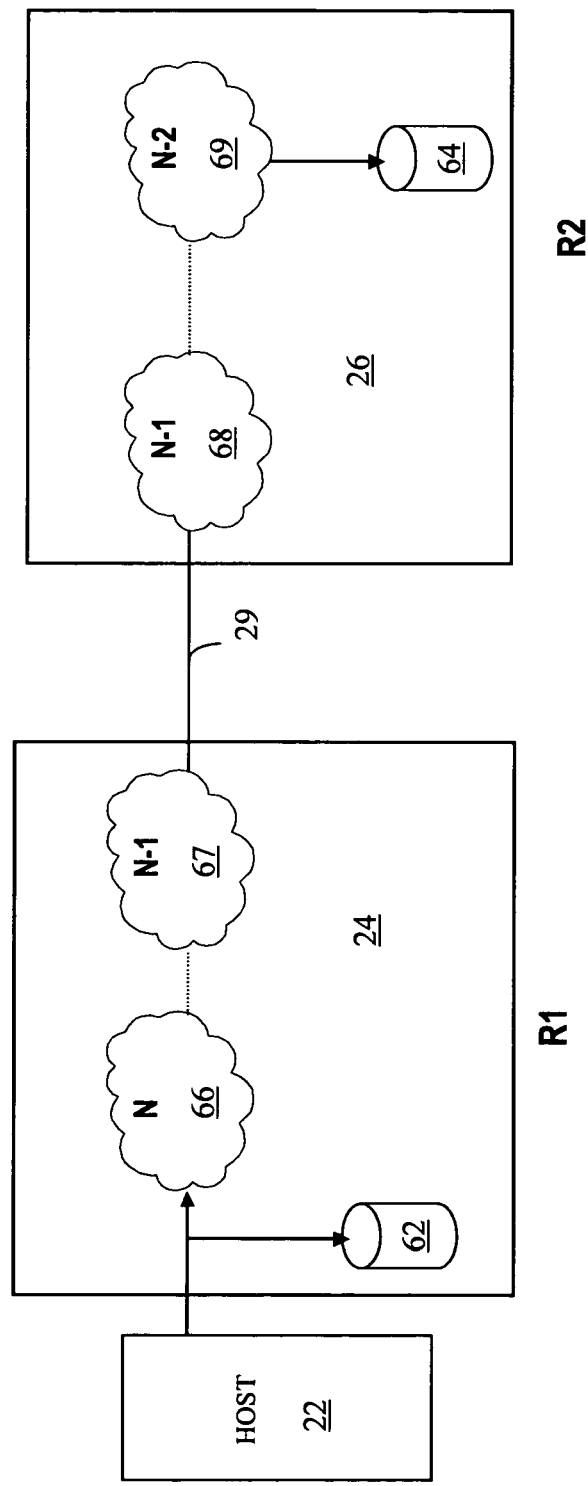
FIG. 3 is a schematic diagram showing a flow of data between a host, a local storage device, and a remote data storage device used in connection with an embodiment of the system described herein.

Referring to FIG. 3, a path of data is illustrated from the host 22 to the local storage device 24 and the remote storage device 26. Data written from the host 22 to the local storage device 24 is stored locally, as illustrated by the data element 62 of the local storage device 24. The data that is written by the host 22 to the local storage device 24 is also maintained by the local storage device 24 in connection with being sent by the local storage device 24 to the remote storage device 26 via the link 29.

In the system described herein, each data write by the host 22 (of, for example a record, a plurality of records, a track, etc.) is assigned a sequence number. The sequence number may be provided in an appropriate data field associated with the write. In FIG. 3, the writes by the host 22 are shown as being assigned sequence number N. All of the writes performed by the host 22 that are assigned sequence number N are collected in a single chunk of data 66. The chunk 66 represents a plurality of separate writes by the host 22 that occur at approximately the same time.

Generally, the local storage device 24 accumulates chunks of one sequence number while transmitting a previously accumulated chunk (having the previous sequence number) to the remote storage device 26. Thus, while the local storage device 24 is accumulating writes from the host 22 that are assigned sequence number N, the writes that occurred for the previous sequence number (N−1) are transmitted by the local storage device 24 to the remote storage device 26 via the link 29. A chunk 67 represents writes from the host 22 that were assigned the sequence number N−1 that have not been transmitted yet to the remote storage device 26.

The remote storage device 26 receives the data from the chunk 67 corresponding to writes assigned a sequence number N−1 and constructs a new chunk 68 of host writes having sequence number N−1. The data may be transmitted using appropriate RDF protocol that acknowledges data sent across the link 29. When the remote storage device 26 has received all of the data from the chunk 67, the local storage device 24 sends a commit message to the remote storage device 26 to commit all the data assigned the N−1 sequence number corresponding to the chunk 68. Generally, once a chunk corresponding to a particular sequence number is committed, that chunk may be written to the logical storage device. This is illustrated in FIG. 3 with a chunk 69 corresponding to writes assigned sequence number N−2 (i.e., two before the current sequence number being used in connection with writes by the host 22 to the local storage device 24).

In FIG. 3, the chunk 69 is shown as being written to a data element 64 representing disk storage for the remote storage device 26. Thus, the remote storage device 26 is receiving and accumulating the chunk 68 corresponding to sequence number N−1 while the chunk 69 corresponding to the previous sequence number (N−2) is being written to disk storage of the remote storage device 26 illustrated by the data element 64. In some embodiments, the data for the chunk 69 is marked for write (but not necessarily written immediately), while the data for the chunk 68 is not.

Thus, in operation, the host 22 writes, to the local storage device 24, data that is stored locally in the data element 62 and accumulated in the chunk 66. Once all of the data for a particular sequence number has been accumulated (described elsewhere herein), the local storage device 24 increments the sequence number. Data from the chunk 67 corresponding to one less than the current sequence number is transferred from the local storage device 24 to the remote storage device 26 via the link 29. The chunk 69 corresponds to data for a sequence number that was committed by the local storage device 24 sending a message to the remote storage device 26. Data from the chunk 69 is written to disk storage of the remote storage device 26.

Note that the writes within a particular one of the chunks 66-69 are not necessarily ordered. However, as described in more detail elsewhere herein, every write for the chunk 69 corresponding to sequence number N−2 was begun prior to beginning any of the writes for the chunks 67, 68 corresponding to sequence number N−1. In addition, every write for the chunks 67, 68 corresponding to sequence number N−1 was begun prior to beginning any of the writes for the chunk 66 corresponding to sequence number N. Thus, in the event of a communication failure between the local storage device 24 and the remote storage device 26, the remote storage device 26 may simply finish writing the last committed chunk of data (the chunk 69 in the example of FIG. 3) and can be assured that the state of the data at the remote storage device 26 is ordered in the sense that the data element 64 contains all of the writes that were begun prior to a certain point in time and contains no writes that were begun after that point in time. Thus, R2 always contains a point in time copy of R1 and it is possible to reestablish a consistent image from the R2 device.

Figure 4:
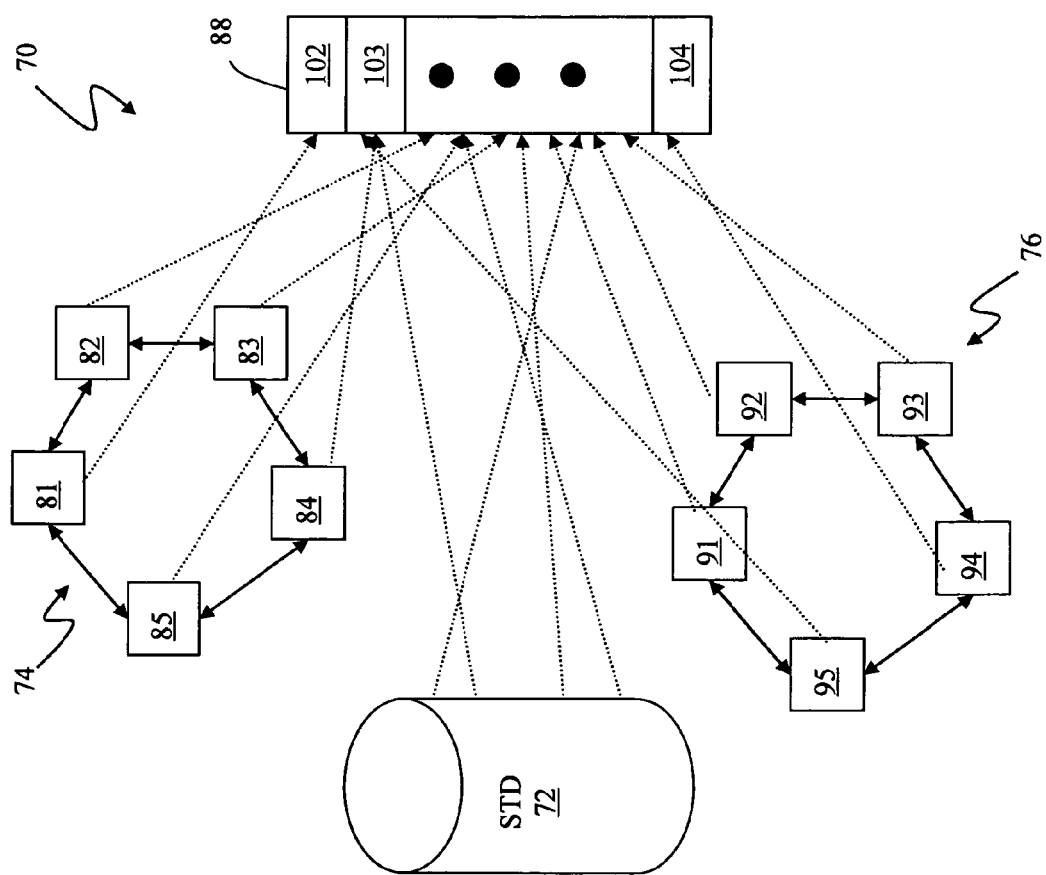
FIG. 4 is a schematic diagram illustrating items for constructing and manipulating chunks of data on a local storage device according to an embodiment of the system described herein.

Referring to FIG. 4, a diagram 70 illustrates items used to construct and maintain the chunks 66, 67. A standard logical device 72 contains data written by the host 22 and corresponds to the data element 62 of FIG. 3 and the disks 33a-33c of FIG. 1.

Two linked lists of pointers 74, 76 are used in connection with the standard logical device 72. The linked lists 74, 76 correspond to data that may be stored, for example, in the memory 37 of the local storage device 24. The linked list 74 contains a plurality of pointers 81-85, each of which points to a slot of a cache 88 used in connection with the local storage device 24. Similarly, the linked list 76 contains a plurality of pointers 91-95, each of which points to a slot of the cache 88. In some embodiments, the cache 88 may be provided in the memory 37 of the local storage device 24. The cache 88 contains a plurality of cache slots 102-104 that may be used in connection to writes to the standard logical device 72 and, at the same time, used in connection with the linked lists 74, 76.

Each of the linked lists 74, 76 may be used for one of the chunks of data 66, 67 so that, for example, the linked list 74 may correspond to the chunk of data 66 for sequence number N while the linked list 76 may correspond to the chunk of data 67 for sequence number N−1. Thus, when data is written by the host 22 to the local storage device 24, the data is provided to the cache 88 and, in some cases (described elsewhere herein), an appropriate pointer of the linked list 74 is created. Note that the data will not be removed from the cache 88 until the data is destaged to the standard logical device 72 and the data is also no longer pointed to by one of the pointers 81-85 of the linked list 74, as described elsewhere herein.

In an embodiment herein, one of the linked lists 74, 76 is deemed "active" while the other is deemed "inactive". Thus, for example, when the sequence number N is even, the linked list 74 may be active while the linked list 76 is inactive. The active one of the linked lists 74, 76 handles writes from the host 22 while the inactive one of the linked lists 74, 76 corresponds to the data that is being transmitted from the local storage device 24 to the remote storage device 26.

While the data that is written by the host 22 is accumulated using the active one of the linked lists 74, 76 (for the sequence number N), the data corresponding to the inactive one of the linked lists 74, 76 (for previous sequence number N−1) is transmitted from the local storage device 24 to the remote storage device 26. The RA's 30a-30c use the linked lists 74, 76 to determine the data to transmit from the local storage device 24 to the remote storage device 26.

Once data corresponding to a particular one of the pointers in one of the linked lists 74, 76 has been transmitted to the remote storage device 26, the particular one of the pointers may be removed from the appropriate one of the linked lists 74, 76. In addition, the data may also be marked for removal from the cache 88 (i.e., the slot may be returned to a pool of slots for later, possibly unrelated, use) provided that the data in the slot is not otherwise needed for another purpose (e.g., to be destaged to the standard logical device 72). A mechanism may be used to ensure that data is not removed from the cache 88 until all devices are no longer using the data. Such a mechanism is described, for example, in U.S. Pat. No. 5,537,568 titled "SYSTEM FOR DYNAMICALLY CONTROLLING CACHE MANAGER MAINTAINING CACHE INDEX AND CONTROLLING SEQUENTIAL DATA ACCESS" to Yanai, et al. and in U.S. Pat. No. 6,594,742 titled "CACHE MANAGEMENT VIA STATISTICALLY ADJUSTED SLOT AGING" to Josef Ezra, both of which are incorporated by reference herein.

Figure 5:
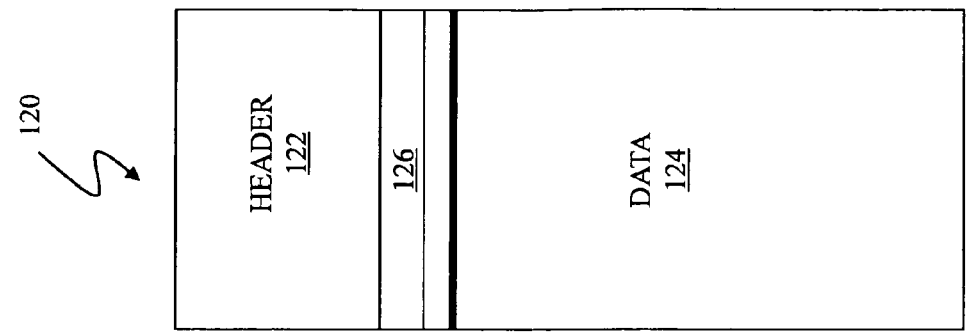
FIG. 5 is a diagram illustrating a data structure for a slot used in connection with an embodiment of the system described herein.

Referring to FIG. 5, a slot 120, like one of the slots 102-104 of the cache 88, includes a header 122 and data 124. The header 122 corresponds to overhead information used by the system to manage the slot 120. The data 124 is the corresponding data from the disk that is being (temporarily) stored in the slot 120. Information in the header 122 includes pointers back to the disk, time stamp(s), etc.

The header 122 also includes a cache stamp 126 used in connection with the system described herein. In an embodiment herein, the cache stamp 126 is eight bytes. Two of the bytes are a "password" that indicates whether the slot 120 is being used by the system described herein. In other embodiments, the password may be one byte while the following byte is used for a pad. As described elsewhere herein, the two bytes of the password (or one byte, as the case may be) being equal to a particular value indicates that the slot 120 is pointed to by at least one entry of the linked lists 74, 76. The password not being equal to the particular value indicates that the slot 120 is not pointed to by an entry of the linked lists 74, 76. Use of the password is described elsewhere herein.

The cache stamp 126 also includes a two byte field indicating the sequence number (e.g., N, N−1, N−2, etc.) of the data 124 of the slot 120. As described elsewhere herein, the sequence number field of the cache stamp 126 may be used to facilitate processing. The remaining four bytes of the cache stamp 126 may be used for a pointer, as described elsewhere herein. Of course, the two bytes of the sequence number and the four bytes of the pointer are only valid when the password equals the particular value that indicates that the slot 120 is pointed to by at least one entry in one of the lists 74, 76.

Figure 6:
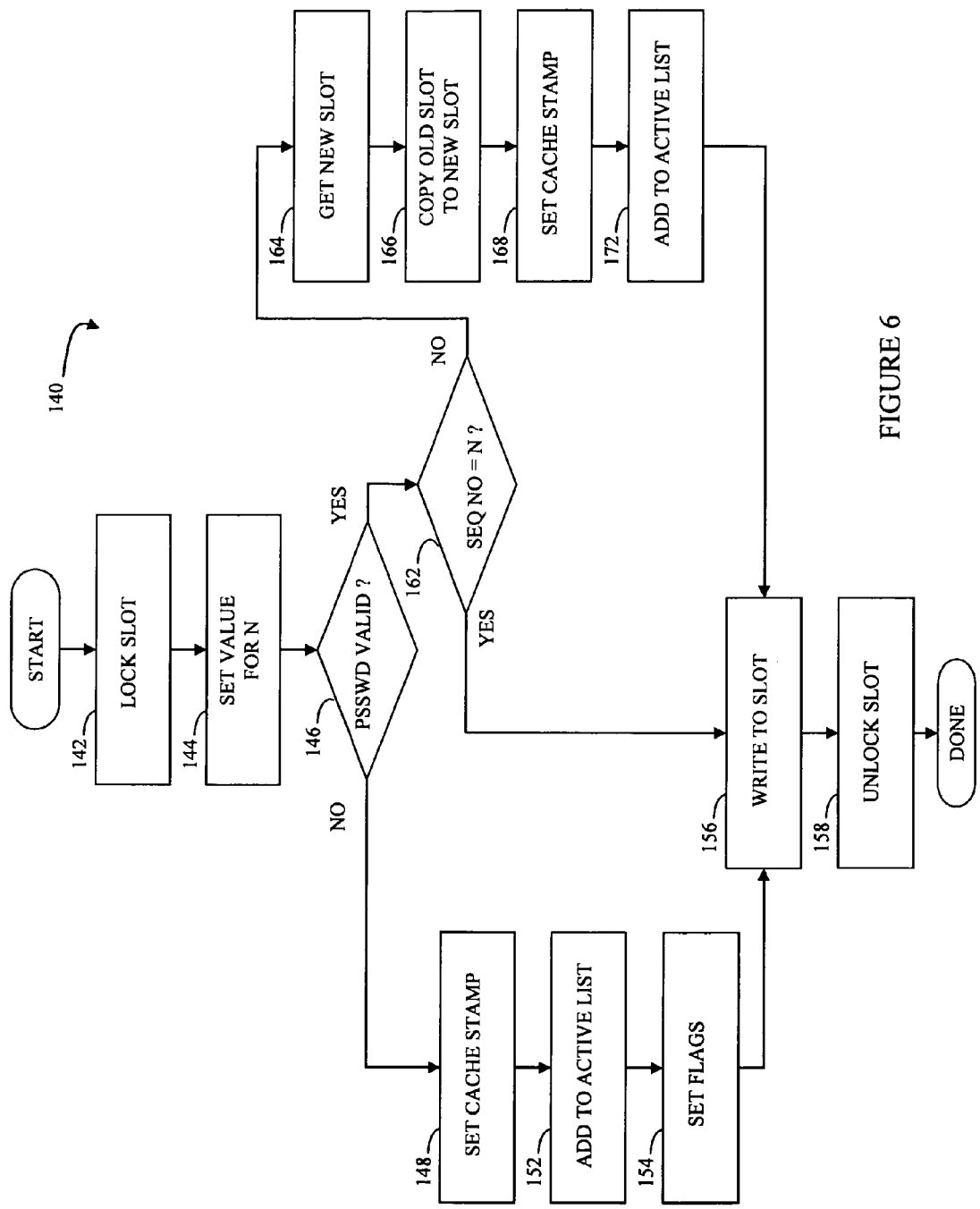
FIG. 6 is a flow chart illustrating operation of a host adaptor (HA) in response to a write by a host according to an embodiment of the system described herein.

Referring to FIG. 6, a flow chart 140 illustrates steps performed by the HA 28 in connection with a host 22 performing a write operation. Of course, when the host 22 performs a write, processing occurs for handling the write in a normal fashion irrespective of whether the data is part of an R1/R2 RDF group. For example, when the host 22 writes data for a portion of the disk, the write occurs to a cache slot which is eventually destaged to the disk. The cache slot may either be a new cache slot or may be an already existing cache slot created in connection with a previous read and/or write operation to the same track.

Processing begins at a first step 142 where a slot corresponding to the write is locked. In an embodiment herein, each of the slots 102-104 of the cache 88 corresponds to a track of data on the standard logical device 72. Locking the slot at the step 142 prevents additional processes from operating on the relevant slot during the processing performed by the HA 28 corresponding to the steps of the flow chart 140.

Following step 142 is a step 144 where a value for N, the sequence number, is set. As discussed elsewhere herein, the value for the sequence number obtained at the step 144 is maintained during the entire write operation performed by the HA 28 while the slot is locked. As discussed elsewhere herein, the sequence number is assigned to each write to set the one of the chunks of data 66, 67 to which the write belongs. Writes performed by the host 22 are assigned the current sequence number. It is useful that a single write operation maintain the same sequence number throughout.

Following the step 144 is a test step 146 which determines if the password field of the cache slot is valid. As discussed above, the system described herein sets the password field to a predetermined value to indicate that the cache slot is already in one of the linked lists of pointers 74, 76. If it is determined at the test step 146 that the password field is not valid (indicating that the slot is new and that no pointers from the lists 74, 76 point to the slot), then control passes from the step 146 to a step 148, where the cache stamp of the new slot is set by setting the password to the predetermined value, setting the sequence number field to N, and setting the pointer field to Null. In other embodiments, the pointer field may be set to point to the slot itself.

Following the step 148 is a step 152 where a pointer to the new slot is added to the active one of the pointer lists 74, 76. In an embodiment herein, the lists 74, 76 are circular doubly linked lists, and the new pointer is added to the circular doubly linked list in a conventional fashion. Of course, other appropriate data structures could be used to manage the lists 74, 76. Following the step 152 is a step 154 where flags are set. At the step 154, the RDF_WP flag (RDF write pending flag) is set to indicate that the slot needs to be transmitted to the remote storage device 26 using RDF. In addition, at the step 154, the IN_CACHE flag is set to indicate that the slot needs to be destaged to the standard logical device 72. Following the step 154 is a step 156 where the data being written by the host 22 and the HA 28 is written to the slot. Following the step 156 is a step 158 where the slot is unlocked. Following step 158, processing is complete.

If it is determined at the test step 146 that the password field of the slot is valid (indicating that the slot is already pointed to by at least one pointer of the lists 74, 76), then control transfers from the step 146 to a test step 162, where it is determined whether the sequence number field of the slot is equal to the current sequence number, N. Note that there are two valid possibilities for the sequence number field of a slot with a valid password. It is possible for the sequence number field to be equal to N, the current sequence number. This occurs when the slot corresponds to a previous write with sequence number N. The other possibility is for the sequence number field to equal N−1. This occurs when the slot corresponds to a previous write with sequence number N−1. Any other value for the sequence number field is invalid. Thus, for some embodiments, it may be possible to include error/validity checking in the step 162 or possibly make error/validity checking a separate step. Such an error may be handled in any appropriate fashion, which may include providing a message to a user.

If it is determined at the step 162 that the value in the sequence number field of the slot equals the current sequence number N, then no special processing is required and control transfers from the step 162 to the step 156, discussed above, where the data is written to the slot. Otherwise, if the value of the sequence number field is N−1 (the only other valid value), then control transfers from the step 162 to a step 164 where a new slot is obtained. The new slot obtained at the step 164 may be used to store the data being written.

Following the step 164 is a step 166 where the data from the old slot is copied to the new slot that was obtained at the step 164. Note that the copied data includes the RDF_WP flag, which should have been set at the step 154 on a previous write when the slot was first created. Following the step 166 is a step 168 where the cache stamp for the new slot is set by setting the password field to the appropriate value, setting the sequence number field to the current sequence number, N, and setting the pointer field to point to the old slot. Following the step 168 is a step 172 where a pointer to the new slot is added to the active one of the linked lists 74, 76. Following the step 172 is the step 156, discussed above, where the data is written to the slot which, in this case, is the new slot.

Figure 7:
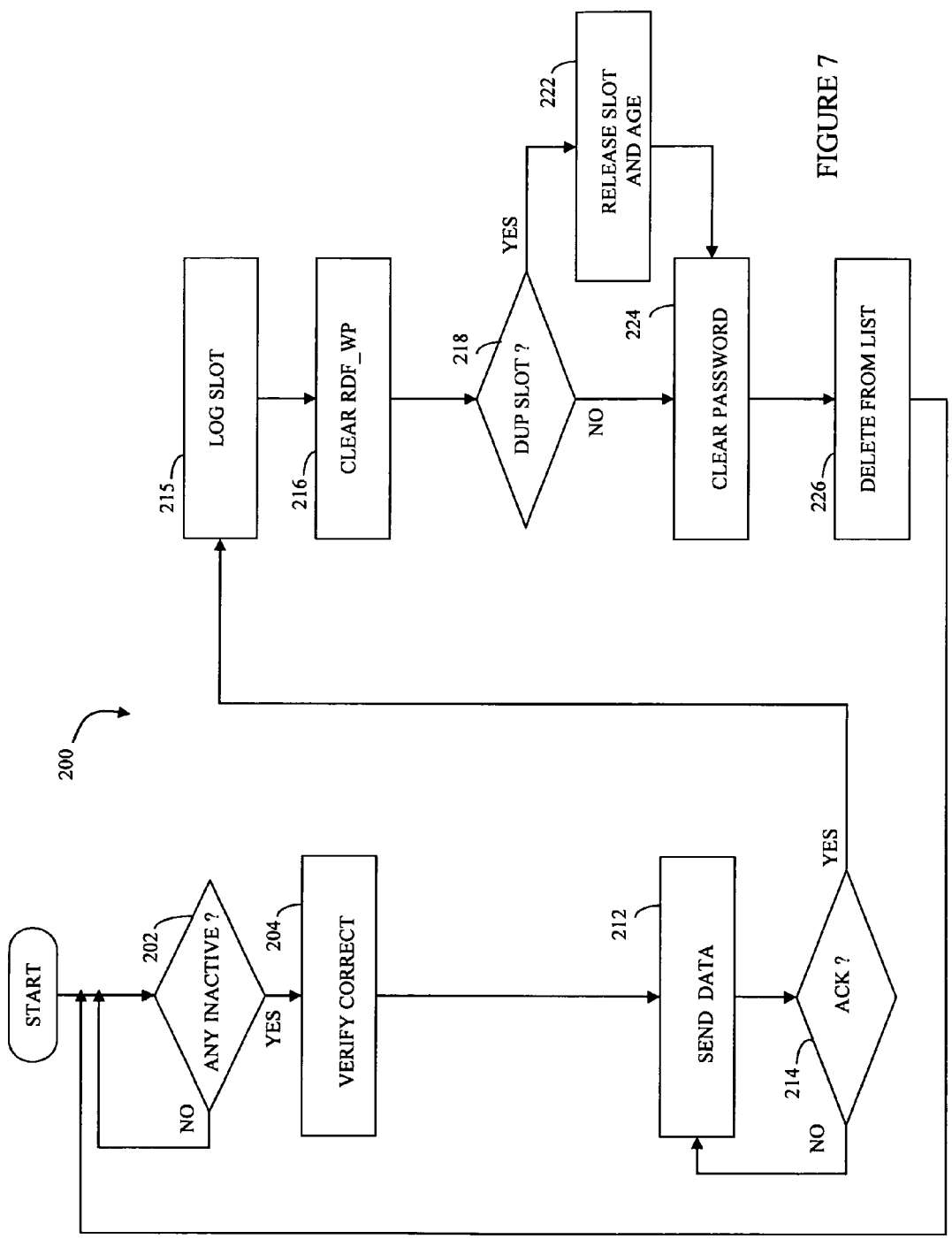
FIG. 7 is a flow chart illustrating transferring data from a local storage device to a remote storage device according to an embodiment of the system described herein.

Referring to FIG. 7, a flow chart 200 illustrates steps performed in connection with the RA's 30a-30c scanning the inactive one of the lists 72, 74 to transmit RDF data from the local storage device 24 to the remote storage device 26. As discussed above, the inactive one of the lists 72, 74 points to slots corresponding to the N−1 cycle for the R1 device when the N cycle is being written to the R1 device by the host using the active one of the lists 72, 74.

Processing begins at a first step 202 where it is determined if there are any entries in the inactive one of the lists 72, 74. As data is transmitted, the corresponding entries are removed from the inactive one of the lists 72, 74. In addition, new writes are provided to the active one of the lists 72, 74 and not generally to the inactive one of the lists 72, 74. Thus, it is possible (and desirable, as described elsewhere herein) for the inactive one of the lists 72, 74 to contain no data at certain times. If it is determined at the step 202 that there is no data to be transmitted, then the inactive one of the lists 72, 74 is continuously polled until data becomes available. Data for sending becomes available in connection with a cycle switch (discussed elsewhere herein) where the inactive one of the lists 72, 74 becomes the active one of the lists 72, 74, and vice versa.

If it is determined at the step 202 that there is data available for sending, control transfers from the step 202 to a step 204, where the slot is verified as being correct. The processing performed at the step 204 is an optional check that may include verifying that the password field is correct and verifying that the sequence number field is correct. If there is incorrect (unexpected) data in the slot, error processing may be performed, which may include notifying a user of the error and possibly error recovery processing.

Following the step 204 is a step 212, where the data is sent via RDF in a conventional fashion. In an embodiment herein, the entire slot is not transmitted. Rather, only records within the slot that have the appropriate mirror bits set (indicating the records have changed) are transmitted to the remote storage device 26. However, in other embodiments, it may be possible to transmit the entire slot, provided that the remote storage device 26 only writes data corresponding to records having appropriate mirror bits set and ignores other data for the track, which may or may not be valid. Following the step 212 is a test step 214 where it is determined if the data that was transmitted has been acknowledged by the R2 device. If not, the data is resent, as indicated by the flow from the step 214 back to the step 212. In other embodiments, different and more involved processing may be used to send data and acknowledge receipt thereof. Such processing may include error reporting and alternative processing that is performed after a certain number of attempts to send the data have failed.

Once it is determined at the test step 214 that the data has been successfully sent, control passes from the step 214 to a step 215 where the data that has been sent is logged. In an embodiment herein, each track from an inactive cycle that is successfully transmitted from the R1 device to the R2 device is written to a transfer log that contains a list of all inactive tracks that are successfully sent. The transfer log may be used for data recovery, as discussed in more detail elsewhere herein. The transfer log may be no longer needed once the entire inactive cycle has been sent and the R2 device acknowledges receipt of all of the inactive cycle data (discussed in more detail elsewhere here). The transfer log may be provided using any appropriate mechanism. In an embodiment herein, the transfer log may be provided using one or more otherwise-unused cache slots (like the slots 102-104 of FIG. 4), where multiple entries indicating logged tracks are provided in each slot using an appropriate mechanism, such as a table or a linked list. Thus, for example, each logged track and/or modified portions thereof may be identified using a two-byte (or four-byte, or six-byte, etc.) identifier within the slot. The one or more cache slots used for the transfer log may be pointed to by one or more entries in the lists 74, 76 where, for example, the transfer log cache slots may be the first or the last entries on the lists 74, 76. Of course, the transfer log is different from the list of slots needing to be transferred.

Following the step 215, control passes to a step 216 to clear the RDF_WP flag (since the data has been successfully sent via RDF). Following the step 216 is a test step 218 where it is determined if the slot is a duplicate slot created in connection with a write to a slot already having an existing entry in the active one of the lists 72, 74. This possibility is discussed above in connection with the steps 162, 164, 166, 168, 172. If it is determined at the step 218 that the slot is a duplicate slot, then control passes from the step 218 to a step 222 where the slot is returned to the pool of available slots (to be reused). In addition, the slot may also be aged (or have some other appropriate mechanism applied thereto) to provide for immediate reuse ahead of other slots since the data provided in the slot is not valid for any other purpose. Following the step 222 or the step 218 if the slot is not a duplicate slot is a step 224 where the password field of the slot header is cleared so that when the slot is reused, the test at the step 146 of FIG. 6 properly classifies the slot as a new slot.

Following the step 224 is a step 226 where the entry in the inactive one of the lists 72, 74 is removed. Following the step 226, control transfers back to the step 202, discussed above, where it is determined if there are additional entries on the inactive one of the lists 72, 74 corresponding to data needing to be transferred. Note that FIG. 7 does not show steps for locking and unlocking slots to control access by other (unrelated) processes. However, it is understood that such steps may be performed, as appropriate, to provide data consistency. For example, a slot may be locked prior to being sent at the step 212, and may be unlocked some time after performing the step 216.

Figure 8:
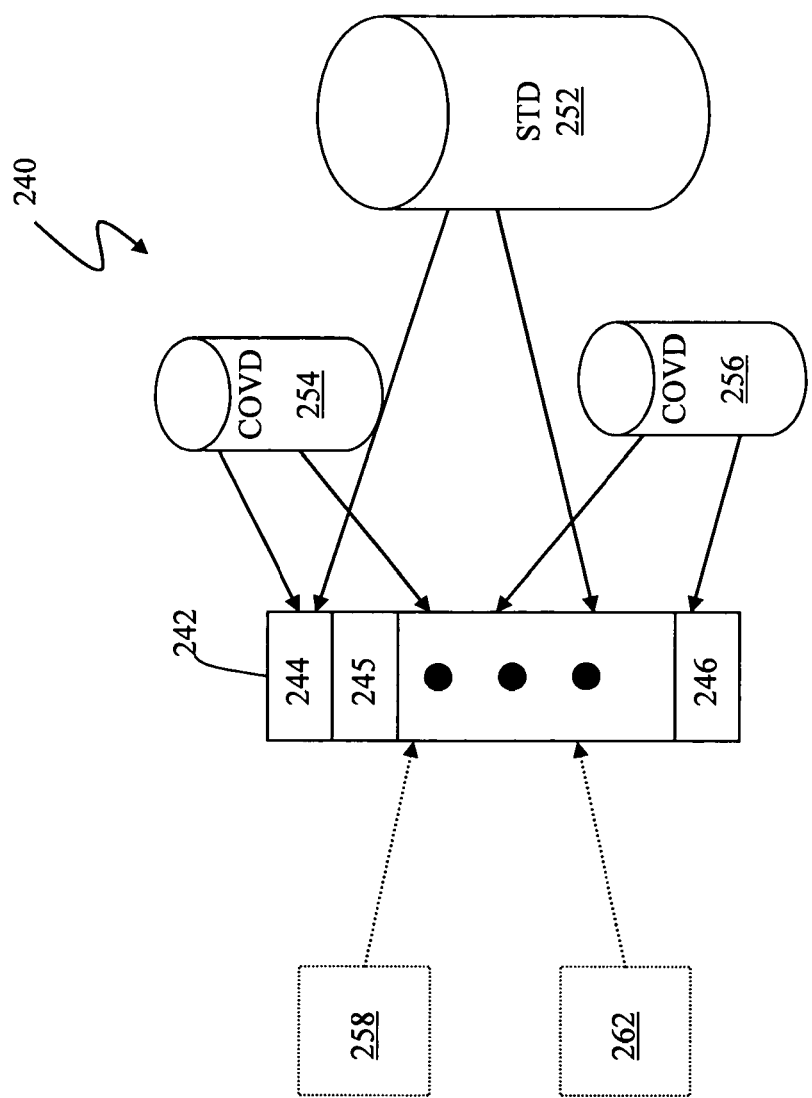
FIG. 8 is a schematic diagram illustrating items for constructing and manipulating chunks of data on a remote storage device according to an embodiment of the system described herein.

Referring to FIG. 8, a diagram 240 illustrates creation and manipulation of the chunks 68, 69 used by the remote storage device 26. Data that is received by the remote storage device 26, via the link 29, is provided to a cache 242 of the remote storage device 26. The cache 242 may be provided, for example, in the memory 38 of the remote storage device 26. The cache 242 includes a plurality of cache slots 244-246, each of which may be mapped to a track of a standard logical storage device 252. The cache 242 is similar to the cache 88 of FIG. 4 and may contain data that can be destaged to the standard logical storage device 252 of the remote storage device 26. The standard logical storage device 252 corresponds to the data element 64 shown in FIG. 3 and the disks 34a-34c shown in FIG. 1.

The remote storage device 26 also contains a pair of cache only virtual devices (COVD) 254, 256. The cache only virtual devices 254, 256 corresponded device tables that may be stored, for example, in the memory 38 of the remote storage device 26. Each track entry of the tables of each of the COVDs 254, 256 point to either a track of the standard logical device 252 or point to a slot of the cache 242. Cache only virtual devices are described in U.S. Pat. No. 7,113,945 titled "VIRTUAL STORAGE DEVICE THAT USES VOLATILE MEMORY" to Moreshet, et al., which is incorporated by reference herein. Note, however, that the functionality described herein in connection with the COVDs may be implemented generally using tables having appropriate pointers that may point to cache slots as described herein.

The plurality of cache slots 244-246 may be used in connection to writes to the standard logical device 252 and, at the same time, used in connection with the cache only virtual devices 254, 256. In an embodiment herein, each of track table entries of the cache only virtual devices 254, 256 contain a null to indicate that the data for that track is stored on a corresponding track of the standard logical device 252. Otherwise, an entry in the track table for each of the cache only virtual devices 254, 256 contains a pointer to one of the slots 244-246 in the cache 242.

Each of the cache only virtual devices 254, 256 corresponds to one of the data chunks 68, 69. Thus, for example, the cache only virtual device 254 may correspond to the data chunk 68 while the cache only virtual device 256 may correspond to the data chunk 69. In an embodiment herein, one of the cache only virtual devices 254, 256 may be deemed "active" while the other one of the cache only virtual devices 254, 256 may be deemed "inactive". The inactive one of the cache only virtual devices 254, 256 may correspond to data being received from the local storage device 24 (i.e., the chunk 68) while the active one of the cache only virtual device 254, 256 corresponds to data being restored (written) to the standard logical device 252 (i.e., the chunk 69).

Data from the local storage device 24 that is received via the link 29 may be placed in one of the slots 244-246 of the cache 242. A corresponding pointer of the inactive one of the cache only virtual devices 254, 256 may be set to point to the received data. Subsequent data having the same sequence number may be processed in a similar manner. At some point, the local storage device 24 provides a message committing all of the data sent using the same sequence number. Once the data for a particular sequence number has been committed, the inactive one of the cache only virtual devices 254, 256 becomes active and vice versa. At that point, data from the now active one of the cache only virtual devices 254, 256 is copied to the standard logical device 252 while the inactive one of the cache only virtual devices 254, 256 is used to receive new data (having a new sequence number) transmitted from the local storage device 24 to the remote storage device 26.

As data is removed from the active one of the cache only virtual devices 254, 256 (discussed elsewhere herein), the corresponding entry in the active one of the cache only virtual devices 254, 256 may be set to null. In addition, the data may also be removed from the cache 244 (i.e., the slot returned to the pool of free slots for later use) provided that the data in the slot is not otherwise needed for another purpose (e.g., to be destaged to the standard logical device 252). A mechanism may be used to ensure that data is not removed from the cache 242 until all mirrors (including the cache only virtual devices 254, 256) are no longer using the data. Such a mechanism is described, for example, in U.S. Pat. No. 5,537,568 titled "SYSTEM FOR DYNAMICALLY CONTROLLING CACHE MANAGER MAINTAINING CACHE INDEX AND CONTROLLING SEQUENTIAL DATA ACCESS" to Yanai, et al. and in U.S. Pat. No. 6,594,742 titled "CACHE MANAGEMENT VIA STATISTICALLY ADJUSTED SLOT AGING" to Josef Ezra, both of which are incorporated by reference herein.

In some embodiments discussed elsewhere herein, the remote storage device 26 may maintain linked lists 258, 262 like the lists 74, 76 used by the local storage device 24. The lists 258, 262 may contain information that identifies the slots of the corresponding cache only virtual devices 254, 256 that have been modified, where one of the lists 258, 262 corresponds to one of the cache only virtual devices 254, 256 and the other one of the lists 258, 262 corresponds to the other one of the cache only virtual devices 254, 256. As discussed elsewhere herein, the lists 258, 262 may be used to facilitate restoring data from the cache only virtual devices 254, 256 to the standard logical device 252.

Figure 9:
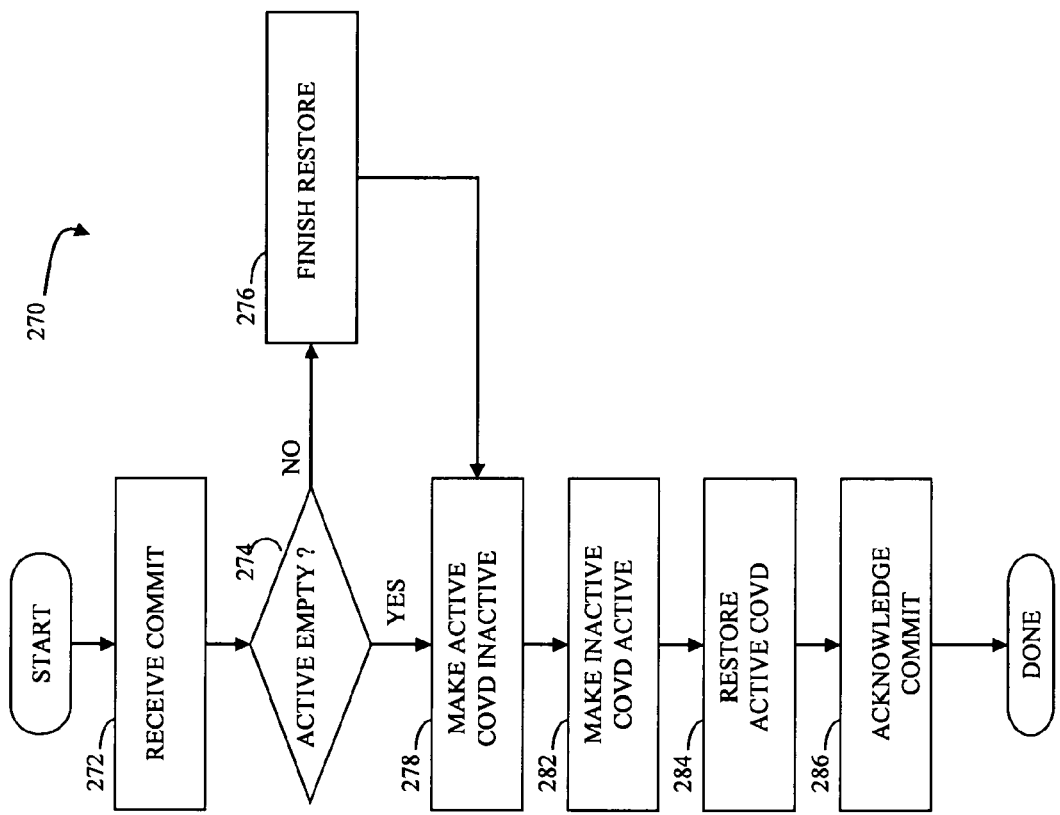
FIG. 9 is a flow chart illustrating steps performed by a remote storage device in connection with receiving a commit indicator from a local storage device according to an embodiment of the system described herein.

Referring to FIG. 9, a flow chart 270 illustrates steps performed by the remote storage device 26 in connection with processing data for a sequence number commit transmitted by the local storage device 24 to the remote storage device 26. As discussed elsewhere herein, the local storage device 24 periodically increments sequence numbers. When this occurs, the local storage device 24 finishes transmitting all of the data for the previous sequence number and then sends a commit message for the previous sequence number.

Processing begins at a first step 272 where the commit message is received. Following the step 272 is a test step 274 which determines if the active one of the cache only virtual devices 254, 256 of the remote storage device 26 is empty. As discussed elsewhere herein, the inactive one of the cache only virtual devices 254, 256 of the remote storage device 26 is used to accumulate data from the local storage device 24 sent using RDF while the active one of the cache only virtual devices 254, 256 is restored to the standard logical device 252.

If it is determined at the test step 274 that the active one of the cache only virtual devices 254, 256 is not empty, then control transfers from the test step 274 to a step 276 where the restore for the active one of the cache only virtual devices 254, 256 is completed prior to further processing being performed. Restoring data from the active one of the cache only virtual devices 254, 256 is described in more detail elsewhere herein. It is useful that the active one of the cache only virtual devices 254, 256 is empty prior to handling the commit and beginning to restore data for the next sequence number.

Following the step 276 or following the step 274 if the active one of the cache only virtual devices 254, 256 is determined to be empty, is a step 278 where the active one of the cache only virtual devices 254, 256 is made inactive. Following the step 278 is a step 282 where the previously inactive one of the cache only virtual devices 254, 256 (i.e., the one that was inactive prior to execution of the step 278) is made active. Swapping the active and inactive cache only virtual devices 254, 256 at the steps 278, 282 prepares the now inactive (and empty) one of the cache only virtual devices 254, 256 to begin to receive data from the local storage device 24 for the next sequence number.

Following the step 282 is a step 284 where the active one of the cache only virtual devices 254, 256 is restored to the standard logical device 252 of the remote storage device 26. Restoring the active one of the cache only virtual devices 254, 256 to the standard logical device 252 is described in more detail hereinafter. However, note that, in some embodiments, the restore process is begun, but not necessarily completed, at the step 284. Following the step 284 is a step 286 where the commit that was sent from the local storage device 24 to the remote storage device 26 is acknowledged back to the local storage device 24 so that the local storage device 24 is informed that the commit was successful. Following the step 286, processing is complete.

Figure 10:
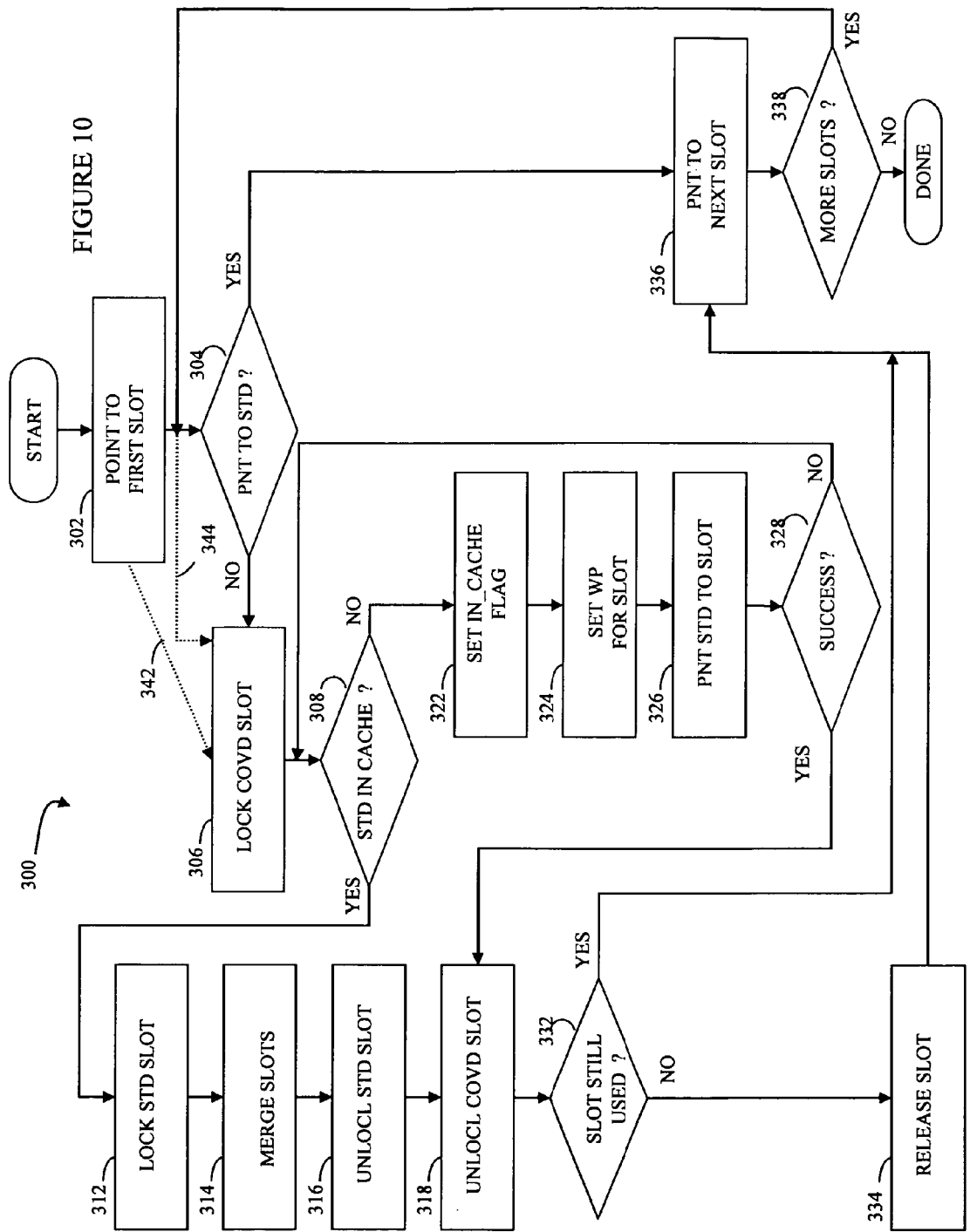
FIG. 10 is a flow chart illustrating storing transmitted data at a remote storage device according to an embodiment of the system described herein.

Referring to FIG. 10, a flow chart 300 illustrates in more detail the steps 276, 284 of FIG. 9 where the remote storage device 26 restores the active one of the cache only virtual devices 254, 256. Processing begins at a first step 302 where a pointer is set to point to the first slot of the active one of the cache only virtual devices 254, 256. The pointer is used to iterate through each track table entry of the active one of the cache only virtual devices 254, 256, each of which is processed individually. Following the step 302 is a test step 304 where it is determined if the track of the active one of the cache only virtual devices 254, 256 that is being processed points to the standard logical device 252. If so, then there is nothing to restore. Otherwise, control transfers from the step 304 to a step a 306 where the corresponding slot of the active one of the cache only virtual devices 254, 256 is locked.

Following the step 306 is a test step 308 where it is determined if the corresponding slot of the standard logical device 252 is already in the cache of the remote storage device 26. If so, then control transfers from the test step 308 to a step 312 where the slot of the standard logical device is locked. Following step 312 is a step 314 where the data from the active one of the cache only virtual devices 254, 256 is merged with the data in the cache for the standard logical device 252. Merging the data at the step 314 involves overwriting the data for the standard logical device with the new data of the active one of the cache only virtual devices 254, 256. Note that, in embodiments that provide for record level flags, it may be possible to simply OR the new records from the active one of the cache only virtual devices 254, 256 to the records of the standard logical device 252 in the cache. That is, if the records are interleaved, then it is only necessary to use the records from the active one of the cache only virtual devices 254, 256 that have changed and provide the records to the cache slot of the standard logical device 252. Following step 314 is a step 316 where the slot of the standard logical device 252 is unlocked. Following step 316 is a step 318 where the slot of the active one of the cache only virtual devices 254, 256 that is being processed is also unlocked.

If it is determined at the test step 308 that the corresponding slot of the standard logical device 252 is not in cache, then control transfers from the test step 308 to a step 322 where the track entry for the slot of the standard logical device 252 is changed to indicate that the slot of the standard logical device 252 is in cache (e.g., an IN_CACHE flag may be set) and needs to be destaged. As discussed elsewhere herein, in some embodiments, only records of the track having appropriate mirror bits set may need to be destaged. Following the step 322 is a step 324 where a flag for the track may be set to indicate that the data for the track is in the cache.

Following the step 324 is a step 326 where the slot pointer for the standard logical device 252 is changed to point to the slot in the cache. Following the step 326 is a test step 328 which determines if the operations performed at the steps 322, 324, 326 have been successful. In some instances, a single operation called a "compare and swap" operation may be used to perform the steps 322, 324, 326. If these operations are not successful for any reason, then control transfers from the step 328 back to the step 308 to reexamine if the corresponding track of the standard logical device 252 is in the cache. Otherwise, if it is determined at the test step 328 that the previous operations have been successful, then control transfers from the test step 328 to the step 318, discussed above.

Following the step 318 is a test step 332 which determines if the cache slot of the active one of the cache only virtual devices 254, 256 (which is being restored) is still being used. In some cases, it is possible that the slot for the active one of the cache only virtual devices 254, 256 is still being used by another mirror. If it is determined at the test step 332 that the slot of the cache only virtual device is not being used by another mirror, then control transfers from the test step 332 to a step 334 where the slot is released for use by other processes (e.g., restored to pool of available slots, as discussed elsewhere herein). Following the step 334 is a step 336 to point to the next slot to process the next slot of the active one of the cache only virtual devices 254, 256. Note that the step 336 is also reached from the test step 332 if it is determined at the step 332 that the active one of the cache only virtual devices 254, 256 is still being used by another mirror. Note also that the step 336 is reached from the test step 304 if it is determined at the step 304 that, for the slot being processed, the active one of the cache only virtual devices 254, 256 points to the standard logical device 252. Following the step 336 is a test step 338 which determines if there are more slots of the active one of the cache only virtual devices 254, 256 to be processed. If not, processing is complete. Otherwise, control transfers from the test step 338 back to the step 304.

In another embodiment, it is possible to construct lists of modified slots for the received chunk of data 68 corresponding to the N−1 cycle on the remote storage device 26, such as the lists 258, 262 shown in FIG. 8. As the data is received, the remote storage device 26 constructs a linked list of modified slots. The lists that are constructed may be circular, linear (with a NULL termination), or any other appropriate design. The lists may then be used to restore the active one of the cache only virtual devices 254, 256.

The flow chart 300 of FIG. 10 shows two alternative paths 342, 344 that illustrate operation of embodiments where a list of modified slots is used. At the step 302, a pointer (used for iterating through the list of modified slots) is made to point to the first element of the list. Following the step 302 is the step 306, which is reached by the alternative path 342. In embodiments that use lists of modified slots, the test step 304 is not needed since no slots on the list should point to the standard logical device 252.

Following the step 306, processing continues as discussed above with the previous embodiment, except that the step 336 refers to traversing the list of modified slots rather than pointing to the next slot in the COVD. Similarly, the test at the step 338 determines if the pointer is at the end of the list (or back to the beginning in the case of a circular linked list). Also, if it is determined at the step 338 that there are more slots to process, then control transfers from the step 338 to the step 306, as illustrated by the alternative path 344. As discussed above, for embodiments that use a list of modified slots, the step 304 may be eliminated.

Figure 11:
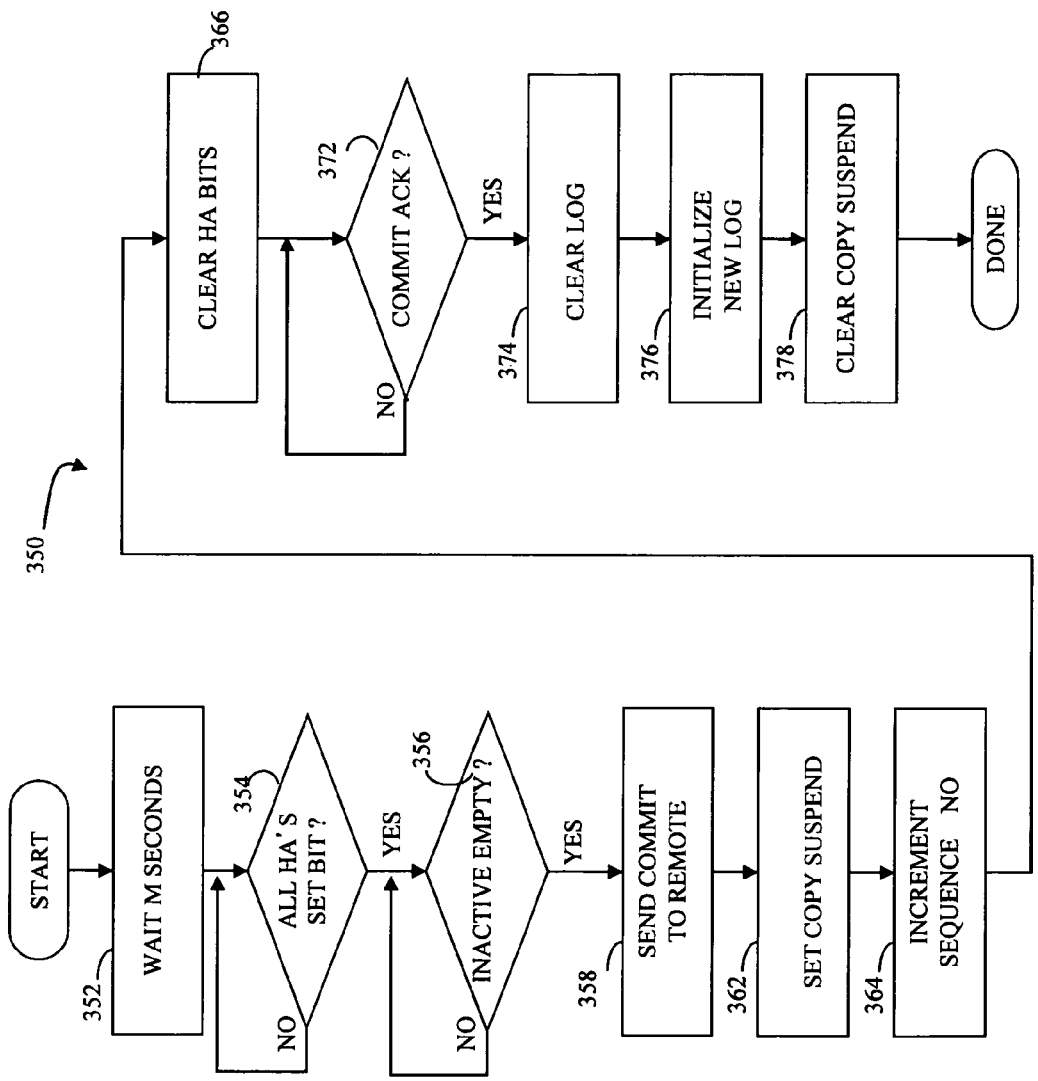
FIG. 11 is a flow chart illustrating steps performed in connection with a local storage device incrementing a sequence number according to an embodiment of the system described herein.

Referring to FIG. 11, a flow chart 350 illustrates steps performed in connection with the local storage device 24 increasing the sequence number. Processing begins at a first step 352 where the local storage device 24 waits at least M seconds prior to increasing the sequence number. In an embodiment herein, M is thirty, but of course M could be any number. Larger values for M increase the amount of data that may be lost if communication between the storage devices 24, 26 is disrupted. However, smaller values for M increase the total amount of overhead caused by incrementing the sequence number more frequently.

Following the step 352 is a test step 354 which determines if all of the HA's of the local storage device 24 have set a bit indicating that the HA's have completed all of the I/O's for a previous sequence number. When the sequence number changes, each of the HA's notices the change and sets a bit indicating that all I/O's of the previous sequence number are completed. For example, if the sequence number changes from N−1 to N, an HA will set the bit when the HA has completed all I/O's for sequence number N−1. Note that, in some instances, a single I/O for an HA may take a long time and may still be in progress even after the sequence number has changed. Note also that, for some systems, a different mechanism may be used to determine if all of the HA's have completed their N−1 PO's. The different mechanism may include examining device tables in the memory 37.

If it is determined at the test step 354 that PO's from the previous sequence number have been completed, then control transfers from the step 354 to a test step 356 which determines if the inactive one of the lists 74, 76 is empty. Note that a sequence number switch may not be made unless and until all of the data corresponding to the inactive one of the lists 74, 76 has been completely transmitted from the local storage device 24 to the remote storage device 26 using the RDF protocol. Once the inactive one of the lists 74, 76 is determined to be empty, then control transfers from the step 356 to a step 358 where the commit for the previous sequence number is sent from the local storage device 24 to the remote storage device 26. As discussed above, the remote storage device 26 receiving a commit message for a particular sequence number will cause the remote storage device 26 to begin restoring the data corresponding to the sequence number.

Following the step 358 is a step 362 where the copying of data for the inactive one of the lists 74, 76 is suspended. As discussed elsewhere herein, the inactive one of the lists is scanned to send corresponding data from the local storage device 24 to the remote storage device 26. It is useful to suspend copying data until the sequence number switch is completed. In an embodiment herein, the suspension is provided by sending a message to the RA's 30a-30c. However, it will be appreciated by one of ordinary skill in the art that for embodiments that use other components to facilitate sending data using the system described herein, suspending copying may be provided by sending appropriate messages/commands to the other components.

Following step 362 is a step 364 where the sequence number is incremented. Following step 364 is a step 366 where the bits for the HA's that are used in the test step 354 are all cleared so that the bits may be set again in connection with the increment of the sequence number. Following step 366 is a test step 372 which determines if the remote storage device 26 has acknowledged the commit message sent at the step 358. Acknowledging the commit message is discussed above in connection with FIG. 9.

Once it is determined that the remote storage device 26 has acknowledged the commit message sent at the step 358, control transfers from the step 372 to a step step 374 to clear (discard, erase, etc.) the transfer log that indicates which of the tracks (and/or portions thereof) of the previous inactive cycle have been transmitted to the R2 device. Following the step 374 is a step 376 where a new transfer log mechanism (i.e., a new slot) is initialized. Following step 376 is a step 378 where the suspension of copying, which was provided at the step 362, is cleared so that copying may resume. Following step 378, processing is complete. Note that it is also possible to go from the step 378 back to the step 352 to begin a new cycle to continuously increment the sequence number.

It is also possible to use COVD's on the R1 device to collect slots associated with active data and inactive chunks of data. In that case, just as with the R2 device, one COVD could be associated with the inactive sequence number and another COVD could be associated with the active sequence number. This is described below.

Figure 12:
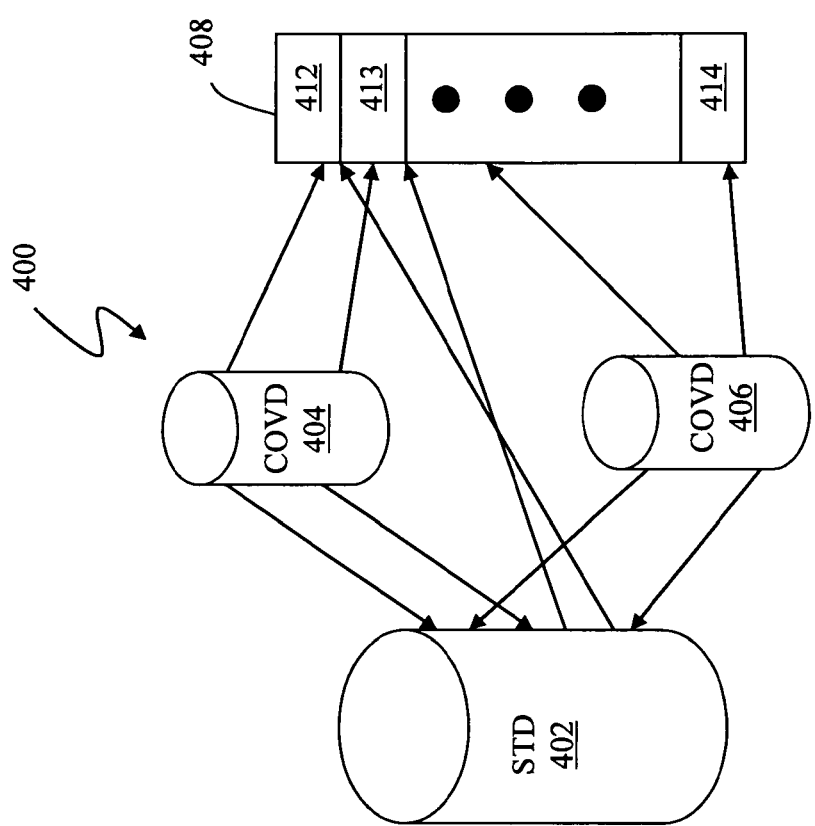
FIG. 12 is a schematic diagram illustrating items for constructing and manipulating chunks of data on a local storage device according to an alternative embodiment of the system described herein.

Referring to FIG. 12, a diagram 400 illustrates items used to construct and maintain the chunks 66, 67. A standard logical device 402 contains data written by the host 22 and corresponds to the data element 62 of FIG. 3 and the disks 33a-33c of FIG. 1. The standard logical device 402 contains data written by the host 22 to the local storage device 24.

Two cache only virtual devices 404, 406 are used in connection with the standard logical device 402. The cache only virtual devices 404, 406 correspond to device tables that may be stored, for example, in the memory 37 of the local storage device 24. Each track entry of the tables of each of the cache only virtual devices 404, 406 point to either a track of the standard logical device 402 or point to a slot of a cache 408 used in connection with the local storage device 24. In some embodiments, the cache 408 may be provided in the memory 37 of the local storage device 24.

The cache 408 contains a plurality of cache slots 412-414 that may be used in connection to writes to the standard logical device 402 and, at the same time, used in connection with the cache only virtual devices 404, 406. In an embodiment herein, each track table entry of the cache only virtual devices 404, 406 may point to a corresponding track of the standard logical device 402 or may point to one of the slots 412-414 in the cache 408.

Each of the cache only virtual devices 404, 406 may be used for one of the chunks of data 66, 67 so that, for example, the cache only virtual device 404 may correspond to the chunk of data 66 for sequence number N while the cache only virtual device 406 may correspond to the chunk of data 67 for sequence number N–1. Thus, when data is written by the host 22 to the local storage device 24, the data is provided to the cache 408 and an appropriate pointer of the cache only virtual device 404 is adjusted. Note that the data will not be removed from the cache 408 until the data is destaged to the standard logical device 402 and the data is also released by the cache only virtual device 404, as described elsewhere herein.

In an embodiment herein, one of the cache only virtual devices 404, 406 is deemed "active" while the other is deemed "inactive". Thus, for example, when the sequence number N is even, the cache only virtual device 404 may be active while the cache only virtual device 406 is inactive. The active one of the cache only virtual devices 404, 406 handles writes from the host 22 while the inactive one of the cache only virtual devices 404, 406 corresponds to the data that is being transmitted from the local storage device 24 to the remote storage device 26.

While the data that is written by the host 22 is accumulated using the active one of the cache only virtual devices 404, 406 (for the sequence number N), the data corresponding to the inactive one of the cache only virtual devices 404, 406 (for previous sequence number N–1) is transmitted from the local storage device 24 to the remote storage device 26. For this and related embodiments, the DA's 35a-35c of the local storage device may handle scanning the inactive one of the cache only virtual devices 404, 406 to send copy requests to one or more of the RA's 30a-30c to transmit the data from the local storage device 24 to the remote storage device 26. Thus, the steps 362, 374, discussed above in connection with suspending and resuming copying, may include providing messages/commands to the DA's 35a-35c.

Once the data has been transmitted to the remote storage device 26, the corresponding entry in the inactive one of the cache only virtual devices 404, 406 may be set to null. In addition, the data may also be removed from the cache 408 (i.e., the slot returned to the pool of slots for later use) if the data in the slot is not otherwise needed for another purpose (e.g., to be destaged to the standard logical device 402). A mechanism may be used to ensure that data is not removed from the cache 408 until all mirrors (including the cache only virtual devices 404, 406) are no longer using the data. Such a mechanism is described, for example, in U.S. Pat. No. 5,537,568 titled "SYSTEM FOR DYNAMICALLY CONTROLLING CACHE MANAGER MAINTAINING CACHE INDEX AND CONTROLLING SEQUENTIAL DATA ACCESS" to Yanai, et al. and in U.S. Pat. No. 6,594,742 titled "CACHE MANAGEMENT VIA STATISTICALLY ADJUSTED SLOT AGING" to Josef Ezra, both of which are incorporated by reference herein.

Figure 13:
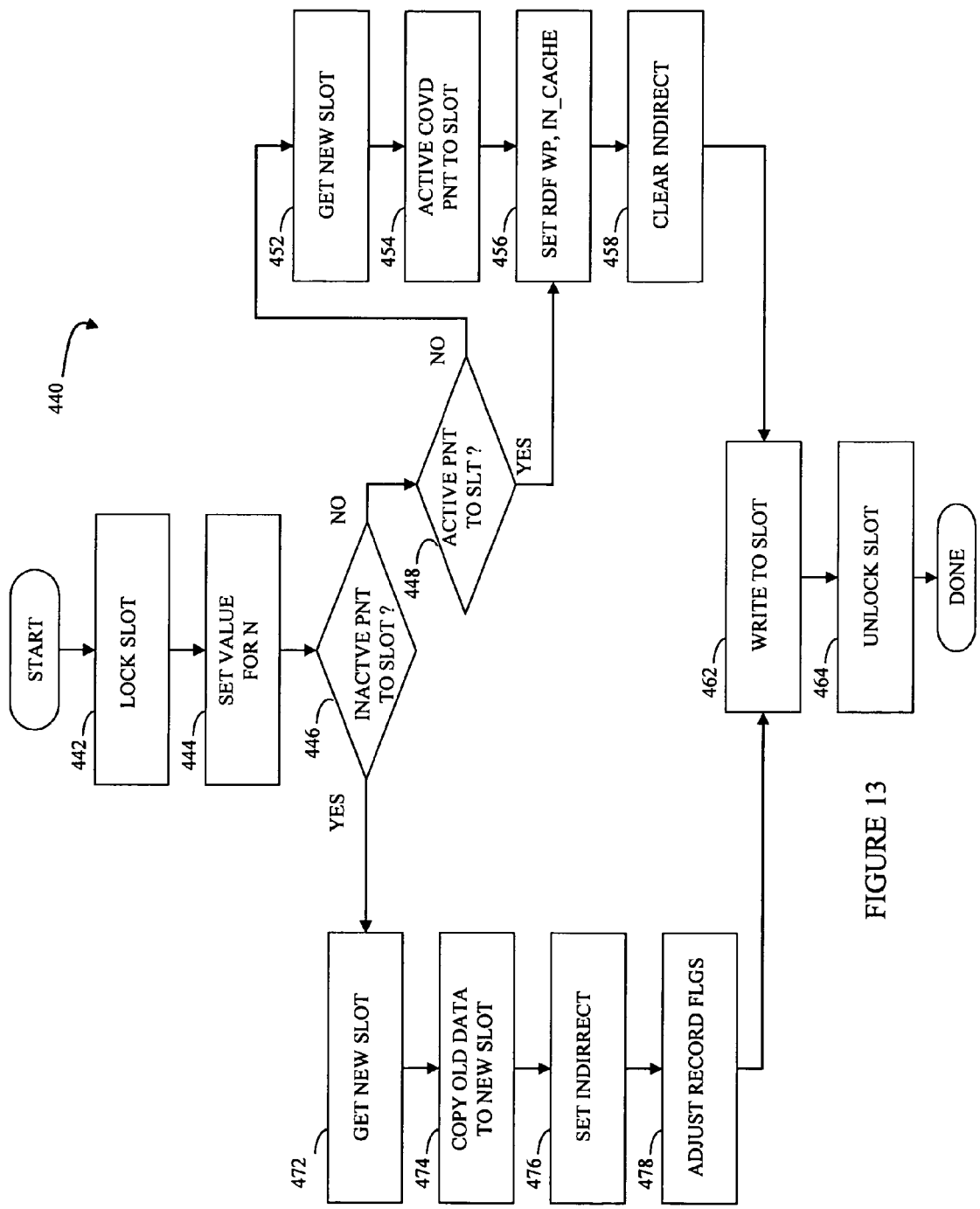
FIG. 13 is a flow chart illustrating operation of a host adaptor (HA) in response to a write by a host according to an alternative embodiment of the system described herein.

Referring to FIG. 13, a flow chart 440 illustrates steps performed by the HA 28 in connection with a host 22 performing a write operation for embodiments where two COVD's are used by the R1 device to provide the system described herein. Processing begins at a first step 442 where a slot corresponding to the write is locked. In an embodiment herein, each of the slots 412-414 of the cache 408 corresponds to a track of data on the standard logical device 402. Locking the slot at the step 442 prevents additional processes from operating on the relevant slot during the processing performed by the HA 28 corresponding to the steps of the flow chart 440.

Following the step 442 is a step 444 where a value for N, the sequence number, is set. Just as with the embodiment that uses lists rather than COVD's on the R1 side, the value for the sequence number obtained at the step 444 is maintained during the entire write operation performed by the HA 28 while the slot is locked. As discussed elsewhere herein, the sequence number is assigned to each write to set the one of the chunks of data 66, 67 to which the write belongs. Writes performed by the host 22 are assigned the current sequence number. It is useful that a single write operation maintain the same sequence number throughout.

Following the step 444 is a test step 446, which determines if the inactive one of the cache only virtual devices 404, 406 already points to the slot that was locked at the step 442 (the slot being operated upon). This may occur if a write to the same slot was provided when the sequence number was one less than the current sequence number. The data corresponding to the write for the previous sequence number may not yet have been transmitted to the remote storage device 26.

If it is determined at the test step 446 that the inactive one of the cache only virtual devices 404, 406 does not point to the slot, then control transfers from the test step 446 to another test step 448, where it is determined if the active one of the cache only virtual devices 404, 406 points to the slot. It is possible for the active one of the cache only virtual devices 404, 406 to point to the slot if there had been a previous write to the slot while the sequence number was the same as the current sequence number. If it is determined at the test step 448 that the active one of the cache only virtual devices 404, 406 does not point to the slot, then control transfers from the test step 448 to a step 452 where a new slot is obtained for the data. Following the step 452 is a step 454 where the active one of the cache only virtual devices 404, 406 is made to point to the slot.

Following the step 454, or following the step 448 if the active one of the cache only virtual devices 404, 406 points to the slot, is a step 456 where flags are set. At the step 456, the RDF_WP flag (RDF write pending flag) is set to indicate that the slot needs to be transmitted to the remote storage device 26 using RDF. In addition, at the step 456, the IN_CACHE flag is set to indicate that the slot needs to be destaged to the standard logical device 402. Note that, in some instances, if the active one of the cache only virtual devices 404, 406 already points to the slot (as determined at the step 448) it is possible that the RDF_WP and IN_CACHE flags were already set prior to execution of the step 456. However, setting the flags at the step 456 ensures that the flags are set properly no matter what the previous state.

Following the step 456 is a step 458 where an indirect flag in the track table that points to the slot is cleared, indicating that the relevant data is provided in the slot and not in a different slot indirectly pointed to. Following the step 458 is a step 462 where the data being written by the host 22 and the HA 28 is written to the slot. Following the step 462 is a step 464 where the slot is unlocked. Following step 464, processing is complete.

If it is determined at the test step 446 that the inactive one of the cache only virtual devices 404, 406 points to the slot, then control transfers from the step 446 to a step 472, where a new slot is obtained. The new slot obtained at the step 472 may be used for the inactive one of the cache only virtual devices 404, 406 to effect the RDF transfer while the old slot may be associated with the active one of the cache only virtual devices 404, 406, as described below.

Following the step 472 is a step 474 where the data from the old slot is copied to the new slot that was obtained at the step 472. Following the step 474 is a step 476 where the indirect flag (discussed above) is set to indicate that the track table entry for the inactive one of the cache only virtual devices 404, 406 points to the old slot but that the data is in the new slot which is pointed to by the old slot. Thus, setting indirect flag at the step 476 affects the track table of the inactive one of the cache only virtual devices 404, 406 to cause the track table entry to indicate that the data is in the new slot.

Following the step 476 is a step 478 where the mirror bits for the records in the new slot are adjusted. Any local mirror bits that were copied when the data was copied from the old slot to the new slot at the step 474 are cleared since the purpose of the new slot is to simply effect the RDF transfer for the inactive one of the cache only virtual devices. The old slot will be used to handle any local mirrors. Following the step 478 is the step 462 where the data is written to the slot. Following step 462 is the step 464 where the slot is unlocked. Following the step 464, processing is complete.

Figure 14:
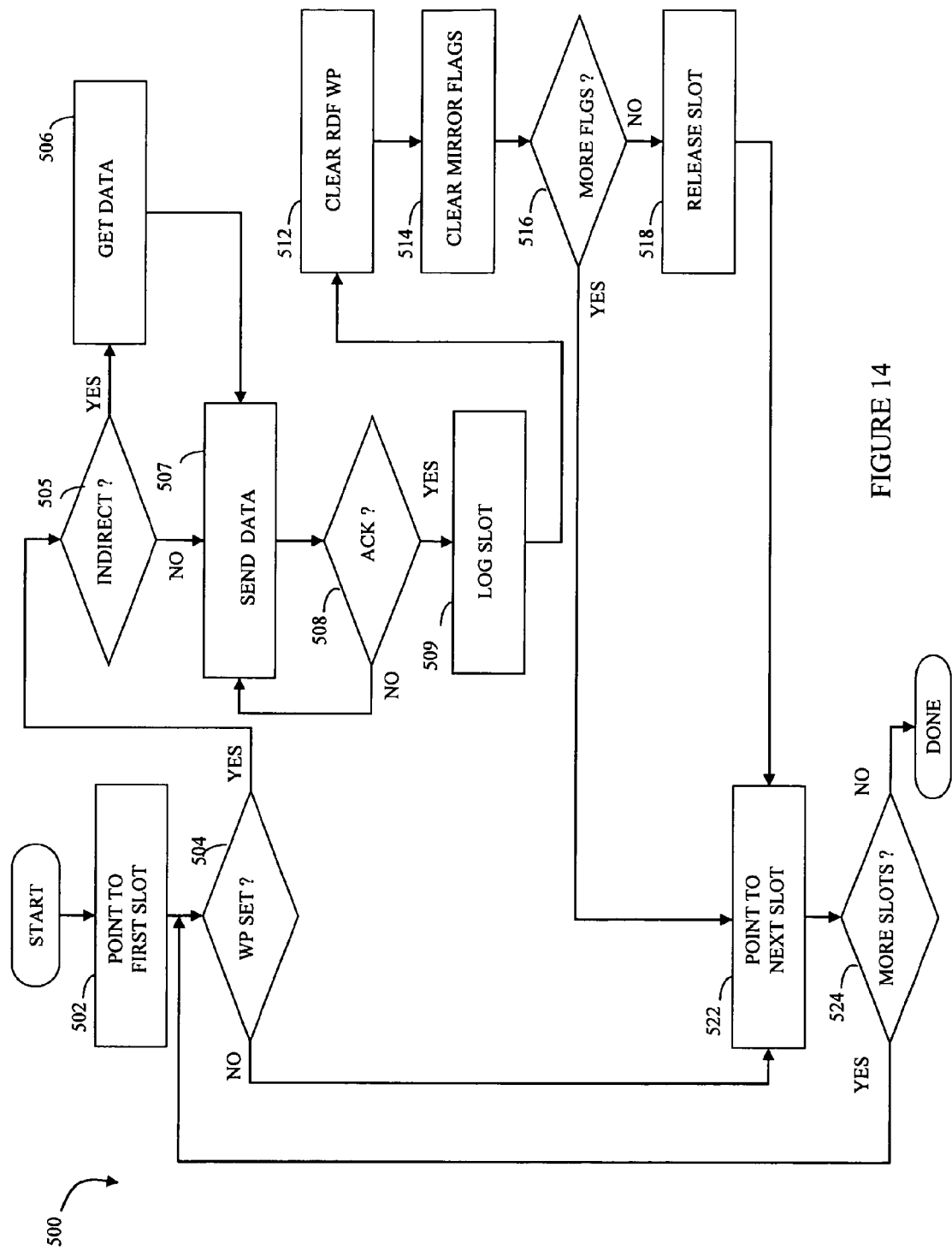
FIG. 14 is a flow chart illustrating transferring data from a local storage device to a remote storage device according to an alternative embodiment of the system described herein.

Referring to FIG. 14, a flow chart 500 illustrates steps performed in connection with the local storage device 24 transmitting the chunk of data 67 to the remote storage device 26. The transmission essentially involves scanning the inactive one of the cache only virtual devices 404, 406 for tracks that have been written thereto during a previous iteration when the inactive one of the cache only virtual devices 404, 406 was active. In this embodiment, the DA's 35a-35c of the local storage device 24 may scan the inactive one of the cache only virtual devices 404, 406 to copy the data for transmission to the remote storage device 26 by one or more of the RA's 30a-30c using the RDF protocol.

Processing begins at a first step 502 where the first track of the inactive one of the cache only virtual devices 404, 406 is pointed to in order to begin the process of iterating through all of the tracks. Following the first step 502 is a test step 504 where it is determined if the RDF_WP flag is set. As discussed elsewhere herein, the RDF_WP flag is used to indicate that a slot (track) contains data that needs to be transmitted via the RDF link. The RDF_WP flag being set indicates that at least some data for the slot (track) is to be transmitted using RDF. In an embodiment herein, the entire slot is not transmitted. Rather, only records within the slot that have the appropriate mirror bits set (indicating the records have changed) are transmitted to the remote storage device 26. However, in other embodiments, it may be possible to transmit the entire slot, provided that the remote storage device 26 only writes data corresponding to records having appropriate mirror bits set and ignores other data for the track, which may or may not be valid.

If it is determined at the test step 504 that the cache slot being processed has the RDF_WP flag set, then control transfers from the step 504 to a test step 505, where it is determined if the slot contains the data or if the slot is an indirect slot that points to another slot that contains the relevant data. In some instances, a slot may not contain the data for the portion of the disk that corresponds to the slot. Instead, the slot may be an indirect slot that points to another slot that contains the data. If it is determined at the step 505 that the slot is an indirect slot, then control transfers from the step 505 to a step 506, where the data (from the slot pointed to by the indirect slot) is obtained. Thus, if the slot is a direct slot, the data for being sent by RDF is stored in the slot while if the slot is an indirect slot, the data for being sent by RDF is in another slot pointed to by the indirect slot.

Following the step 506 or the step 505 if the slot is a direct slot is a step 507 where data being sent (directly or indirectly from the slot) is copied by one of the DA's 35a-35c to be sent from the local storage device 24 to the remote storage device 26 using the RDF protocol. Following the step 507 is a test step 508 where it is determined if the remote storage device 26 has acknowledged receipt of the data. If not, then control transfers from the step 508 back to the step 507 to resend the data. In other embodiments, different and more involved processing may be used to send data and acknowledge receipt thereof. Such processing may include error reporting and alternative processing that is performed after a certain number of attempts to send the data have failed.

Once it is determined at the test step 508 that the data has been successfully sent, control passes from the step 508 to a step 509 where the system logs an indicator of the slot/track (and/or portion thereof) that was sent at the step 507. Processing performed at the step 509 is like processing performed at the step 215 of FIG. 7, discussed above. Following the step 509 is a step 512 where the RDF_WP flag is cleared (since the data has been successfully sent via RDF). Following the step 512 is a step 514 where appropriate mirror flags are cleared to indicate that at least the RDF mirror (R2) no longer needs the data. In an embodiment herein, each record that is part of a slot (track) has individual mirror flags indicating which mirrors use the particular record. The R2 device is one of the mirrors for each of the records and it is the flags corresponding to the R2 device that are cleared at the step 514.

Following the step 514 is a test step 516 which determines if any of the records of the track being processed have any other mirror flags set (for other mirror devices). If not, then control passes from the step 516 to a step 518 where the slot is released (i.e., no longer being used). In some embodiments, unused slots are maintained in a pool of slots available for use. Note that if additional flags are still set for some of the records of the slot, it may mean that the records need to be destaged to the standard logical device 402 or are being used by some other mirror (including another R2 device). Following the step 518, or following the step 516 if more mirror flags are present, is a step 522 where the pointer that is used to iterate through each track entry of the inactive one of the cache only virtual devices 404, 406 is made to point to the next track. Following the step 522 is a test step 524 which determines if there are more tracks of the inactive one of the cache only virtual devices 404, 406 to be processed. If not, then processing is complete. Otherwise, control transfers back to the test step 504, discussed above. Note that the step 522 is also reached from the test step 504 if it is determined that the RDF_WP flag is not set for the track being processed.

In another embodiment of the system described herein, it is possible to not use COVD's for the R2 device like those shown in the diagram 240 of FIG. 7. That is, it is possible to implement the R2 receipt of asynchronous data without using COVD's at the R2 device.

Figure 15:
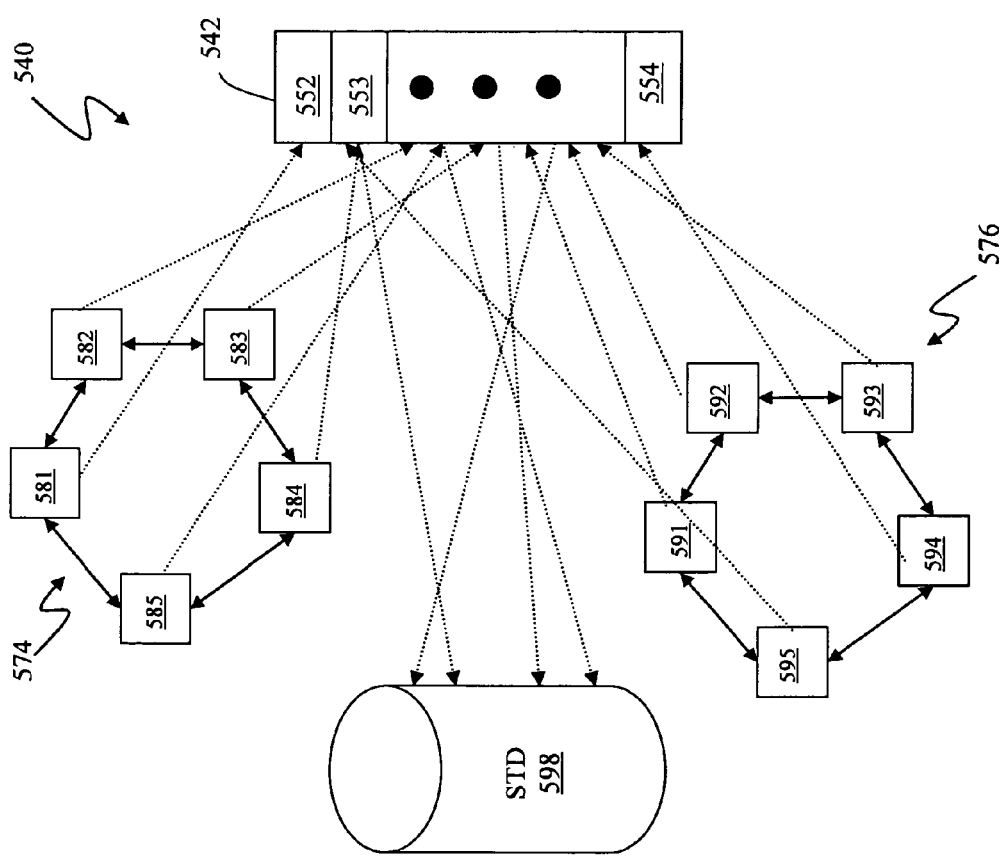
FIG. 15 is a schematic diagram illustrating items for constructing and manipulating chunks of data on a remote storage device according to an embodiment of the system described herein.

Referring to FIG. 15, a diagram 540 shows a cache 542 that is provided in the remote storage device 26 that receives data. The cache 542 includes a plurality of slots 552-554 in which asynchronous data that is received from the local storage device 24 is placed. Also shown is a first circularly linked list 574 and a second circularly linked list 576 which contain pointers to the slots 552-554 of the cache 542. Thus, for example, the circularly linked list 574 includes a plurality of pointers 581-585, each of which points to one of the slots 552-554 in the cache 542. Similarly, the circularly linked list 576 includes a plurality of pointers 591-595, each of which points to one of the slots 552-554 of the cache 542. A standard logical device 598 is also mapped to portions of the cache 542.

In an embodiment herein, one of the lists 574, 576 corresponds to an inactive data chunk (e.g., like the chunk 68 shown in FIG. 3), while the other one of the lists 574, 576 corresponds to an active data chunk (e.g., like the chunk 69 of FIG. 3). Received data is accumulated using an inactive one of the data chunks while the active one of the data chunks is used for storing data at the standard logical device 598 as described elsewhere herein in connection with the diagram 240 of FIG. 7 and the corresponding text. Thus, as new data arrives, it is placed in the cache 542 and a new pointer is added to which one of the circularly linked lists 574, 576 corresponds to the inactive data chunk when the data is received.

In some instances, it may be useful to be able to determine whether a portion of the standard logical device 598 (or any other logical device) has a slot associated therewith in the cache 542 corresponding to received data. Of course, it is always possible to traverse both of the lists 574, 576 to determine if there is a corresponding slot in the cache 542. However, it would be more useful if there were a way of using particular device, cylinder, and head values of a logical device to determine whether there is a corresponding one of the slots 552-554 in the cache 542 waiting to be destaged to the device.

Figure 16:
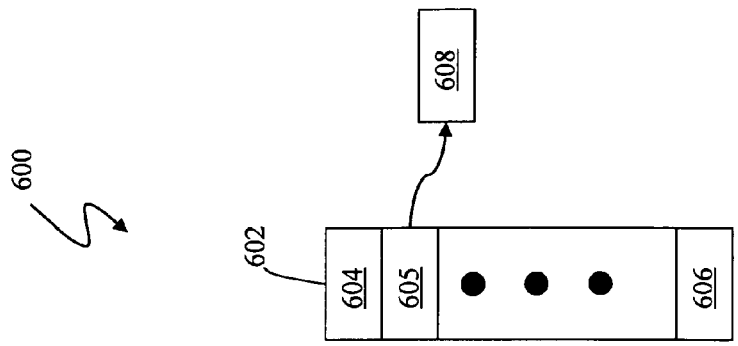
FIG. 16 is a diagram showing a table used to map logical device locations to slots containing data received by a remote storage device according to an embodiment of the system described herein.

Referring to FIG. 16, a diagram 600 shows a hash table 602 which contain a plurality of entries 604-606. In an embodiment herein, each of the entries 604-606 either contains a null pointer or points to one of the cache slots 552-554 that correspond to data that has been received but not yet stored on the standard logical device 598 (or another standard logical device). The table 602 is indexed using a hash function that performs a mathematical operation using the particular values of the device, cylinder, and head to generate an index into the table 602 to find the corresponding entry. Thus, when data is received by the R2 device, the hash function is applied to the device, cylinder, and head to find its index value into the table 602 and then a pointer is written to the corresponding one of the entries 604-606 that points to the particular slot 552-554 in the cache 542. Once the received data is appropriately destaged to the standard logical device 598 (or another device), the corresponding one of the entries 604-606 is set to null. In this way, the hash table 602 allows quickly determining whether a particular portion of a standard logical device corresponds to received data that has not yet been destaged. For the system described herein, any appropriate hash function may be used to generate the index into the table 602.

In some instances, it may possible for a particular device, cylinder, and head values to generate an index into the table 602 that is the same as an index generated by different values for the device, cylinder, and head. This is called a "collision". In instances where collisions occur, a second entry into the table 602 corresponding to the same index as provided and the second entry is linked to the first entry so that a particular index would correspond to more than one entry. This is illustrated by an element 608 that is linked to the element 605 of the table 602. Thus, a first device, cylinder, and head are hashed to generate an index to the entry 605 while different device, cylinder, and head are input to the hash function to generate the same value for the index. In an embodiment herein, the entry 605 is used to point to the data in the cache 542 corresponding to the first device, cylinder, and head while the entry 608 is used to point to data in the cache 542 corresponding to the second device, cylinder and head. Of course, as data is destaged to an appropriate device, the corresponding one of the entries 605, 608 may be eliminated from the table 602.

Note that any number of entries may correspond to a single index so that, for example, if collisions occur that cause three separate sets of values for device, cylinder, and head to generate the same index, then there would be three (or more) entries linked together at a particular index into the table 602. Note also that other appropriate techniques may be used to handle collisions, including providing additional tables (e.g., a second table, a third table, a fourth table, etc.).

Figure 17:
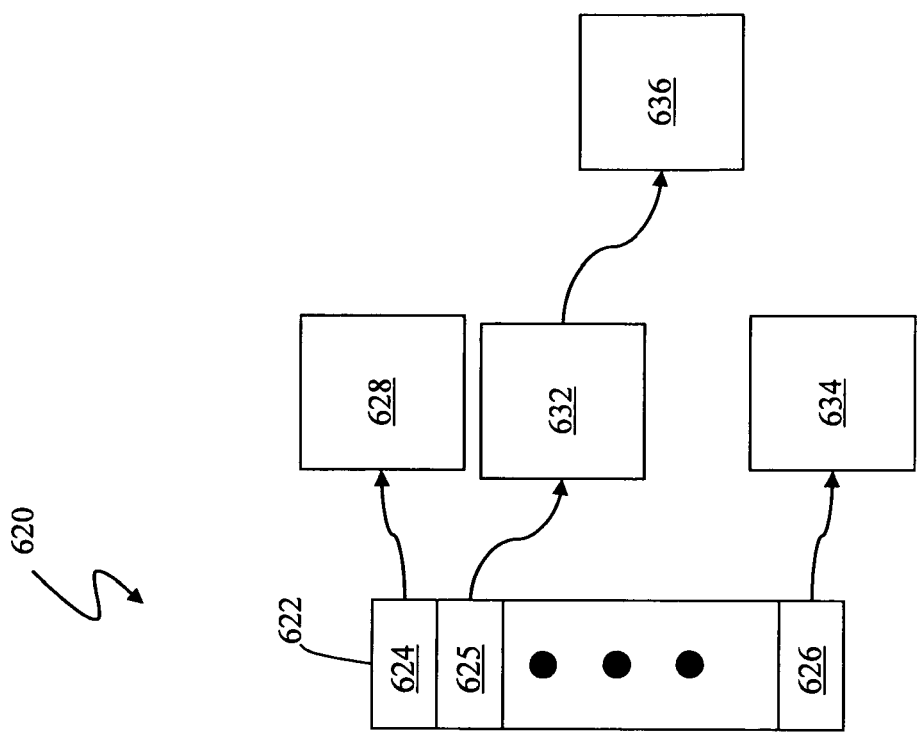
FIG. 17 is a diagram showing another embodiment of a table used to map logical device locations to slots containing data received by a remote storage device according to an embodiment of the system described herein.

Referring to FIG. 17, a diagram 620 shows an alternative embodiment of a hash table 622 which contain a plurality of entries 624-626. The embodiment of FIG. 17 is like the embodiment of FIG. 16, with a few differences, as described herein. Each of the entries 624-626 either contains a null pointer or points to one of the cache slots 628, 632, 634, shown in the diagram 620, that correspond to data that has been received but not yet stored on the standard logical device 598 (or another standard logical device). The table 622 is indexed using a hash function that performs a mathematical operation using the particular values of the device, cylinder, and head to generate an index into the table 622 to find the corresponding entry. Thus, when data is received by the R2 device, the hash function is applied to the device, cylinder, and head to find its index value into the table 622 and then a pointer is written to the corresponding one of the entries 624-626 that points to the particular slot 628, 632, 634. Once the received data is appropriately destaged to the standard logical device 598 (or another device), the corresponding one of the entries 624-626 is adjusted appropriately. In this way, the hash table 622 allows quickly determining whether a particular portion of a standard logical device corresponds to received data that has not yet been destaged. For the system described herein, any appropriate hash function may be used to generate the index into the table 622.

For the embodiment shown in FIG. 17, in instances where collisions occur, the first slot pointed to by a table entry points to the second slot that caused the collision. Thus, for example, if the slot 632 and a slot 636 cause a collision at the table entry 625, the table entry 625 points to the slot 632 while the slot 632 points to the slot 636. Thus, a collision does not cause any change in the table 622 when the subsequent slot is added, since adding the subsequent slot simply involves changing the pointer value for a previous slot. Of course, any number of slots may correspond to a single table entry.

Note that any number of entries may correspond to a single index so that, for example, if collisions occur that cause three separate sets of values for device, cylinder, and head to generate the same index, then there would be three (or more) entries linked together at a particular index into the table 622. Note also that other appropriate techniques may be used to handle collisions, including providing additional tables (e.g., a second table, a third table, a fourth table, etc.).

Figure 18:
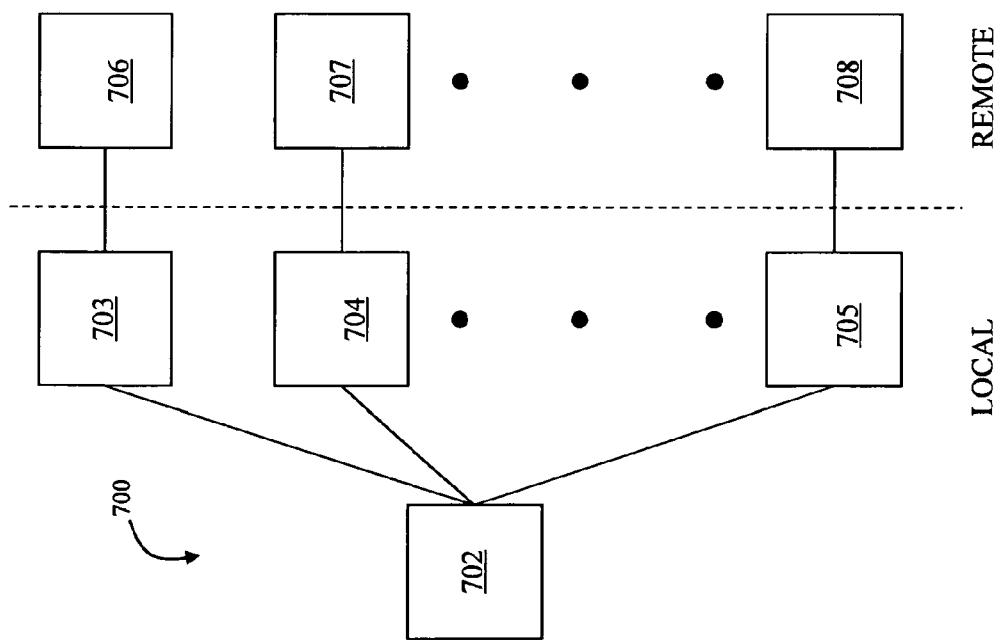
FIG. 18 is a schematic diagram illustrating a plurality of local and remote storage devices with a host according to an embodiment of the system described herein.

Referring to FIG. 18, a diagram 700 illustrates a host 702 coupled to a plurality of local storage devices 703-705. The diagram 700 also shows a plurality of remote storage devices 706-708. Although only three local storage devices 703-705 and three remote storage devices 706-708 are shown in the diagram 700, the system described herein may be expanded to use any number of local and remote storage devices.

Each of the local storage devices 703-705 is coupled to a corresponding one of the remote storage devices 706-708 so that, for example, the local storage device 703 is coupled to the remote storage device 706, the local storage device 704 is coupled to the remote storage device 707 and the local storage device 705 is coupled to the remote storage device 708. The local storage devices 703-705 and remote storage devices 706-708 may be coupled using the ordered writes mechanism described herein so that, for example, the local storage device 703 may be coupled to the remote storage device 706 using the ordered writes mechanism. As discussed elsewhere herein, the ordered writes mechanism allows data recovery using the remote storage device in instances where the local storage device and/or host stops working and/or loses data.

In some instances, the host 702 may run a single application that simultaneously uses more than one of the local storage devices 703-705. In such a case, the application may be configured to ensure that application data is consistent (recoverable) at the local storage devices 703-705 if the host 702 were to cease working at any time and/or if one of the local storage devices 703-705 were to fail. However, since each of the ordered write connections between the local storage devices 703-705 and the remote storage devices 706-708 is asynchronous from the other connections, then there is no assurance that data for the application will be consistent (and thus recoverable) at the remote storage devices 706-708. That is, for example, even though the data connection between the local storage device 703 and the remote storage device 706 (a first local/remote pair) is consistent and the data connection between the local storage device 704 and the remote storage device 707 (a second local/remote pair) is consistent, it is not necessarily the case that the data on the remote storage devices 706, 707 is always consistent if there is no synchronization between the first and second local/remote pairs.

For applications on the host 702 that simultaneously use a plurality of local storage devices 703-705, it is desirable to have the data be consistent and recoverable at the remote storage devices 706-708. This may be provided by a mechanism whereby the host 702 controls cycle switching at each of the local storage devices 703-705 so that the data from the application running on the host 702 is consistent and recoverable at the remote storage devices 706-708. This functionality is provided by a special application that runs on the host 702 that switches a plurality of the local storage devices 703-705 into multi-box mode, as described in more detail below.

Figure 19:
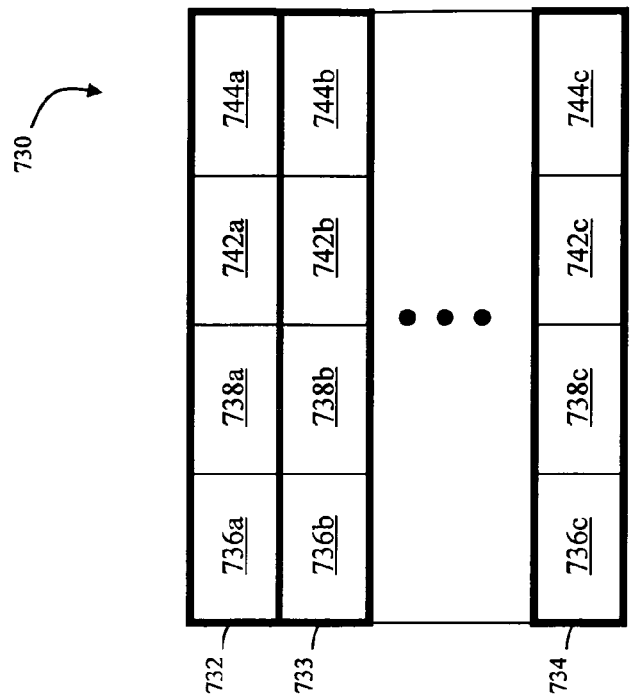
FIG. 19 is a diagram showing a multi-box mode table used in connection with an embodiment of the system described herein.

Referring to FIG. 19, a table 730 has a plurality of entries 732-734. Each of the entries 732-734 correspond to a single local/remote pair of storage devices so that, for example, the entry 732 may correspond to pair of the local storage device 703 and the remote storage device 706, the entry 733 may correspond to pair of the local storage device 704 and the remote storage device 707 and the entry 734 may correspond to the pair of local storage device 705 and the remote storage device 708. Each of the entries 732-734 has a plurality of fields where a first field 736a-736c represents a serial number of the corresponding local storage device, a second field 738a-738c represents a session number used by the multi-box group, a third field 742a-742c represents the serial number of the corresponding remote storage device of the local/remote pair, and a fourth field 744a-744c represents the session number for the multi-box group. The table 730 is constructed and maintained by the host 702 in connection with operating in multi-box mode. In addition, the table 730 is propagated to each of the local storage devices and the remote storage devices that are part of the multi-box group. The table 730 may be used to facilitate recovery, as discussed in more detail below.

Different local/remote pairs may enter and exit multi-box mode independently in any sequence and at any time. The host 702 manages entry and exit of local storage device/remote storage device pairs into and out of multi-box mode. This is described in more detail below.

Figure 20:
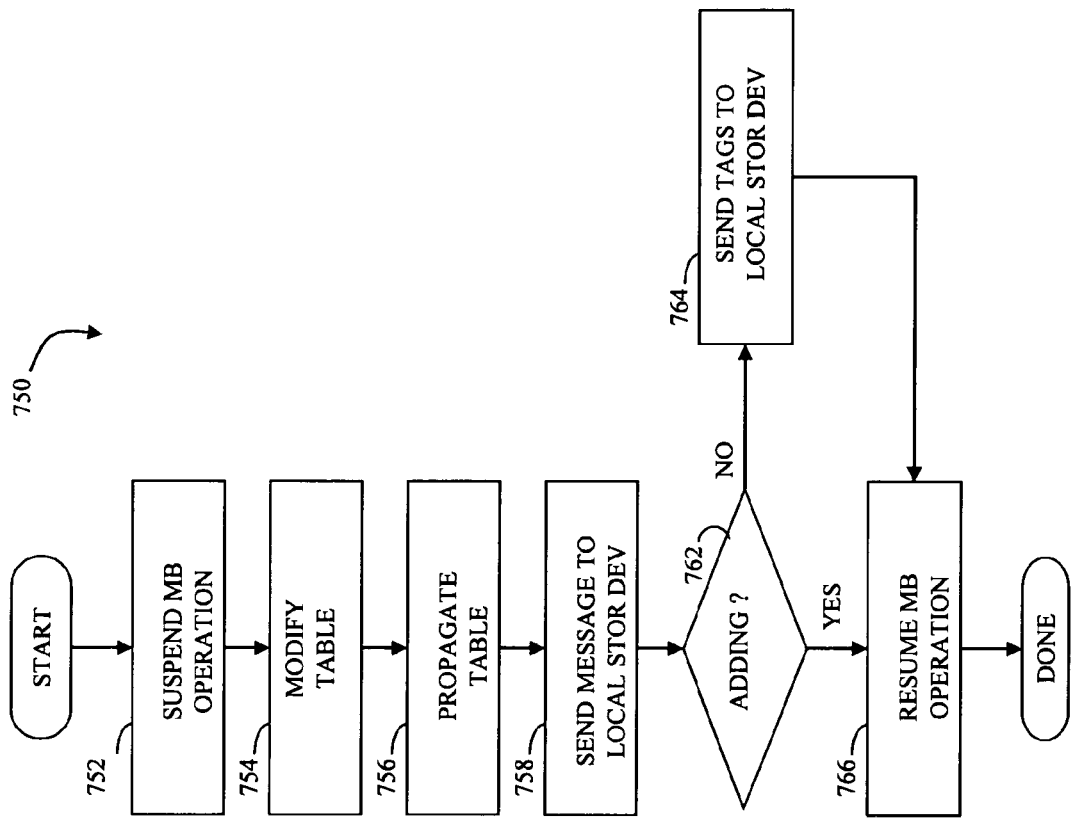
FIG. 20 is a flow chart illustrating modifying a multi-box mode table according to an embodiment of the system described herein.

Referring to FIG. 20, a flowchart 750 illustrates steps performed by the host 702 in connection with entry or exit of a local/remote pair in to or out of multi-box mode. Processing begins at a first step 752 where multi-box mode operation is temporarily suspended. Temporarily suspending multi-box operation at the step 752 is useful to facilitate the changes that are made in connection with entry or exit of a remote/local pair in to or out of multi-box mode. Following the step 752, is a step 754 where a table like the table 730 of FIG. 19 is modified to either add or delete an entry, as appropriate. Following the step 754 is a step 756 where the modified table is propagated to the local storage devices and remote storage devices of the multi-box group. Propagating the table at the step 756 facilitates recovery, as discussed in more detail elsewhere herein.

Following the step 756 is a step 758 where a message is sent to the affected local storage device to provide the change. The local storage device may configure itself to run in multi-box mode or not, as described in more detail elsewhere herein. As discussed in more detail below, a local storage device handling ordered writes operates differently depending upon whether it is operating as part of a multi-box group or not. If the local storage device is being added to a multi-box group, the message sent at the step 758 indicates to the local storage device that it is being added to a multi-box group so that the local storage device should configure itself to run in multi-box mode. Alternatively, if a local storage device is being removed from a multi-box group, the message sent at the step 758 indicates to the local storage device that it is being removed from the multi-box group so that the local storage device should configure itself to not run in multi-box mode.

Following step 758 is a test step 762 where it is determined if a local/remote pair is being added to the multi-box group (as opposed to being removed). If so, then control transfers from the test step 762 to a step 764 where tag values are sent to the local storage device that is being added. The tag values are provided with the data transmitted from the local storage device to the remote storage device in a manner similar to providing the sequence numbers with the data. The tag values are controlled by the host and set so that all of the local/remote pairs send data having the same tag value during the same cycle. Use of the tag values is discussed in more detail below. Following the step 764, or following the step 762 if a new local/remote pair is not being added, is a step 766 where multi-box operation is resumed. Following the step 766, processing is complete.

Figure 21:
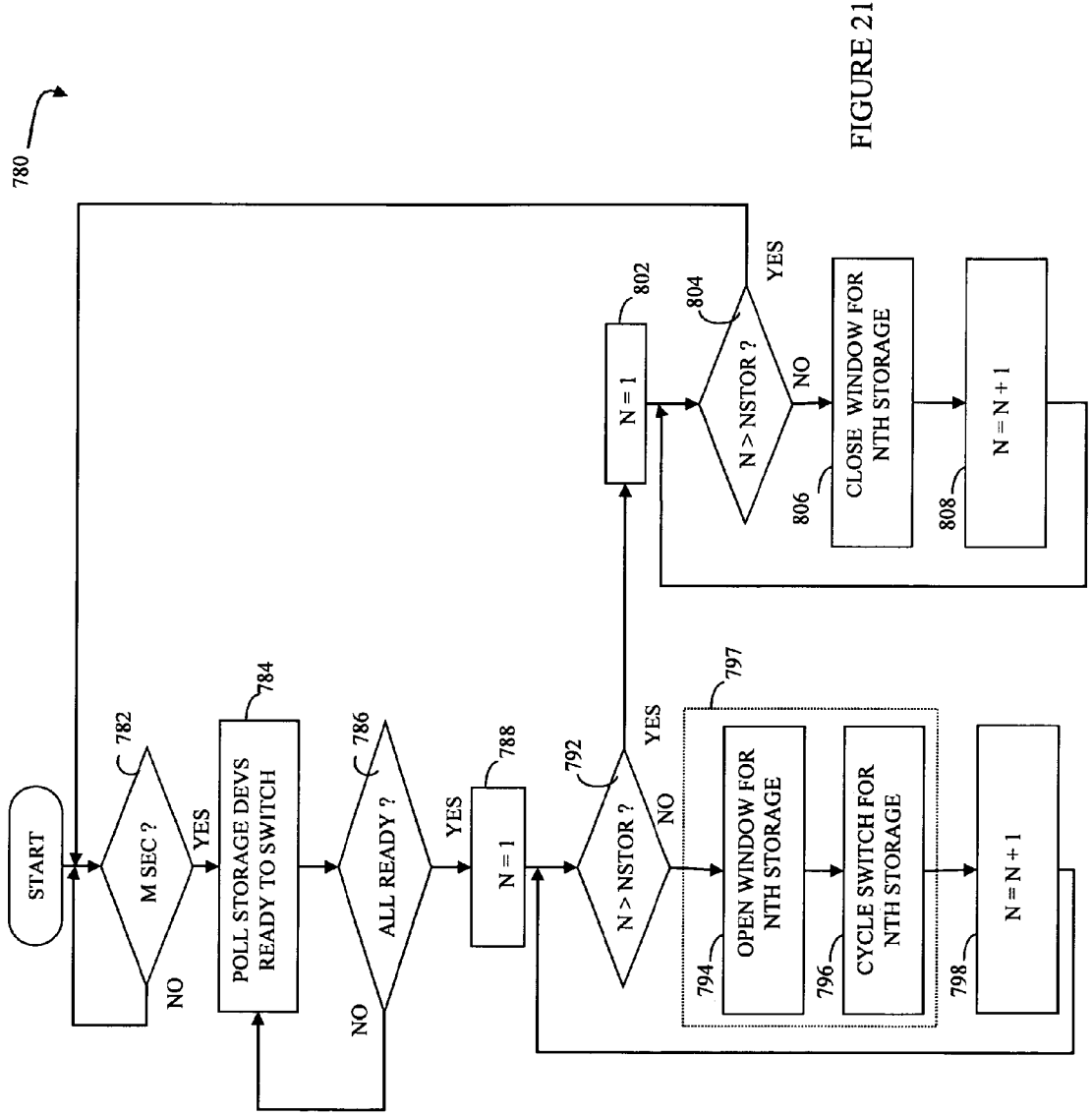
FIG. 21 is a flow chart illustrating cycle switching by the host according to an embodiment of the system described herein.

Referring to FIG. 21, a flow chart 780 illustrates steps performed in connection with the host managing cycle switching for multiple local/remote pairs running as a group in multi-box mode. As discussed elsewhere herein, multi-box mode involves having the host synchronize cycle switches for more than one remote/local pair to maintain data consistency among the remote storage devices. Cycle switching is coordinated by the host rather than being generated internally by the local storage devices. This is discussed in more detail below.

Processing for the flow chart 780 begins at a test step 782 which determines if M seconds have passed. Just as with non-multi-box operation, cycle switches occur no sooner than every M seconds where M is a number chosen to optimize various performance parameters. As the number M is increased, the amount of overhead associated with switching decreases. However, increasing M also causes the amount of data that may be potentially lost in connection with a failure to also increase. In an embodiment herein, M is chosen to be thirty seconds, although, obviously other values for M may be used.

If it is determined at the test step 782 that M seconds have not passed, then control transfers back to the step 782 to continue waiting until M seconds have passed. Once it is determined at the test step 782 that M seconds have passed, control transfers from the step 782 to a step 784 where the host queries all of the local storage devices in the multi-box group to determine if all of the local/remote pairs are ready to switch. The local/remote pairs being ready to switch is discussed in more detail hereinafter.

Following the step 784 is a test step 786 which determines if all of the local/remote pairs are ready to switch. If not, control transfers back to the step 784 to resume the query. In an embodiment herein, it is only necessary to query local/remote pairs that were previously not ready to switch since, once a local/remote pair is ready to switch, the pair remains so until the switch occurs.

Once it is determined at the test step 786 that all of the local/remote pairs in the multi-box group are ready to switch, control transfers from the step 786 to a step 788 where an index variable, N, is set equal to one. The index variable N is used to iterate through all the local/remote pairs (i.e., all of the entries 732-734 of the table 730 of FIG. 19). Following the step 788 is a test step 792 which determines if the index variable, N, is greater than the number of local/remote pairs in the multi-box group. If not, then control transfers from the step 792 to a step 794 where an open window is performed for the Nth local storage device of the Nth pair by the host sending a command (e.g., an appropriate system command) to the Nth local storage device. Opening the window for the Nth local storage device at the step 794 causes the Nth local storage device to suspend writes so that any write by a host that is not begun prior to opening the window at the step 794 will not be completed until the window is closed (described below). Not completing a write operation prevents a second dependant write from occurring prior to completion of the cycle switch. Any writes in progress that were begun before opening the window may complete prior to the window being closed.

Following the step 794 is a step 796 where a cycle switch is performed for the Nth local storage device. Performing the cycle switch at the step 796 involves sending a command from the host 702 to the Nth local storage device. Processing the command from the host by the Nth local storage device is discussed in more detail below. Part of the processing performed at the step 796 may include having the host provide new values for the tags that are assigned to the data. The tags are discussed in more detail elsewhere herein. In an alternative embodiment, the operations performed at the steps 794, 796 may be performed as a single integrated step 797, which is illustrated by the box drawn around the steps 794, 796.

Following the step 796 is a step 798 where the index variable, N, is incremented. Following step 798, control transfers back to the test step 792 to determine if the index variable, N, is greater than the number of local/remote pairs.

If it is determined at the test step 792 that the index variable, N, is greater than the number of local/remote pairs, then control transfers from the test step 792 to a step 802 where the index variable, N, is set equal to one. Following the step 802 is a test step 804 which determines if the index variable, N, is greater than the number of local/remote pairs. If not, then control transfers from the step 804 to a step 806 where the window for the Nth local storage device is closed. Closing the window of the step 806 is performed by the host sending a command to the Nth local storage device to cause the Nth local storage device to resume write operations. Thus, any writes in process that were suspended by opening the window at the step 794 may now be completed after execution of the step 806. Following the step 806, control transfers to a step 808 where the index variable, N, is incremented. Following the step 808, control transfers back to the test step 804 to determine if the index variable, N, is greater than the number of local/remote pairs. If so, then control transfers from the test step 804 back to the step 782 to begin processing for the next cycle switch.

Figure 22:
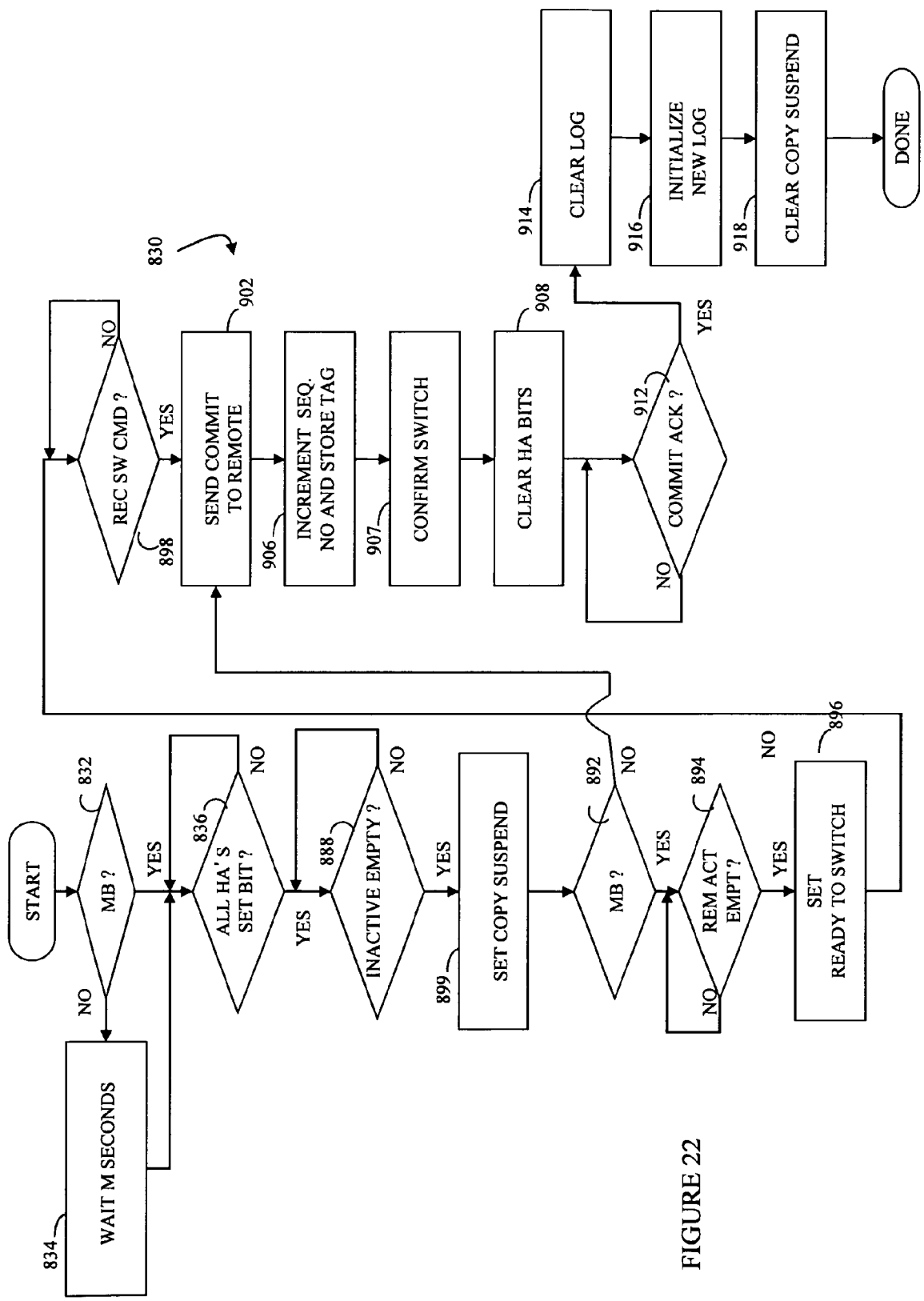
FIG. 22 is a flow chart illustrating steps performed in connection with a local storage device incrementing a sequence number according to an embodiment of the system described herein.

Referring to FIG. 22, a flow chart 830 illustrates steps performed by a local storage device in connection with cycle switching. The flow chart 830 of FIG. 22 replaces the flow chart 350 of FIG. 11 in instances where the local storage device supports both multi-box mode and non-multi-box mode. That is, the flow chart 830 shows steps performed like those of the flow chart 350 of FIG. 11 to support non-multi-box mode and, in addition, includes steps for supporting multi-box mode.

Processing begins at a first test step 832 which determines if the local storage device is operating in multi-box mode. Note that the flow chart 750 of FIG. 20 shows the step 758 where the host sends a message to the local storage device. The message sent at the step 758 indicates to the local storage device whether the local storage device is in multi-box mode or not. Upon receipt of the message sent by the host at the step 758, the local storage device sets an internal variable to indicate whether the local storage device is operating in multi-box mode or not. The internal variable may be examined at the test step 832.

If it is determined at the test step 832 that the local storage device is not in multi-box mode, then control transfers from the test step 832 to a step 834 to wait M seconds for the cycle switch. If the local storage device is not operating in multi-box mode, then the local storage device controls its own cycle switching and thus executes the step 834 to wait M seconds before initiating the next cycle switch.

Following the step 834, or following the step 832 if the local storage device is in multi-box mode, is a test step 836 which determines if all of the HA's of the local storage device have set a bit indicating that the HA's have completed all of the PO's for a previous sequence number. When the sequence number changes, each of the HA's notices the change and sets a bit indicating that all I/O's of the previous sequence number are completed. For example, if the sequence number changes from N-1 to N, an HA will set the bit when the HA has completed all I/O's for sequence number N-1. Note that, in some instances, a single I/O for an HA may take a long time and may still be in progress even after the sequence number has changed. Note also that, for some systems, a different mechanism may be used to determine if all HA's have completed their N-1 PO's. The different mechanism may include examining device tables.

Once it is determined at the test step 836 that all HA's have set the appropriate bit, control transfers from the test step 836 to a step 888 which determines if the inactive chunk for the local storage device is empty. Once it is determined at the test step 888 that the inactive chunk is empty, control transfers from the step 888 to a step 899, where copying of data from the local storage device to the remote storage device is suspended. It is useful to suspend copying data until the sequence number switch is complete.

Following the step 899 is a test step 892 to determine if the local storage device is in multi-box mode. If it is determined at the test step 892 that the local storage device is in multi-box mode, then control transfers from the test step 892 to a test step 894 to determine if the active chunk of the corresponding remote storage device is empty. As discussed in more detail below, the remote storage device sends a message to the local storage device once it has emptied its active chunk. In response to the message, the local storage device sets an internal variable that is examined at the test step 894.

Once it is determined at the test step 894 that the active chunk of the remote storage device is empty, control transfers from the test step 894 to a step 896 where an internal variable is set on a local storage device indicating that the local storage device is ready to switch cycles. As discussed above in connection with the flow chart 780 of FIG. 21, the host queries each of the local storage devices to determine if each of the local storage devices is ready to switch. In response to the query provided by the host, the local storage device examines the internal variable set at the step 896 and returns the result to the host.

Following step 896 is a test step 898 where the local storage device waits to receive the command from the host to perform the cycle switch. As discussed above in connection with the flow chart 780 of FIG. 21, the host provides a command to switch cycles to the local storage device when the local storage device is operating in multi-box mode. Thus, the local storage device waits for the command at the step 898, which is only reached when the local storage device is operating in multi-box mode.

Once the local storage device has received the switch command from the host, control transfers from the step 898 to a step 902 to send a commit message to the remote storage device. Note that the step 902 is also reached from the test step 892 if it is determined at the step test 892 that the local storage device is not in multi-box mode. At the step 902, the local storage device sends a commit message to the remote storage device. In response to receiving a commit message for a particular sequence number, the remote storage device will begin restoring the data corresponding to the sequence number, as discussed above.

Following the step 902 is a step 906 where the sequence number is incremented and a new value for the tag (from the host) is stored. The sequence number is as discussed above. The tag is the tag provided to the local storage device at the step 764 and at the step 796, as discussed above. The tag is used to facilitate data recovery, as discussed elsewhere herein.

Following the step 906 is a step 907 where completion of the cycle switch is confirmed from the local storage device to the host by sending a message from the local storage device to the host. In some embodiments, it is possible to condition performing the step 907 on whether the local storage device is in multi-box mode or not, since, if the local storage device is not in multi-box mode, the host is not necessarily interested in when cycle switches occur.

Following the step 907 is a step 908 where the bits for the HA's that are used in the test step 836 are all cleared so that the bits may be set again in connection with the increment of the sequence number. Following the step 908 is a test step 912 which determines if the remote storage device has acknowledged the commit message. Note that if the local/remote pair is operating in multi-box mode and the remote storage device active chunk was determined to be empty at the step 894, then the remote storage device should acknowledge the commit message nearly immediately since the remote storage device will be ready for the cycle switch immediately because the active chunk thereof is already empty.

Once it is determined at the test step 912 that the commit message has been acknowledged by the remote storage device, control transfers from the step 912 to a step 914 to clear (discard, erase, etc.) the transfer log that indicates which of the tracks (and/or portions thereof) of the previous inactive cycle have been transmitted to the remote device. Following the step 914 is a step 916 where a new transfer log mechanism (i.e., a new slot) is initialized. Following step 916 is a step 918 where the suspension of copying, which was provided at the step 899, is cleared so that copying may resume. Following step 918, processing is complete. Note that it is also possible to go from the step 918 back to the step 832 to begin a new cycle to continuously increment the sequence number.

Figure 23:
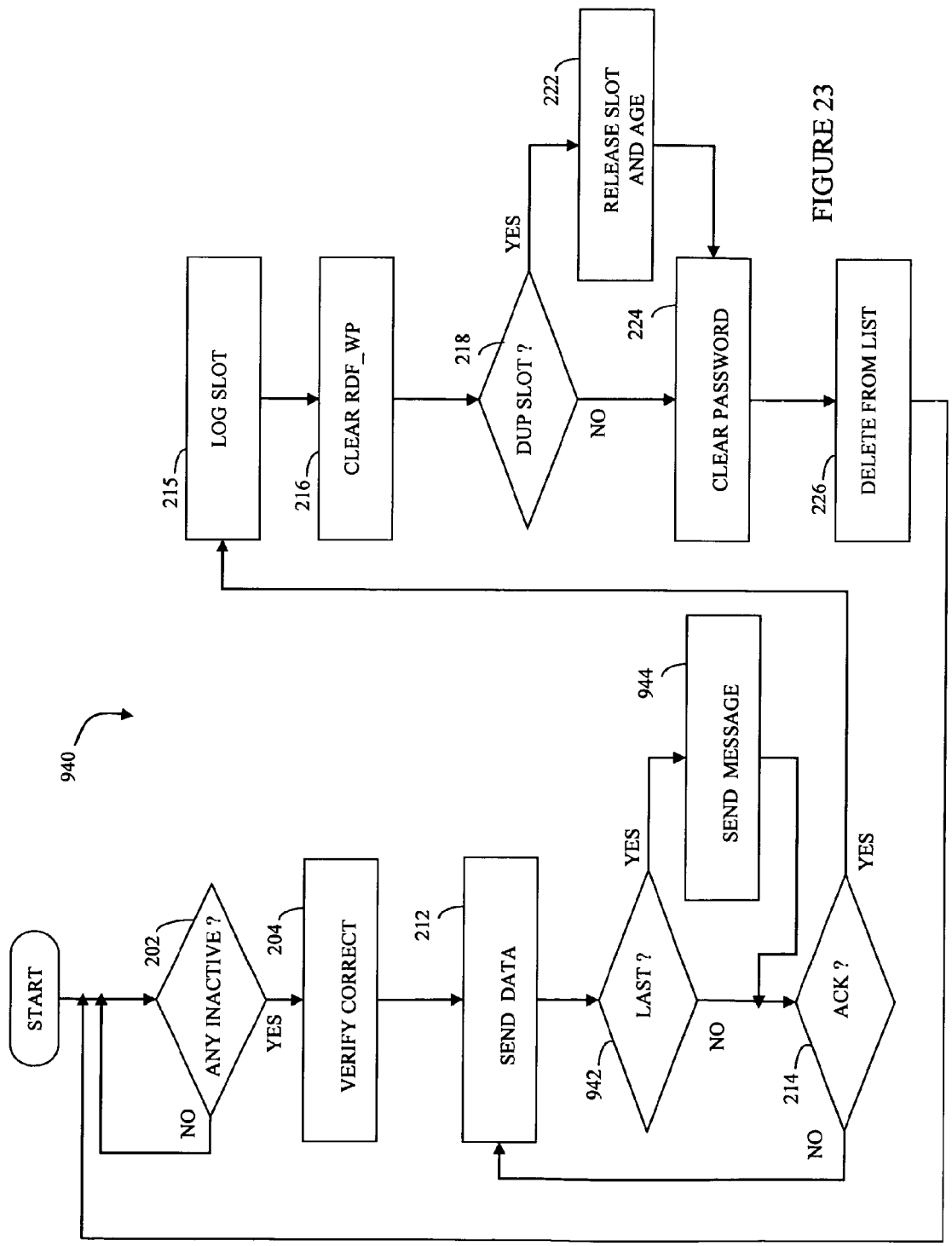
FIG. 23 is a flow chart illustrating transferring data from a local storage device to a remote storage device according to an embodiment of the system described herein.

Referring to FIG. 23, a flow chart 940 illustrates steps performed in connection with RA's scanning the inactive buffers to transmit RDF data from the local storage device to the remote storage device. The flow chart 940 of FIG. 23 is similar to the flow chart 200 of FIG. 7 and similar steps are given the same reference number. However, the flow chart 940 includes two additional steps 942, 944 which are not found in the flow chart 200 of FIG. 7. The additional steps 942, 944 are used to facilitate multi-box processing. After data has been sent at the step 212, control transfers from the step 212 to a test step 942 which determines if the data being sent is the last data in the inactive chunk of the local storage device. If not, then control transfers from the step 942 to the step 214 and processing continues as discussed above in connection with the flow chart 200 of FIG. 7. Otherwise, if it is determined at the test step 942 that the data being sent is the last data of the chunk, then control transfers from the step 942 to the step 944 to send a special message from the local storage device to the remote storage device indicating that the last data has been sent. Following the step 944, control transfers to the step 214 and processing continues as discussed above in connection with the flow chart 200 of FIG. 7. In some embodiments, the steps 942, 944 may be performed by a separate process (and/or separate hardware device) that is different from the process and/or hardware device that transfers the data.

Figure 24:
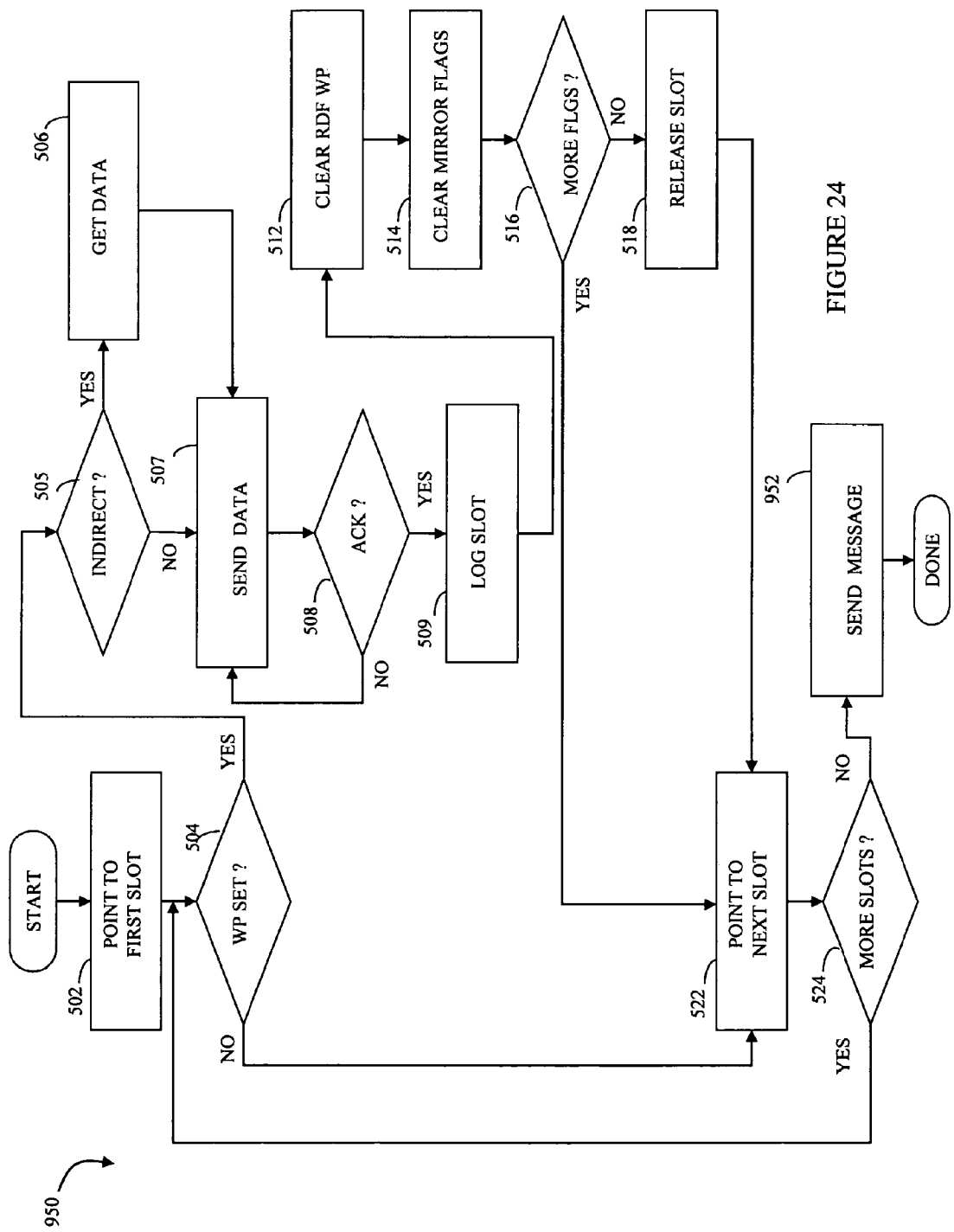
FIG. 24 is a flow chart illustrating transferring data from a local storage device to a remote storage device according to an alternative embodiment of an embodiment of the system described herein.

Referring to FIG. 24, a flow chart 950 illustrates steps performed in connection with RA's scanning the inactive buffers to transmit RDF data from the local storage device to the remote storage device. The flow chart 950 of FIG. 24 is similar to the flow chart 500 of FIG. 14 and similar steps are given the same reference number. However, the flow chart 950 includes an additional step 952, which is not found in the flow chart 500 of FIG. 14. The additional steps 952 is used to facilitate multi-box processing and is like the additional step 944 of the flowchart 940 of FIG. 23. After it is determined at the test step 524 that no more slots remain to be sent from the local storage device to the remote storage device, control transfers from the step 524 to the step 952 to send a special message from the local storage device to the remote storage device indicating that the last data for the chunk has been sent. Following the step 952, processing is complete.

Figure 25:
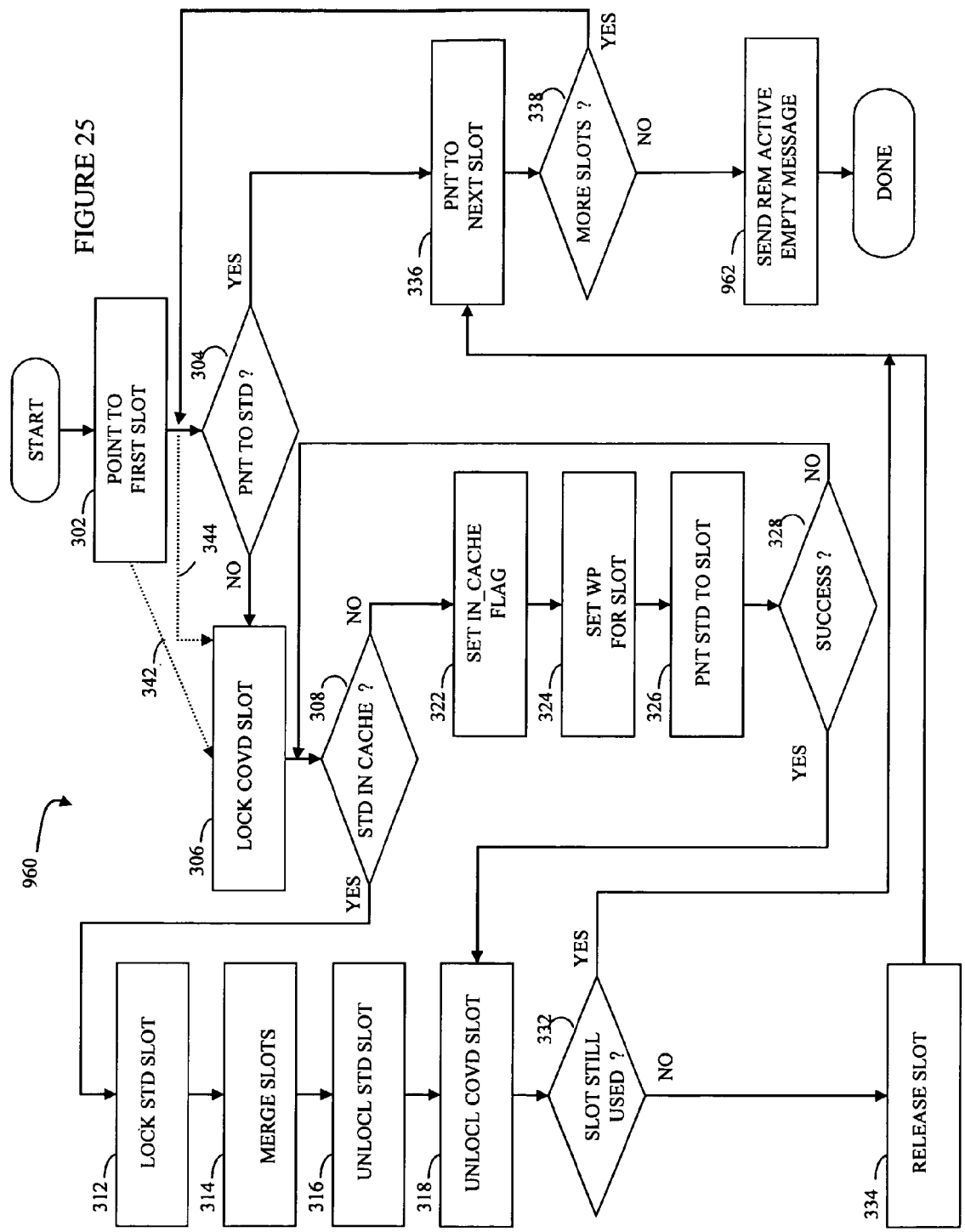
FIG. 25 is a flow chart illustrating providing an active empty indicator message from a remote storage device to a corresponding local storage device according to an embodiment of the system described herein.

Referring to FIG. 25, a flow chart 960 illustrates steps performed at the remote storage device in connection with providing an indication that the active chunk of the remote storage device is empty. The flow chart 960 is like the flow chart 300 of FIG. 10 except that the flow chart 960 shows a new step 962 that is performed after the active chunk of the remote storage device has been restored. At the step 962, the remote storage device sends a message to the local storage device indicating that the active chunk of the remote storage device is empty. Upon receipt of the message sent at the step 962, the local storage device sets an internal variable indicating that the inactive buffer of the remote storage device is empty. The local variable is examined in connection with the test step 894 of the flow chart 830 of FIG. 22, discussed above.

Figure 26:
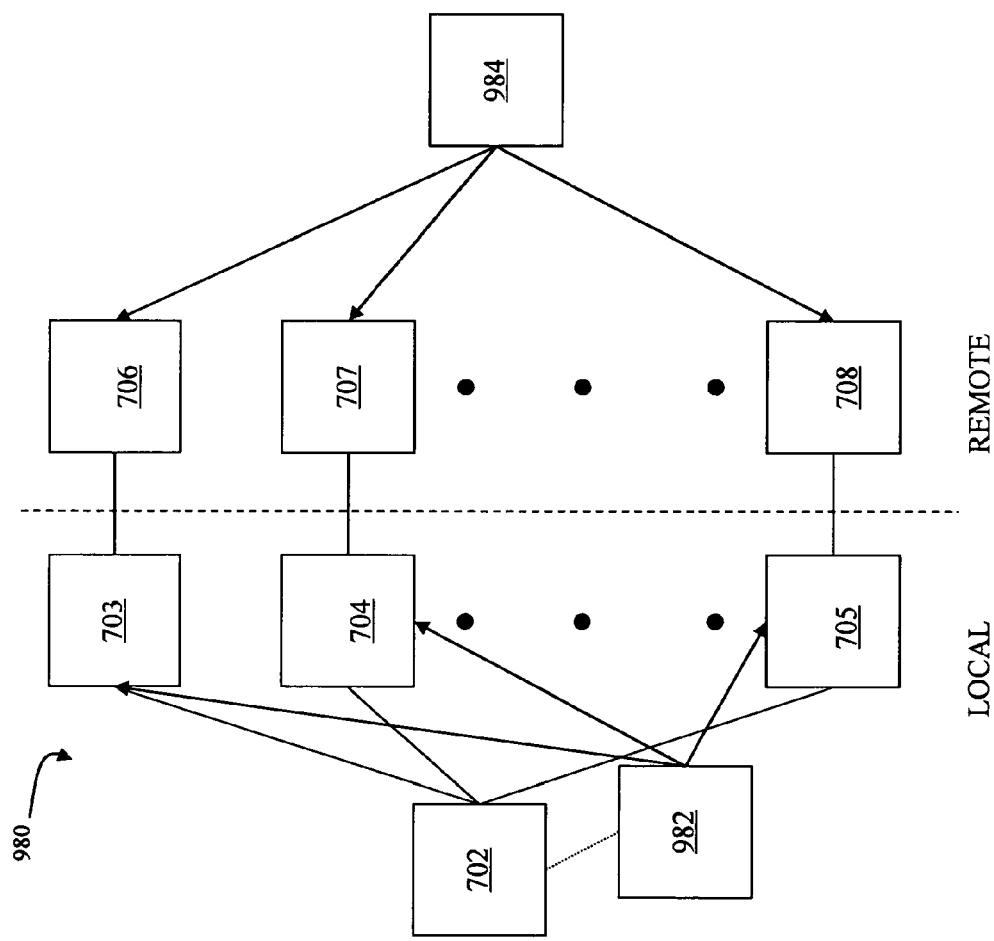
FIG. 26 is a schematic diagram illustrating a plurality of local and remote storage devices with a plurality of hosts according to an embodiment of the system described herein.

Referring to FIG. 26, a diagram 980 illustrates the host 702, local storage devices 703-705 and remote storage devices 706-708, that are shown in the diagram 700 of FIG. 18. The diagram 980 also includes a first alternative host 982 that is coupled to the host 702 and the local storage devices 703-705. The diagram 980 also includes a second alternative host 984 that is coupled to the remote storage devices 706-708. The alternative hosts 982, 984 may be used for data recovery, as described in more detail below.

When recovery of data at the remote site is necessary, the recovery may be performed by the host 702 or, by the host 982 provided that the links between the local storage devices 703-705 and the remote storage devices 706-708 are still operational. If the links are not operational, then data recovery may be performed by the second alternative host 984 that is coupled to the remote storage devices 706-708. The second alternative host 984 may be provided in the same location as one or more of the remote storage devices 706-708. Alternatively, the second alternative host 984 may be remote from all of the remote storage devices 706-708. The table 730 that is propagated throughout the system is accessed in connection with data recovery to determine the members of the multi-box group.

Figure 27:
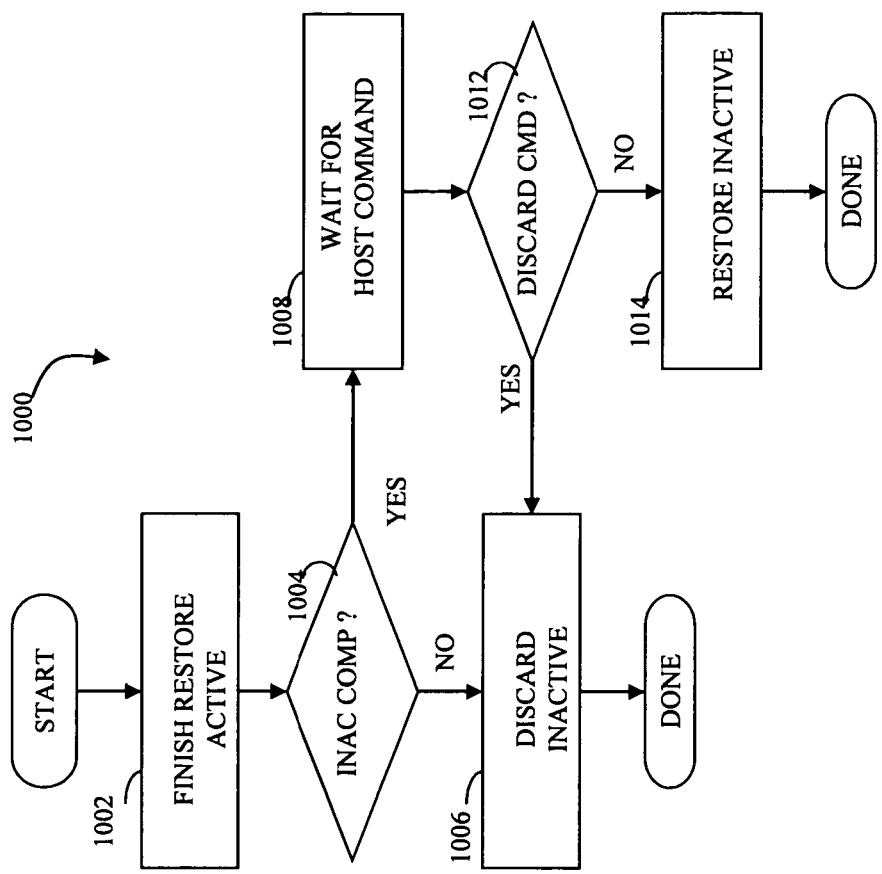
FIG. 27 is a flow chart illustrating a processing performed by a remote storage device in connection with data recovery according to an embodiment of the system described herein.

Referring to FIG. 27, a flow chart 1000 illustrates steps performed by each of the remote storage devices 706-708 in connection with the data recovery operation. The steps of the flowchart 1000 may be executed by each of the remote storage devices 706-708 upon receipt of a signal or a message indicating that data recovery is necessary. In some embodiments, it may be possible for a remote storage device to automatically sense that data recovery is necessary using, for example, conventional criteria such as length of time since last write.

Processing begins at a first step 1002 where the remote storage device finishes restoring the active chunk in a manner discussed elsewhere herein. Following the step 1002 is a test step 1004 which determines if the inactive chunk of the remote storage device is complete (i.e., all of the data has been written thereto). Note that a remote storage device may determine if the inactive chunk is complete using the message sent by the local storage device at the steps 944, 952, discussed above. That is, if the local storage device has sent the message at the step 944 or the step 952, then the remote storage device may use receipt of that message to confirm that the inactive chunk is complete.

If it is determined at the test step 1004 that the inactive chunk of the remote storage device is not complete, then control transfers from the test step 1004 to a step 1006 where the data from the inactive chunk is discarded. No data recovery is performed using incomplete inactive chunks since the data therein may be inconsistent with the corresponding active chunks. Accordingly, data recovery is performed using active chunks and, in some cases, inactive chunks that are complete. Following the step 1006, processing is complete.

If it is determined at the test step 1004 that the inactive chunk is complete, then control transfers from the step 1004 to the step 1008 where the remote storage device waits for intervention by the host. If an inactive chunk, one of the hosts 702, 982, 984, as appropriate, needs to examine the state of all of the remote storage devices in the multi-box group to determine how to perform the recovery. This is discussed in more detail below.

Following step 1008 is a test step 1012 where it is determined if the host has provided a command to all storage device to discard the inactive chunk. If so, then control transfers from the step 1012 to the step 1006 to discard the inactive chunk. Following the step 1006, processing is complete.

If it is determined at the test step 1012 that the host has provided a command to restore the complete inactive chunk, then control transfers from the step 1012 to a step 1014 where the inactive chunk is restored to the remote storage device. Restoring the inactive chunk in the remote storage device involves making the inactive chunk an active chunk and then writing the active chunk to the disk as described elsewhere herein. Following the step 1014, processing is complete.

Figure 28:
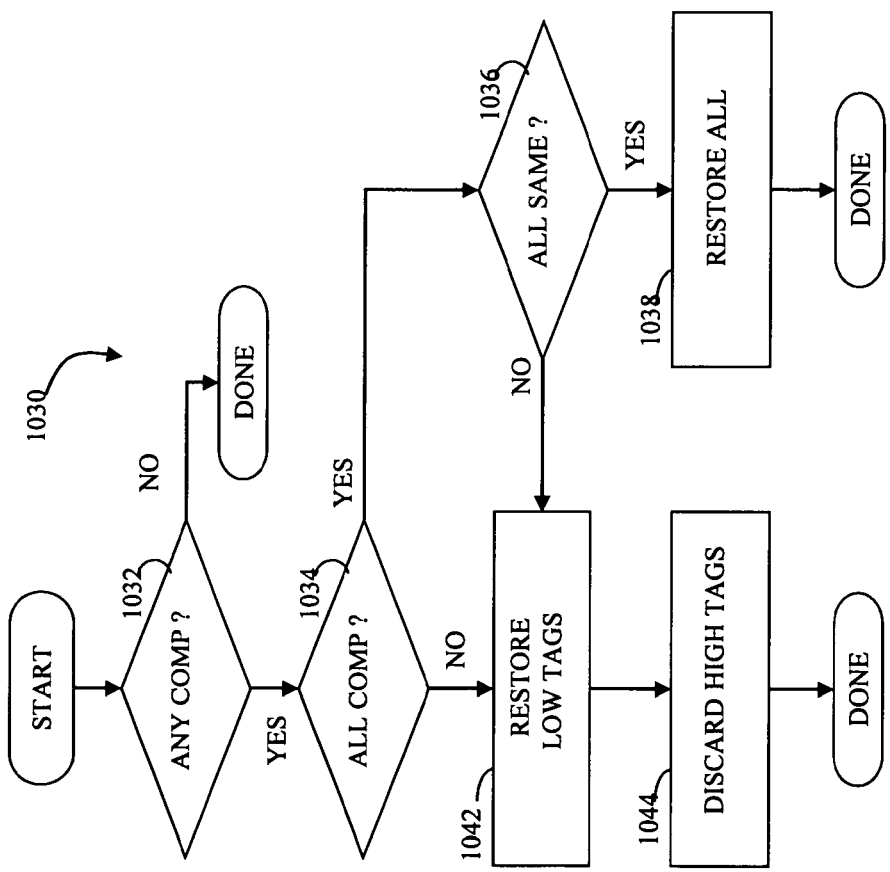
FIG. 28 is a flow chart illustrating a processing performed by a host in connection with data recovery according to an embodiment of the system described herein.

Referring to FIG. 28, a flow chart 1030 illustrates steps performed in connection with one of the hosts 702, 982, 984 determining whether to discard or restore each of the inactive chunks of each of the remote storage devices. The one of the hosts 702, 982, 984 that is performing the restoration communicates with the remote storage devices 706-708 to provide commands thereto and to receive information therefrom using the tags that are assigned by the host as discussed elsewhere herein.

Processing begins at a first step 1032 where it is determined if any of the remote storage devices have a complete inactive chunk. If not, then there is no further processing to be performed and, as discussed above, the remote storage devices will discard the incomplete chunks on their own without host intervention. Otherwise, control transfers from the test step 1032 to a test step 1034 where the host determines if all of the remote storage devices have complete inactive chunks. If so, then control transfers from the test step 1034 to a test step 1036 where it is determined if all of the complete inactive chunks of all of the remote storage devices have the same tag number. As discussed elsewhere herein, tags are assigned by the host and used by the system to identify data in a manner similar to the sequence number except that tags are controlled by the host to have the same value for the same cycle.

If it is determined at the test step 1036 that all of the remote storage devices have the same tag for the inactive chunks, then control transfers from the step 1036 to a step 1038 where all of the inactive chunks are restored. Performing the step 1038 ensures that all of the remote storage devices have data from the same cycle. Following the step 1038, processing is complete.

If it is determined at the test step 1034 that all of the inactive chunks are not complete, or if it is determined that at the step 1036 that all of the complete inactive chunks do not have the same tag, then control transfers to a step 1042 where the host provides a command to the remote storage devices to restore the complete inactive chunks having the lower tag number. For purposes of explanation, it is assumed that the tag numbers are incremented so that a lower tag number represents older data. By way of example, if a first remote storage device had a complete inactive chunk with a tag value of three and a second remote storage device had a complete inactive chunk with a tag value of four, the step 1042 would cause the first remote storage device (but not the second) to restore its inactive chunk. Following the step 1042 is a step 1044 where the host provides commands to the remote storage devices to discard the complete inactive buffers having a higher tag number (e.g., the second remote storage device in the previous example). Following step 1044, processing is complete.

Following execution of the step 1044, each of the remote storage devices contains data associated with the same tag value as data for the other ones of the remote storage devices. Accordingly, the recovered data on the remote storage devices 706-708 should be consistent.

When data is being recovered following a link failure between the local storage device and the remote storage device, it is desirable to minimize the amount of overhead needed to resynchronize the storage devices. Of course, for intermittent and relatively short term link failures, the system may simply wait for the link to be restored and then resume operations. However, once the failure has caused the partial inactive cycle data to be discarded (as described above), then it is possible to use the transfer log data stored at the local storage device to provide efficient data recovery.

Figure 29:
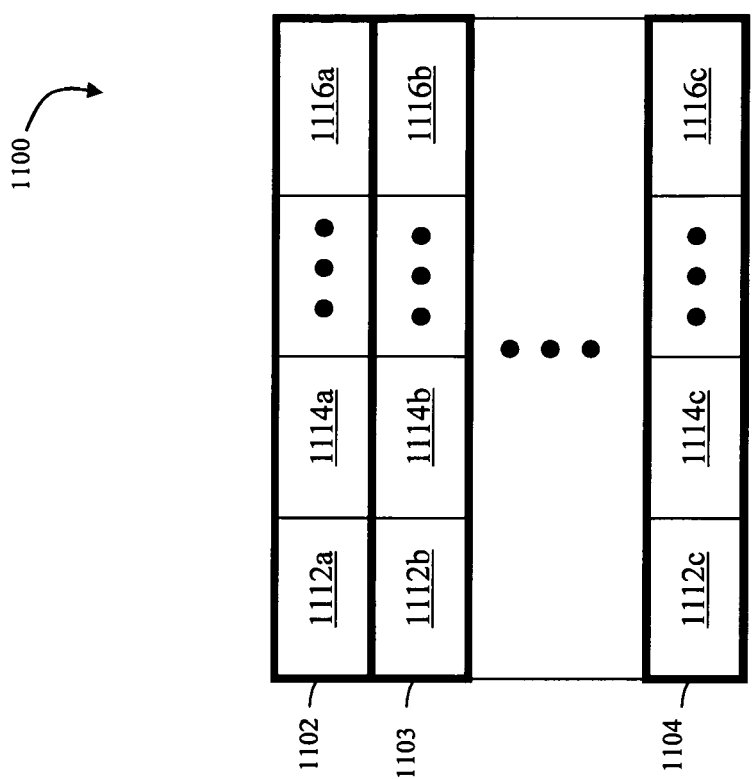
FIG. 29 is a schematic diagram illustrating a track change table according to an embodiment of the system described herein.

Referring to FIG. 29, a track change table 1100 is part of device information that is provided with logical devices, such as the standard logical device 62 associated with the local storage device 24. The table 1100 contains a plurality of entries 1102-1104, each of which may correspond to a track (or some other increment) of the standard logical device. There are a plurality of fields 1112a-1112c, 1114a-1114c, 1116a-1116c associated with the entries 1102-1104 that relate to the state of mirrors for the standard logical device to indicate whether the corresponding track has valid (up-to-date) data for the particular mirror represented by the field. At least one of the fields for each entry may correspond to the standard logical device itself. Thus, for example, the entry 1102 may correspond to a particular logical track of the standard logical device and the field 1112a may indicate whether the particular track of the standard logical device contains valid data while the field 1114a may indicate whether a corresponding track of a local mirror standard logical device contains valid data and the field 1116a may indicate whether a corresponding track of a remote storage device (RDF R2 device) contains valid data.

Note that when data for a particular track of a standard logical device is modified locally, the corresponding track for any mirrors (local or remote) for the particular track become invalid and remain so unless and until the change is propagated to the mirrors. Thus, for example, when the host 22 of FIG. 3 writes data for a particular track to the standard logical device 62, an appropriate field of the track change table for the standard logical device 62 may indicate that a corresponding track for the standard logical device 64 is invalid. However, after the data has been successfully transmitted to the remote storage device 26, the field may be changed to indicate that the corresponding track of the standard logical device 64 is valid. Thus, for example, as data in the inactive cycle 62 is transmitted from the local storage device 24 to the remote storage device 26, the corresponding fields in the track change table are marked valid. Note that, once all fields for a track are valid, the corresponding slot in the cache table may be reused.

As discussed above, when failure is detected, the remote storage device may perform recovery operations that include discarding data received for any incomplete inactive cycle. In such a case, the remote storage device may indicate in its track change table that the corresponding tracks from the discarded cycle are locally invalid. Of course, this information may be combined with information from the track change table at the local storage device to reconstruct the discarded cycle. However, it may be desirable to avoid having to do this.

Figure 30:
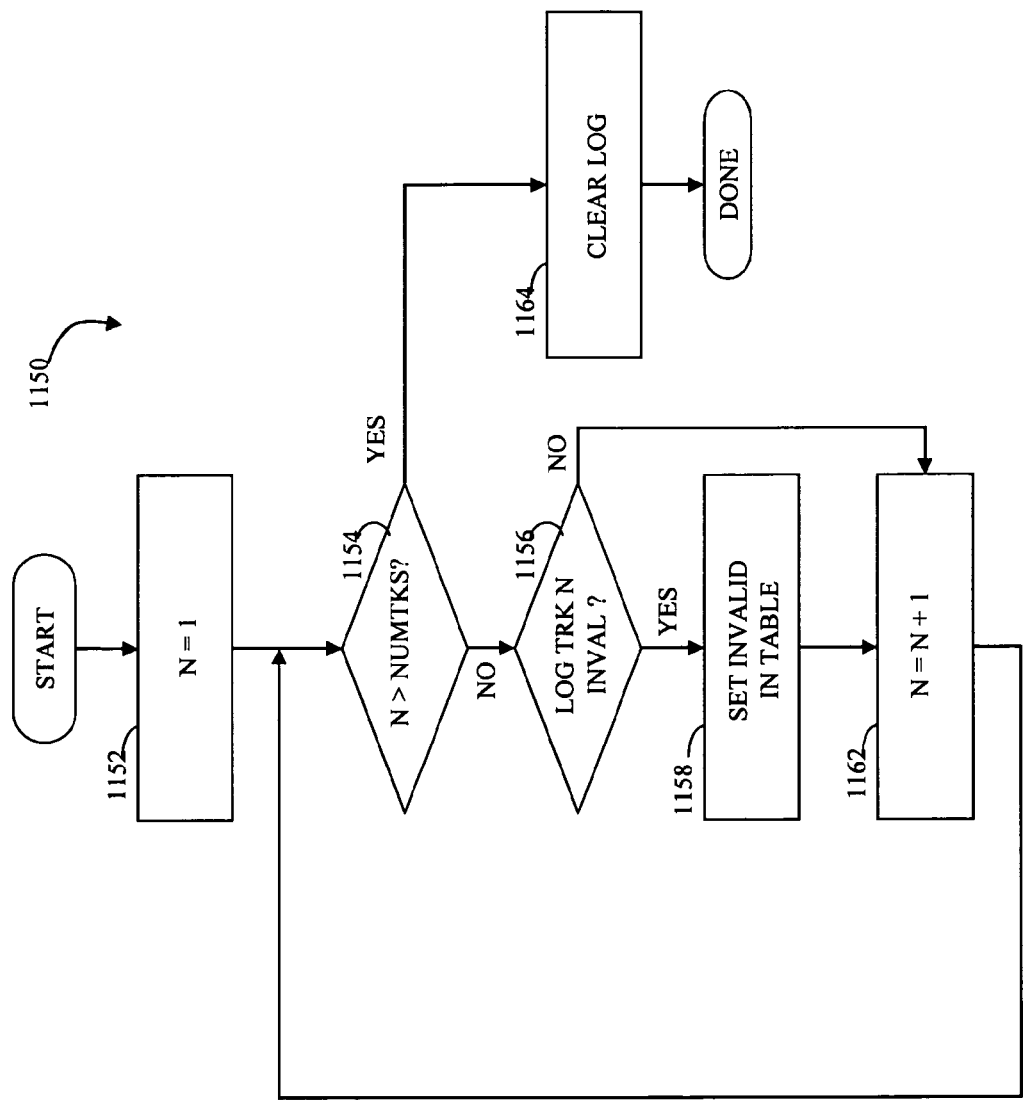
FIG. 30 is a flow chart illustrating using a transfer log to modify a track change table according to an embodiment of the system described herein.

Referring to FIG. 30, a flow chart 1150 illustrates steps performed at a local storage device using the transfer log data to modify the track change table in connection with a recovery. Processing begins at a first step 1152 where an index variable, N, is set to one. Following the step 1152 is a test step 1154 where it is determined if the index variable, N, exceeds total the number of tracks for the standard logical device. If not, then control transfers from the step 1154 to a test step 1156 where it is determined if the transfer log data indicates that track N is invalid (transferred in an incomplete inactive cycle prior to the failure). If so, then control transfers from the step 1156 to a step 1158 where a corresponding field in the entry for track N is set to invalid to indicate that the data for track N at the remote storage location is not up-to-date.

Following the step 1158 is a step 1162 where the index variable, N, is incremented. Note that the step 1162 is also reached from the step 1156 if it is determined at the step 1156 that the transfer log data does not indicate that track N is invalid. Following the step 1162, control transfers back to the step 1154 for another iteration. If it is determined at the step 1154 that the value for the index variable, N, exceeds the number of tracks, then control transfers from the step 1154 to a step 1164 to clear (discard, erase, etc.) the transfer log, which is no longer needed. Following the step 1164, processing is complete.

Figure 31:
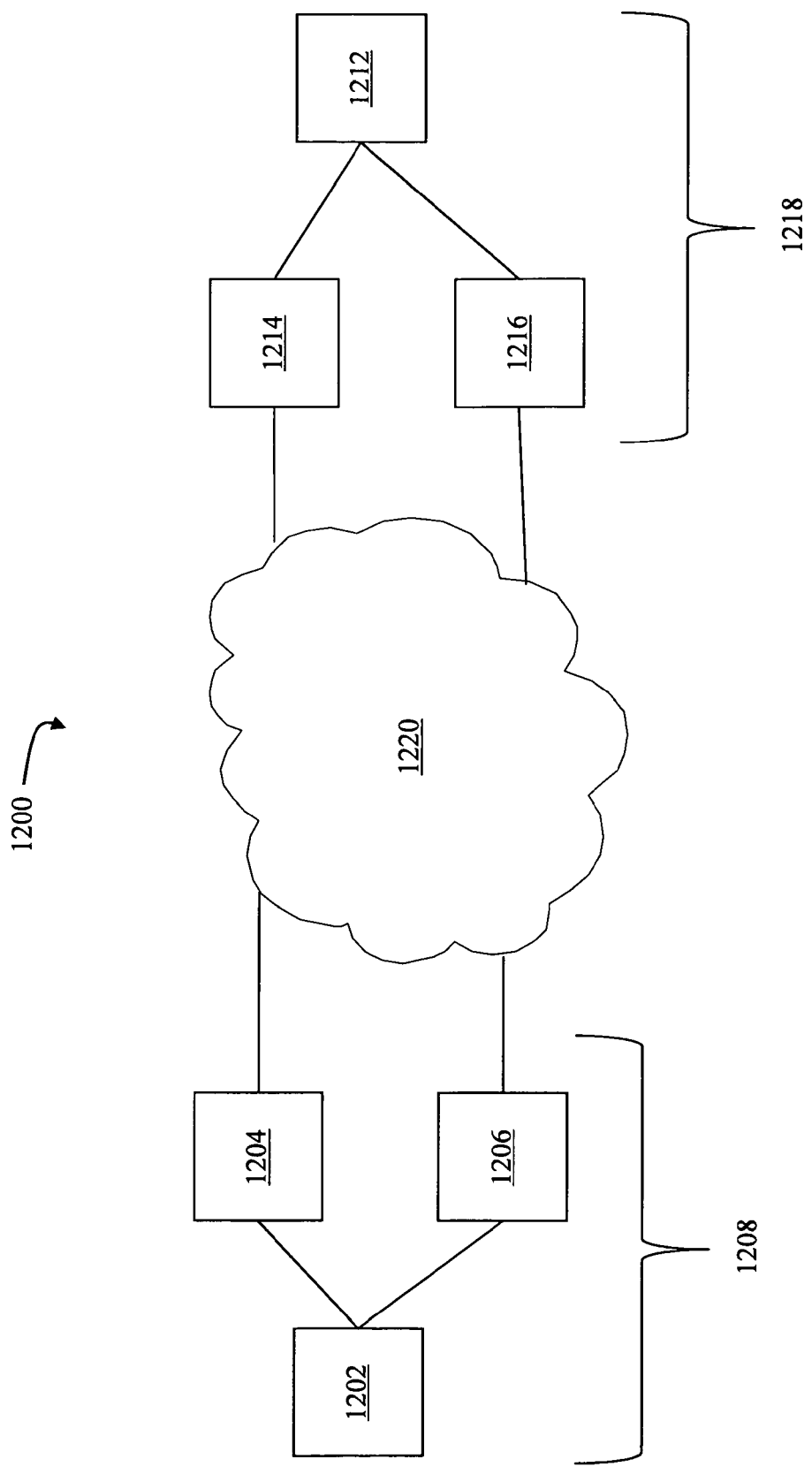
FIG. 31 is a schematic diagram illustrating system having a local site, a remote site, and tape emulation according to an embodiment of the system described herein.

Referring to FIG. 31, a diagram 1200 shows a local host 1202 coupled to a local storage device 1204 and coupled to a local tape emulation 1206 at a local site 1208. The local host 1202 may be any appropriate computing device, such as an IBM System z computing device. The local storage device 1204 may be any storage device capable of providing the functionality described herein, such as Symmetrix storage array provided by EMC Corporation of Hopkinton, Mass. The local tape emulation 1206 provides tape emulation functionality to the local host 1202 so that applications on the host 1202 that access tape data write tape data and commands to the tape emulation 1206 and read tape data and status from the tape emulation 1206 as if the tape emulation 1206 were an actual computer tape device. The tape emulation 1206 may be implemented using any appropriate device, such as the DLm960 device provided by EMC Corporation of Hopkinton, Mass. Note that, although only a single local host 1202, a single local storage device 1204, and a single local tape emulation 1206 are shown, it is understood by one of ordinary skill in the are that the system may be extended to have more than one of one or more of each.

The diagram 1200 also shows a remote host 1212 coupled to a remote storage device 1214 and coupled to a remote tape emulation 1216 at a remote site 1218. Components at the remote site 1218 may be similar to components at the local site 1208 so that, for example, the remote host 1212 may be any appropriate computing device, such as an IBM System z computing device and the remote storage device 1214 may be any storage device capable of providing the functionality described herein, such as Symmetrix storage array provided by EMC Corporation of Hopkinton, Mass. Components at the remote site 1218 may be different from counterpart components at the local site 1208. The remote tape emulation 1216 may be implemented using any appropriate device that provides tape emulation as described herein, such as the DLm960 device provided by EMC Corporation of Hopkinton, Mass. Note that, although only a single remote host 1212, a single storage device 1214, and a single remote tape emulation 1216 are shown, it is understood by one of ordinary skill in the are that the system may be extended to have more than one of one or more of each.

The local site 1208 and the remote site 1218 may be coupled using a network 1220. The network 1220 may be the Internet, a different TCP/IP network, a SAN, a WAN, and/or any other appropriate mechanism for transporting data between the sites 1208, 1218, including one or more possible direct connections between components at the sites 1208, 1218. The network 1220 facilitates synchronous and/or asynchronous data communication between the sites 1208, 1218 so that data from the local storage device 1204 may be replicated to the remote storage device 1214 and data from the local tape emulation 1206 may be replicated to the remote tape emulation 1216. In an embodiment herein, data is replicated asynchronously from the local site 1208 to the remote site 1218. The remote site 1218 may be used for disaster recovery in instances when the local site 1208 fails.

Figure 32:
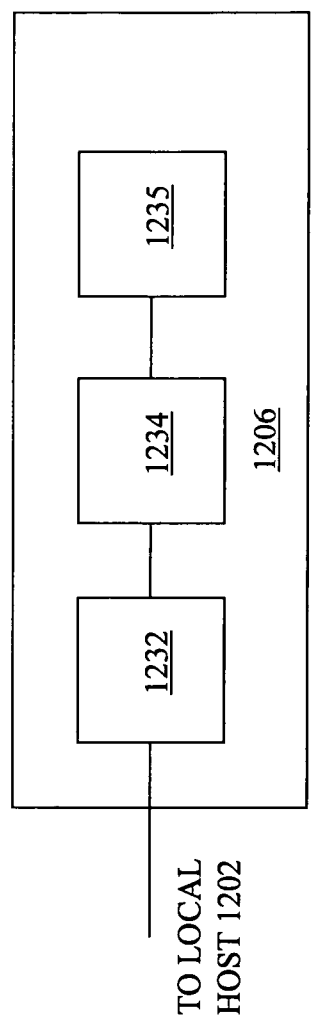
FIG. 32 is a schematic diagram illustrating a tape emulation system according to an embodiment of the system described herein.

Referring to FIG. 32, the local tape emulation 1206 is shown in more detail as including a front end component 1232, a data mover/server 1234, and a tape emulation storage device 1235 coupled thereto. The front end component 1232 may include a FICON link that may be couple to the local host 1206 for data communication between the local host 1202 and the local tape emulation 1206. Other types of links may be used. The front end component 1232 may include FICON link emulation functionality as well as tape emulation functionality, such as that provided by components of the DLm960.

The data mover/server 1234 may be coupled to the front end component 1232 using, for example, a GigE switch while the storage device 1235 is coupled to the data mover/server 1234 using any appropriate protocol, such as Fibre Channel. The data mover/server 1234 may be accessed by the front end component 1232 using any appropriate protocol, such as NFS (Network File System). In an embodiment herein, the data mover/server 1234 may include an NFS server, such as a Celerra data mover, and the storage device 1235 may be a Clarrion or Symmetrix data storage array. There may be other components used instead of, and/or in addition to, the NFS server and the data storage array.

Figure 33:
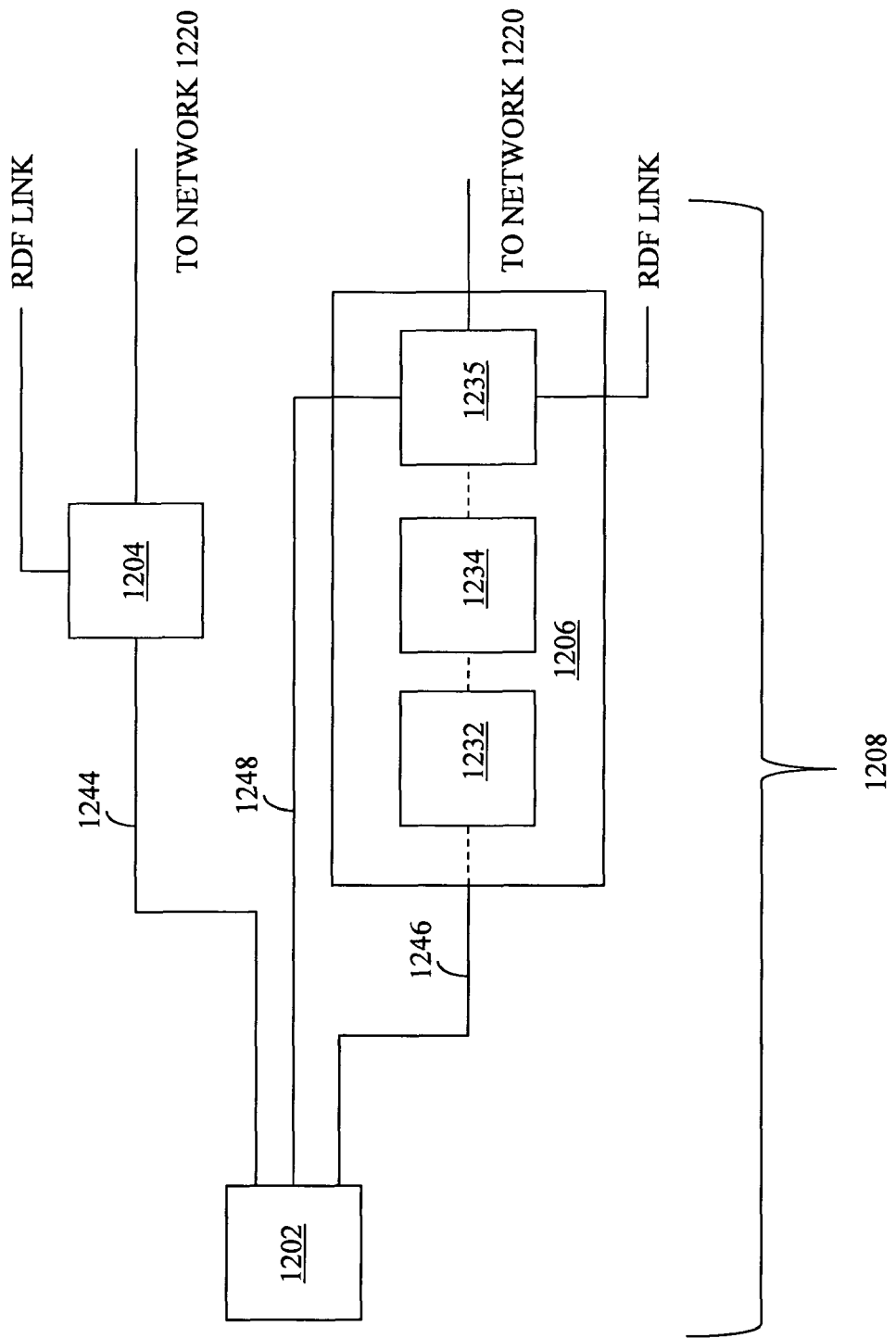
FIG. 33 is a diagram illustrating a local site having a host, a storage device, and a tape emulation system according to an embodiment of the system described herein.

Referring to FIG. 33, the local site 1208 is shown with the local host 1202, the local storage device 1204 and the local tape emulation 1206. The storage device 1204 may contain additional tape data (tape management data, such as tape retention time, tape ownership, tape security, etc.), including data written to tape by applications on the local host 1202, as well as possibly additional tape information.

The local host 1202 may be coupled to the local storage device 1204 using a first link 1244. The local host 1202 may be coupled to the local tape emulation device 1206 using a second link 1246. The local host 1202 may exchange tape data, status, and commands with the local tape emulation 1206 via the second link 1246. The local host 1202 may also be coupled to the storage device 1235 of the local tape emulation 1206 using a third link 1248 for facilitating switching, consistency, etc. as discussed in more detail elsewhere herein. In an embodiment herein, the links 1244, 1246, 1248 may be FICON links, although other types of links may be used. The storage devices 1204, 1235 are coupled to the network 1220. In addition, the storage devices 1235 may each include an RDF link that is like the RDF link 29, discussed above. Use of the RDF links of the storage devices 1204, 1235 is discussed in more detail elsewhere herein.

The system described herein may use the local host 1202 to control cycle switching for the storage devices 1204, 1235 as described elsewhere herein. See, for example, the description corresponding to FIG. 18 in which the host 702 controls cycle switching of the storage devices 703-705. That is, the storage devices 1204, 1235 may asynchronously transfer data to the remote site 1218 using the mechanism described herein where the local host 1202 controls and coordinates the timing of cycle switching for the storage devices 1204, 1235.

Data is accumulated in chunks at the storage devices 1204, 1235, and the cycle switching for the storage devices 1204, 1235 is coordinated so that data from the same cycle for each of the storage devices 1204, 1235 is transferred to the remote site 1218 concurrently. The link 1248 handles cycle switching commands and status for the storage device 1235 while data for the storage device 1235 is provided via the link 1246 (through the front end component 1232 and the data mover/server 1234). Thus, the additional tape data provided in the local storage device 1204 is transferred concurrently with the tape data provided in the storage device 1235. Note, by the way, that both switching information and data may be provided to the storage device 1204 via the single link 1244.

Figure 34:
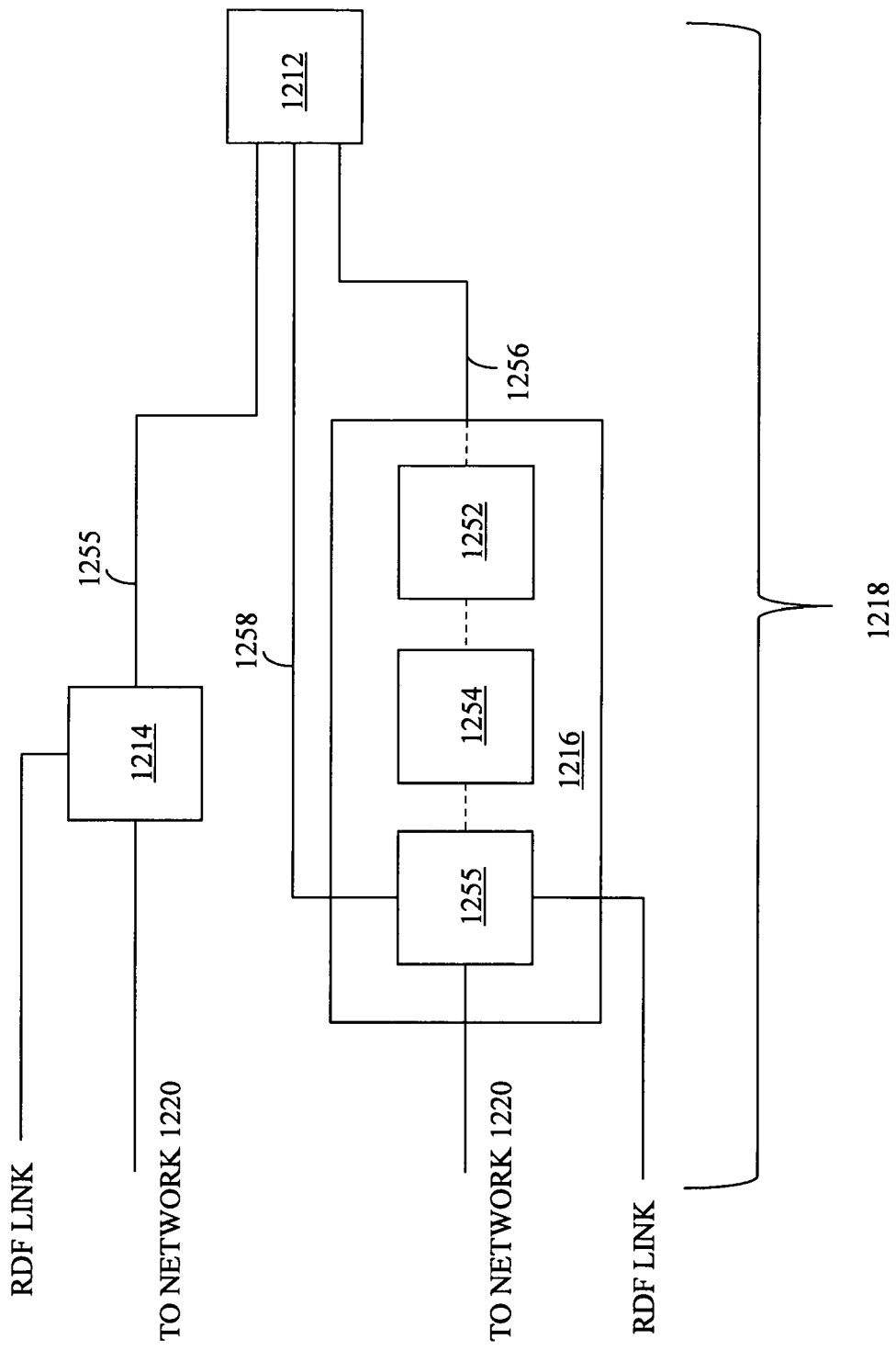
FIG. 34 is a diagram illustrating a remote site having a host, a storage device, and a tape emulation system according to an embodiment of the system described herein.

Referring to FIG. 34, the remote site 1218 is shown with the remote host 1212, the remote storage device 1214 and the remote tape emulation 1216. The remote tape emulation 1216 is shown in detail as including a front end component 1252, like the front end component 1232, discussed above, a data mover/server 1254, and a tape emulation storage device 1255, like the tape emulation storage device 1235, discussed above.

The storage device 1255 is coupled to the network 1220 and may contain tape data and/or additional tape information transferred to the remote site 1218 via the network 1220. The storage device 1214 is also coupled to the network 1220. In the event of a failover to the remote site 1218 in which the remote host 1212 becomes operational, the remote host 1212 would interact with the remote tape emulation 1216 to exchange tape data and/or additional tape emulation information with the storage device 1255.

The storage devices 1214, 1255 may also each include an RDF link, like the RDF link 29, discussed above. In an embodiment herein, the RDF link of the storage device 1214 may be coupled to the storage device 1204 to provide synchronous or asynchronous RDF data transfer therebetween. Similarly, the RDF link of the storage device 1255 may be coupled to the storage device 1235 to provide synchronous or asynchronous RDF data transfer therebetween.

The remote host 1212 may be coupled to the remote storage device 1214 using a first link 1255. The remote host 1212 may be coupled to the remote tape emulation device 1216 using a second link 1256. The remote host 1212 may exchange tape data, status, and commands with the remote tape emulation 1216 via the second link 1256. The remote host 1212 may also be coupled to the storage device 1255 of the remote tape emulation 1216 by a third link 1258. In an embodiment herein, the links 1255, 1256, 1258 may be FICON links, although other types of links may be used.

Note that, so long as there has been no failover to the remote site 1218, there is no need for the third link 1258 (which facilitates switching, consistency, etc. of the storage device 1255) since switching of the storage devices 1214, 1255 is controlled by data and commands received via the network 1220 from the corresponding storage devices 1204, 1242. However, following a failover to the remote site 1218, it may be necessary to provided cycle switching information (and/or consistency information) from the remote host 1212 to the storage device 1255 via the link 1258. For example, it may be useful to provide disaster recovery backup to yet another site (not shown). In addition, after a failover and subsequent recovery of the local site 1202, it may be necessary to transfer the more current data from the remote site 1218 to the local site 1202, in which case it may be useful to control cycle switching of the storage device 1255.

Note that other types of communication/synchronization are possible for the system shown herein. For example, it may be possible to have the storage devices 1204, 1235 be in the same consistency group, and then use the links 1244, 1248 for control thereof. Consistency groups are explained, for example, in U.S. Pat. No. 6,493,796 titled: "Method and apparatus for maintaining consistency of data stored in a group of mirroring devices" to Arnon, et al. and U.S. Pat. No. 6,308,284 titled: "Method and apparatus for maintaining data coherency" to LeCrone, et al., both of which are incorporated by reference herein. In such a case, the storage devices 1214, 1255 may also be maintained as a consistency group (i.e., in addition to the storage devices 1204, 1235).

In some cases, it may be desirable to provide continuous availability of the tape emulation device described herein. Continuous availability may be provided by maintaining one or more mirrors for the tape emulation device so that, upon failure of a primary tape device, processing can continue using an alternate tape device containing the mirrored data. The storage devices containing tape emulation data synchronously (or possibly asynchronously) mirrored (using, for example, the RDF links described herein). In some instances, it may be useful to be able to switch from a primary tape device to a backup tape device without involvement of an application. That is, rather than needing to include special code in all applications for handling tape device failures, it may be desirable to swap tape devices at a level that is transparent to the application(s). In such a case, the application(s) would continuously access the tape device even though access to the original tape device has failed. Such a mechanism is described, for example, in U.S. Pat. No. 6,874,046, which is incorporated by reference herein.

Figure 35:
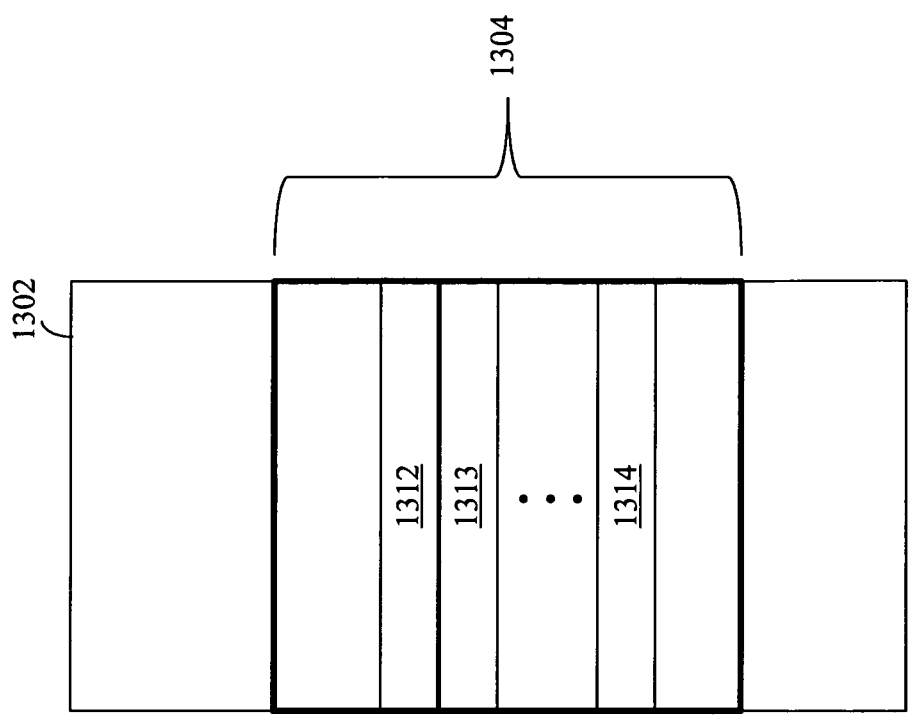
FIG. 35 is a diagram illustrating a memory of a host according to an embodiment of the system described herein.

Referring to FIG. 35, a memory space 1302 of a host computer (e.g., the host 22) includes a common area 1304 that may be accessed by different application running on the host computer. In an embodiment herein, more than one of the applications of the host computer may access that same portion(s) of the common area 1304, although in some embodiments, there may be restrictions on multiple applications accessing the same memory space for writing at the same time and/or restrictions on simultaneous reading and writing.

In an embodiment herein, the host computer may be an IBM system running the MVS or z/OS operating system, although the system described herein may be implemented using any appropriate operating system. The common area 1304 may include a plurality of UCBs (Unit Control Blocks) 1312-1314, which provide metadata for applications to access logical devices. In some cases (e.g., storage devices), the UCB provides information that is used in connection with accessing physical volume space corresponding to logical volume space of the UCB. An application accessing tape device may access an appropriate one (or more) of the UCBs 1312-1314 corresponding to one or more logical devices, including tape emulation devices.

Figure 36A:
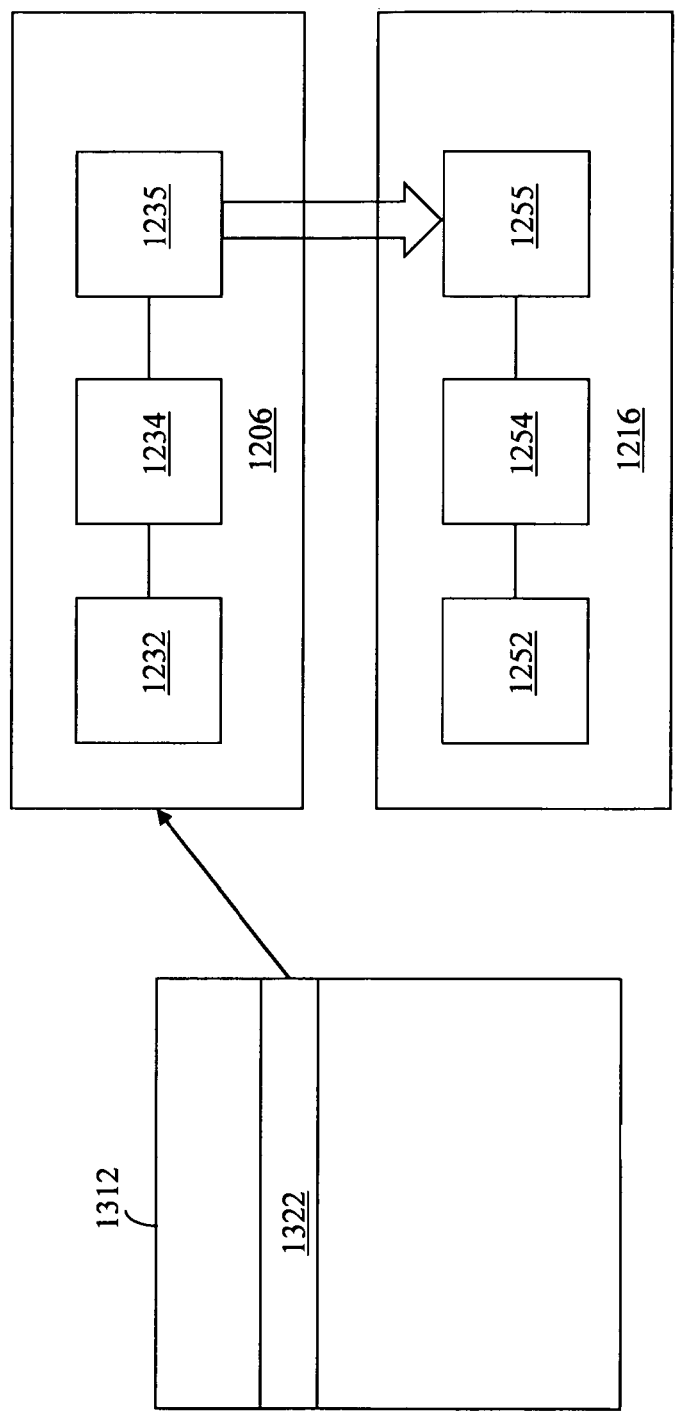
FIG. 36A is a diagram illustrating a UCB accessing a first physical storage space according to an embodiment of the system described herein.

Referring to FIG. 36A, the UCB 1312 is shown in more detail as including UCB referencing information 1322, which references the tape emulation device 1206. In an embodiment herein, the storage device 1235 of the tape emulation device 1206 may be mirrored to the storage device 1255 of the tape emulation device 1216 so that data written to the storage device 1235 is also written to the storage device 1255. Any appropriate mechanism may be used to mirror the data. In an embodiment herein, the mirroring may be transparent to any application(s) that access the data and may possibly also be transparent to the UCB 1312 and/or any software/drivers that handle manipulation and access for the UCB 1312.

Figure 36B:
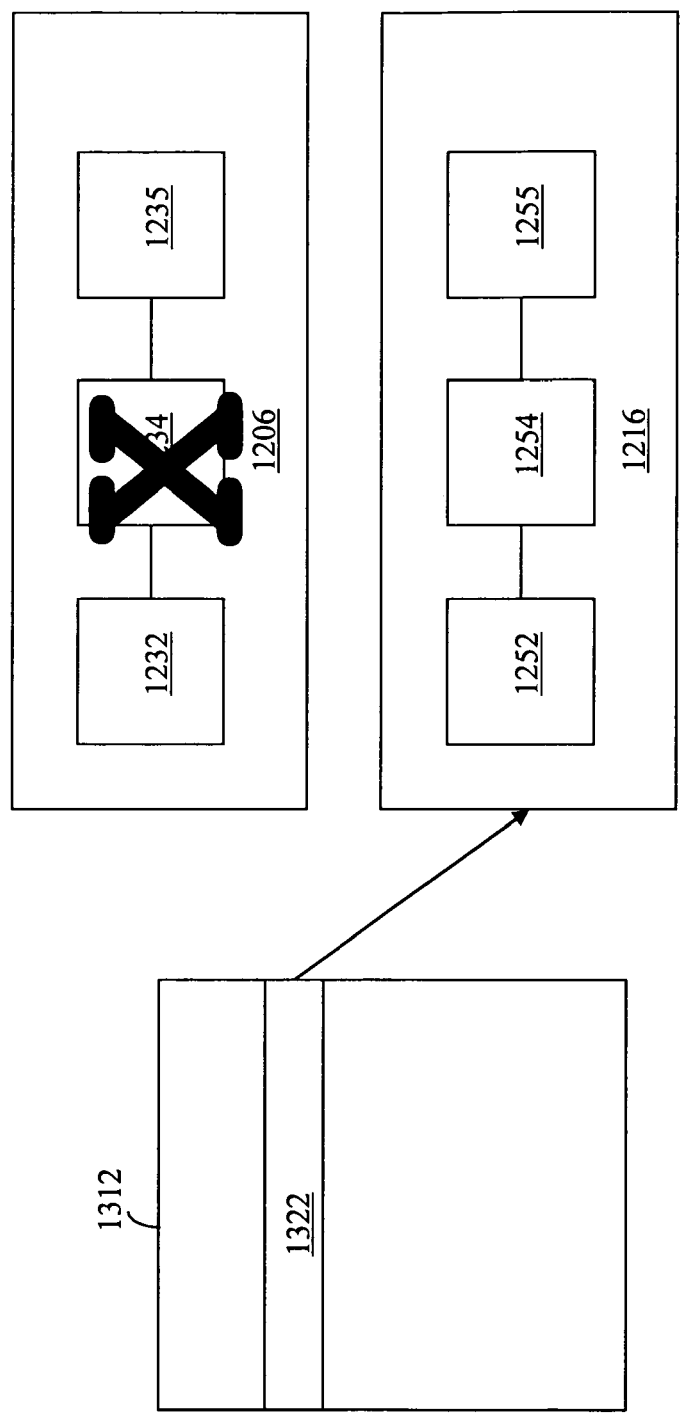
FIG. 36B is a diagram illustrating a UCB accessing a second physical storage space according to an embodiment of the system described herein.

Referring to FIG. 36B, the UCB 1312 is shown with the UCB referencing information 1322 referencing the tape emulation device 1216 while the tape emulation device 1206 is no longer accessible (e.g., due to hardware failure, link failure, etc.). Any application(s) that had been accessing the UCB 1312 while the UCB referencing information 1322 referenced the tape emulation device 1206 would continue to access the UCB 1312 in the same way after the UCB referencing information 1322 was adjusted to reference the tape emulation device 1216.

In an embodiment herein, the UCB referencing information 1322 may be modified by swapping the contents of the UCB 1312 with the contents of another UCB (not shown). The other UCB may correspond to storage that includes a synchronous mirror copy of data referenced by the UCB 1312. For example, the UCB 1312 may correspond to the tape emulation device 1206 while the other UCB corresponds to the tape emulation device 1216, where the synchronous (or possibly asynchronous) mirrors are provided using the RDF connection between the storage device 1235 and the storage device 1255. Of course, other configurations are possible.

Figure 37:
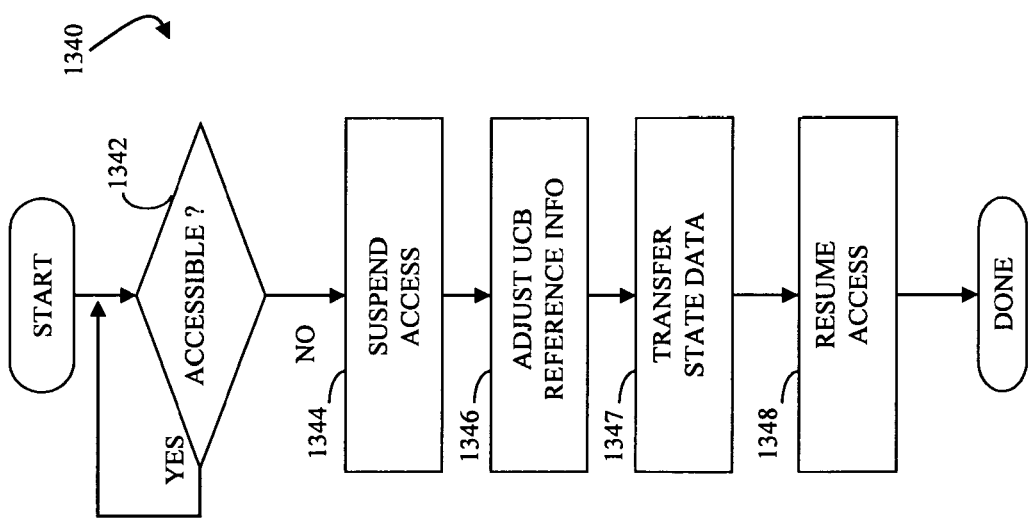
FIG. 37 is a flow chart illustrating steps performed in connection with adjusting a UCB Pointer to point to a different physical storage space according to an embodiment of the system described herein.

Referring to FIG. 37, a flow chart illustrates steps performed in connection with adjusting the UCB referencing information 1322 of the UCB 1312 to reference a different physical storage space. Processing begins at a first test step 1342, where it is determined if the tape emulation device 1206 is accessible. The device can become inaccessible for a number of reasons, including hardware failure and/or being purposefully taken off-line by a user (e.g., for maintenance).

If it is determined at the test step 1342 that the tape emulation device 1206 is accessible, then control transfer back to the step 1342 in what is essentially a polling loop. Otherwise, control transfers from the step 1342 to a step 1344 where access to the UCB 1312 (e.g., by the host 1202) is suspended. Following the step 1344 is a step 1346 where the UCB referencing information is adjusted to reference a different device (e.g., the backup tape emulation device 1216). Following the step 1346 is a step 1347 where state information is transferred. Transferring state information at the step 1347 is described in more detail elsewhere herein. Following the step 1347 is a step 1348 where access to the UCB 1312 is resumed. As discussed elsewhere herein, the adjustment may be provided by swapping the contents of the UCB 1312 with the contents of another UCB. For example, if the host has a first UCB that references the tape emulation device 1206 and a second UCB that references the tape emulation device 1216, the adjustment at the step 1346 could swap the contents of the first and second UCBs so that an application that had been accessing the tape emulation device 1206 begins to access the tape emulation device 1216 after resuming operation at the step 1348. Following the step 1348, processing is complete.

Alternatively, it is possible to wait for an I/O failure (or a particular subset of I/O failures) to execute the processing beginning at the step 1344, in which case the polling step 1342 could be eliminated. That is, the processing beginning at the step 1344 may be invoked in response to an I/O failure (or possibly a certain type of I/O failure).

Note that, in some instances, there may be additional tape state information associated with the tape emulation device 1206 that is transferred at the step 1347 to the backup tape emulation device 1216 in order to provide continuous availability. Such state information may include the position of the logical tape head (i.e., currently reading block x) and may be provided by the front end component 1232. In the case of a planned switchover, it may be possible to simply transfer the state information from the tape emulation device 1206 to the tape emulation device 1216. In the case of a link loss (e.g., loss of the channel 1246), the state information may be transferred via another connection (e.g., the RDF link). If the switchover occurs because of unexpected loss of the tape emulation device 1206, the state information may need to be recreated using, for example, metadata from the UCB corresponding to the tape emulation device 1206.

Various embodiments discussed herein may be combined with each other in appropriate combinations in connection with the system described herein. The system described herein may be implemented using the hardware described herein, variations thereof, or any other appropriate hardware capable of providing the functionality described herein. Thus, for example, one or more storage devices having components as described herein may, alone or in combination with other devices, provide an appropriate platform that executes any of the steps described herein.

In some instances, the order of steps in the flowcharts, flow diagrams and/or described flow processing may be modified, where appropriate. Further, various aspects of the system described herein may be implemented using software, hardware, a combination of software and hardware and/or other modules or devices having the described features and performing the described functions. Software implementations of the system described herein may include executable code that is stored in a non-volatile computer readable storage medium and executed by one or more processors. The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system.

While the invention has been disclosed in connection with various embodiments, modifications thereon will be readily apparent to those skilled in the art. Accordingly, the spirit and scope of the invention is set forth in the following claims.

What is claimed is:

1. A method of maintaining tape emulation consistency, comprising:
    writing additional tape data to a first local storage device at a local site;
    writing tape emulation data to a second local storage device at the local site, wherein the second local storage device is different from the first local storage device; and
    maintaining consistency of the first and second local storage devices in connection with transferring data to a remote site by initiating a cycle switch that causes a concurrent cycle change from a first cycle to a second cycle for the first and second local storage devices.

2. A method, according to claim 1, wherein additional tape data and tape emulation data written before a first time is associated with a first cycle and wherein additional tape data and tape emulation data written after the first time and before a second time is associated with a second cycle different from the first cycle.

3. A method, according to claim 2, wherein writes to the local storage devices begun after initiating the cycle switch do not complete until after the cycle switch has completed.

4. A method, according to claim 2, further comprising:
    following the first and second local storage devices completing transfer of the first plurality of writes to corresponding remote storage devices, each of the first and second local storage devices sending a message to the corresponding remote storage device.

5. A method, according to claim 2, further comprising:
    providing cycle switching information to the second storage device via a link that is separate from links used to provide the additional tape data and tape emulation data.

6. A method, according to claim 2, wherein a host initiates the cycle switch.

7. A method, according to claim 2, wherein initiating the cycle switch includes: waiting a predetermined amount of time; determining if the first and second local storage devices are ready to switch; and for each of the first and second local storage devices, sending a first command thereto to cause a cycle switch.

8. A method, according to claim 7, wherein sending a command to initiate a cycle switch also causes writes begun after the first command to not complete until a second command is received.

9. A method, according to claim 8, further comprising:
    after sending the first command to the first and second local storage devices, sending the second command to the first and second storage devices to allow writes to complete.

10. A method, according to claim 2, wherein the first and second local storage devices are provided in a consistency group.

11. Computer software provided in a non-transitory computer-readable medium, that maintains tape emulation consistency, the software comprising:
  executable code that writes additional tape data to a first local storage device at a local site;
  executable code that writes tape emulation data to a second local storage device at the local site, wherein the second local storage device is different from the first local storage device; and
  executable code that maintains consistency of the first and second local storage devices in connection with transferring data to a remote site by initiating a cycle switch that causes a concurrent cycle change from a first cycle to a second cycle for the first and second local storage devices.

12. Computer software, according to claim 11, wherein additional tape data and tape emulation data written before a first time is associated with a first cycle and wherein additional tape data and tape emulation data written after the first time and before a second time is associated with a second cycle different from the first cycle.

13. Computer software, according to claim 12, wherein writes to the local storage devices begun after initiating the cycle switch do not complete until after the cycle switch has completed.

14. Computer software, according to claim 12, wherein following the first and second local storage devices completing transfer of the first plurality of writes to corresponding remote storage devices, each of the first and second local storage devices sending a message to the corresponding remote storage device.

15. Computer software, according to claim 12, further comprising:
  executable code that provides cycle switching information to the second storage device via a link that is separate from links used to provide the additional tape data and tape emulation data.

16. Computer software, according to claim 12, wherein a host initiates the cycle switch.

17. Computer software, according to claim 12, wherein executable code that initiates the cycle switch includes executable code that waits a predetermined amount of time, executable code that determines if the first and second local storage devices are ready to switch, and executable code that sends to each of the first and second local storage devices a first command thereto to cause a cycle switch.

18. Computer software, according to claim 17, wherein sending a command to initiate a cycle switch also causes writes begun after the first command to not complete until a second command is received.

19. Computer software, according to claim 18, further comprising:
  executable code that sends, after sending the first command to the first and second local storage devices, the second command to the first and second storage devices to allow writes to complete.

20. Computer software, according to claim 12, wherein the first and second local storage devices are provided in a consistency group.

* * * * *